(12) United States Patent
Volkerink et al.

(10) Patent No.: US 12,322,269 B2
(45) Date of Patent: Jun. 3, 2025

(54) WIRELESS TRACKING BELTS FOR ASSET TRACKING

(71) Applicant: Trackonomy Systems, Inc., San Jose, CA (US)

(72) Inventors: Hendrik J Volkerink, Palo Alto, CA (US); Ajay Khoche, West San Jose, CA (US); Taylor Albert Gregoire-Wright, Palo Alto, CA (US); Aaron Storrs, Santa Cruz, CA (US)

( * ) Notice: Subject to any disclaimer, the term of this patent is extended or adjusted under 35 U.S.C. 154(b) by 0 days.

(21) Appl. No.: 18/371,746

(22) Filed: Sep. 22, 2023

(65) Prior Publication Data

US 2024/0096193 A1   Mar. 21, 2024

Related U.S. Application Data

(63) Continuation of application No. 17/648,917, filed on Jan. 25, 2022, now Pat. No. 11,798,391.

(60) Provisional application No. 63/291,467, filed on Dec. 20, 2021, provisional application No. 63/215,379, filed on Jun. 25, 2021, provisional application No. 63/141,149, filed on Jan. 25, 2021.

(51) Int. Cl.
  *G08B 21/18*   (2006.01)
  *G06K 19/06*   (2006.01)

(52) U.S. Cl.
  CPC ..... *G08B 21/182* (2013.01); *G06K 19/06037* (2013.01)

(58) Field of Classification Search
  CPC .......................... G08B 21/182; G06K 19/06037
  See application file for complete search history.

(56) References Cited

U.S. PATENT DOCUMENTS

| | | | |
|---|---|---|---|
| 5,917,433 | A  | 6/1999 | Keillor et al. |
| 6,437,702 | B1 | 8/2002 | Ragland |
| 6,522,874 | B1 | 2/2003 | Chu et al. |
| 6,919,803 | B2 | 7/2005 | Breed |
| 7,009,517 | B2 | 3/2006 | Wood |

(Continued)

FOREIGN PATENT DOCUMENTS

| | | |
|---|---|---|
| AU | 2018204317 A1 | 1/2019 |
| AU | 2018250358 A1 | 5/2019 |

(Continued)

OTHER PUBLICATIONS

International Patent Application No. PCT/US2022/47338 International Search Report and Written Opinion dated Apr. 7, 2023, 15 pages.

(Continued)

*Primary Examiner* — Hongmin Fan

(57) ABSTRACT

A tracking device comprises a flexible belt body configured to loop around a portion of a pallet, e.g., around a center stringer of a pallet. The flexible belt body has a first portion and a second portion configured to be connected. The tracking device further comprises a first region having one or more sensitive electronic components and a second region having one or more durable electronic components and/or electronic components that benefit from exposure during transportation. The tracking device is positioned on the portion of the pallet such that the first region is oriented towards an interior of the pallet and the second region is oriented towards an exterior of the pallet.

20 Claims, 32 Drawing Sheets

(56) References Cited

U.S. PATENT DOCUMENTS

| | | |
|---|---|---|
| 8,095,070 B2 | 1/2012 | Twitchell, Jr. |
| 9,228,911 B1 | 1/2016 | Meyers |
| 9,886,799 B2 | 2/2018 | Kwak |
| 10,650,657 B1 | 5/2020 | Curran |
| 10,758,943 B1 | 9/2020 | Carpenter |
| 10,902,240 B2 | 1/2021 | Adato |
| 11,115,732 B2 | 9/2021 | Lucrecio et al. |
| 2002/0089434 A1 | 7/2002 | Ghazarian |
| 2003/0089771 A1 | 5/2003 | Cybulski et al. |
| 2003/0173408 A1 | 9/2003 | Mosher et al. |
| 2004/0066274 A1 | 4/2004 | Bailey |
| 2004/0224640 A1 | 11/2004 | Macfarland |
| 2006/0055552 A1 | 3/2006 | Chung et al. |
| 2006/0187033 A1 | 8/2006 | Hall et al. |
| 2007/0085677 A1 | 4/2007 | Neff et al. |
| 2007/0095905 A1 | 5/2007 | Kadaba |
| 2007/0164858 A1 | 7/2007 | Webb |
| 2007/0164863 A1 | 7/2007 | Himberger et al. |
| 2009/0322510 A1 | 12/2009 | Beger et al. |
| 2011/0127325 A1 | 6/2011 | Hussey et al. |
| 2012/0075343 A1 | 3/2012 | Chen et al. |
| 2013/0002443 A1 | 1/2013 | Breed et al. |
| 2013/0211976 A1 | 8/2013 | Breed |
| 2014/0062699 A1 | 3/2014 | Heine et al. |
| 2014/0163430 A1* | 6/2014 | Tropper ............ A61B 5/681 600/595 |
| 2015/0227245 A1 | 8/2015 | Inagaki et al. |
| 2015/0312653 A1 | 10/2015 | Avrahami et al. |
| 2015/0366518 A1 | 12/2015 | Sampson |
| 2017/0078950 A1 | 3/2017 | Hillary et al. |
| 2017/0103635 A1* | 4/2017 | Kroll ............ G08B 21/0247 |
| 2018/0012472 A1 | 1/2018 | Purcell |
| 2018/0165568 A1 | 6/2018 | Khoche |
| 2018/0374039 A1 | 12/2018 | Walden et al. |
| 2019/0012936 A1 | 1/2019 | Yazdi et al. |
| 2019/0037362 A1 | 1/2019 | Nogueira-Nine |
| 2019/0236531 A1 | 8/2019 | Adato |
| 2020/0104790 A1 | 4/2020 | Chung |
| 2020/0223066 A1 | 7/2020 | Diankov et al. |
| 2020/0285726 A1 | 9/2020 | Kalous |
| 2020/0334514 A1 | 10/2020 | Chen |
| 2020/0405223 A1 | 12/2020 | Mai et al. |
| 2021/0312787 A1* | 10/2021 | Brown ............ G08B 21/0288 |
| 2021/0366251 A1 | 11/2021 | Volkerink et al. |
| 2022/0097907 A1* | 3/2022 | Neeld ............ B65D 71/0096 |
| 2022/0122436 A1 | 4/2022 | Volkerink et al. |
| 2022/0300892 A1 | 9/2022 | Volkerink et al. |
| 2022/0309899 A1 | 9/2022 | Volkerink et al. |
| 2023/0097544 A1 | 3/2023 | Volkerink et al. |
| 2023/0401940 A1 | 12/2023 | Volkerink et al. |

FOREIGN PATENT DOCUMENTS

| | | |
|---|---|---|
| CA | 3061878 A1 | 11/2018 |
| CA | 3008512 A1 | 12/2018 |
| KR | 20160103073 A | 8/2016 |
| WO | WO 2014137915 A1 | 9/2014 |
| WO | WO 2014153418 A1 | 9/2014 |
| WO | WO 2018053309 A1 | 3/2018 |
| WO | WO 2021086248 | 5/2021 |

OTHER PUBLICATIONS

U.S. Appl. No. 17/449,582, Non-Final Office Action dated Sep. 9, 2022, 29 pages.

International Patent Application No. PCT/US2022/013729 International Search Report and Written Opinion dated Jun. 6, 2022, 11 pages.

International Patent Application No. PCT/US2022/015161 International Search Report and Written Opinion dated Jul. 1, 2022, 15 pages.

U.S. Appl. No. 16/776,804, Final Office Action dated Feb. 3, 2022, 20 pages.

International Patent Application No. PCT/US2021/053028 International Search Report and Written Opinion dated Jan. 12, 2022, 11 pages.

International Patent Application No. PCT/US2021/034112, International Search Report and Written Opinion dated Oct. 22, 2021, 14 pages.

Nisarga et al. "System-Level Tamper Protection Using MSP MCUs." Texas Instruments, Aug. 2016, 13 pages.

Sanchez et al. Machine Learning on Difference Image Analysis: A comparison of Methods for Transient Detection.

PCT Application No. PCT/US2020/014521 International Preliminary Report on Patentability, dated Jul. 27, 2021, 6 pages.

U.S. Appl. No. 16/776,804, Non-Final Office Action dated Jul. 15, 2021, 9 pages.

U.S. Appl. No. 16/517,508, Non-Final Office Action dated Jan. 7, 2021, 10 pages.

U.S. Appl. No. 16/517,508, Non-Final Office Action dated May 6, 2020, 35 pages.

\* cited by examiner

WIRELESS TRACKING BELTS FOR ASSET TRACKING

RELATED APPLICATIONS

This application is a continuation of U.S. patent application Ser. No. 17/648,917, filed Jan. 25, 2022. U.S. patent application Ser. No. 17/648,917 claims priority to U.S. Provisional Patent Application Ser. No. 63/141,149, titled "Wireless Tracking Belts for Asset Tracking," filed Jan. 25, 2021, U.S. Patent Application Ser. No. 63/215,379, titled "Valve Position Monitoring Using Wireless Tracking Devices," filed Jun. 25, 2021, and U.S. Patent Application Ser. No. 63/291,467, titled "Smart Wireless Tracking Belt," filed Dec. 20, 2021. All of the above-referenced applications are incorporated in their entirety herein by reference.

BACKGROUND

In environments wherein large numbers of assets are being managed, stored, and transported, it is often difficult to migrate to updated equipment. For example, it may be prohibitively expensive to purchase new equipment. Implementing retrofits to existing equipment, too, is often costly, requiring manpower and time that interrupt or stop a normal flow of operations in order to gather existing equipment, implement retrofits, and to deploy the retrofitted equipment.

In some cases, tracking devices may be used to collect data on assets that don't have an inherent capability to collect and transmit data. However, a conventional tracking device may be exposed to physical damage or trauma. In particular, assets that are used in environments or applications that have a high risk of physical damage may not be well suited for electronics devices that are sensitive to physical damage or trauma.

SUMMARY

A tracking device may have a flexible belt body configured to loop around a portion of an asset or around a portion of a container or support, such as a pallet, for assets, objects or items. The flexible belt body has first and second physical connectors that connect together. For example, the first and second physical connectors may be respective fabric strips of hook-and-loop fasteners. The flexible belt body further has a first region comprising one or more sensitive electronic components and a second region comprising one or more durable electronic components or electronic components benefitting from exposure during operation. The tracking device is oriented on the portion of the asset such that the first region is positioned towards an interior section of the asset and that the second region is positioned towards an exterior section of the asset.

Because a container or support may be used over multiple phases of transportation of assets, or may be reused across multiple assets, multiple asset types, and/or under multiple conditions of transportation, the first and second physical connectors of the flexible belt body are configured such that the connection is maintained under stress experienced during one or more phases of standard transport. For example, stress during standard transportation may include vibration or shaking, handling by users or by machinery, changes in temperature (e.g., via refrigeration units), changes in pressure (e.g., transportation via airplane), and the like.

In some embodiments, the flexible belt body is configured to loop around a central portion of the asset. For example, if the asset is a pallet, the flexible belt body is configured to be looped around a center stringer of the pallet. The center stringer may be, for example, a stringer or runner of the pallet. In further embodiments, a stringer or runner of the pallet may comprise a solid or notched beam. In other embodiments, the center stringer may include a block. The center stringer may include a wood material, a metal material, a plastic material, polymer material, a composite material, some other material, or some combination thereof. The pallet may include a plurality of center stringers, according to some embodiments. In other embodiments, the flexible belt body may be looped around other portions of the pallet, e.g., other stringers on the pallet and/or top or bottom deck boards, or may be looped around portions of other equipment, e.g., arms or handles on machinery that may be valuable to track.

In some embodiments, the tracking device further comprises a two-dimensional barcode, such as a QR code. The two-dimensional barcode is oriented so as to be accessible from an exterior of the pallet when the flexible belt body is looped around the portion of the pallet and the first and second portions of the flexible belt body are connected. In some embodiments, the tracking device further comprises one or more graphics, such as illustrations or written instructions, directing a user of the tracking device to position the tracking device on the pallet and to connect the first and second portions of the flexible belt body.

A method is further disclosed herein for retrofitting assets with tracking devices and tracking the assets. A tracking device is looped around a portion of an asset. For example, the tracking device comprises a flexible belt body configured to be looped around a center stringer of a pallet. The flexible belt body comprises a first portion and a second portion, the first and second portions configured to connect, e.g., the first and second portions being respective strips of hook-and-loop fastener. The flexible belt body further comprises a first region and a second region, the first region having one or more sensitive electronic components and the second region having one or more durable electronic components or electronic components benefitting from exposure during operation. The tracking device is oriented on the portion of the asset such that the first region is positioned towards an interior section of the asset and that the second region is positioned towards an exterior section of the asset. The tracking device is connected via the first and second portions of the flexible belt body. The tracking device is initialized. For example, the tracking device is initialized via a user of the wireless tracking system scanning a QR code or other barcode on the tracking device with a mobile phone or other client device. Responsive to the tracking device being initialized, the retrofitted asset may be deployed in the environment and tracked during operation.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

In one embodiment, a smart wireless tracking belt includes a wireless transducing circuit, and a flexible belt body. The flexible belt body has a first region having a first portion of the wireless transducing circuit, a second region having a second portion of the wireless transducing circuit, a first physical connector, and a second physical connector. The first physical connector and the second physical connector are configured to removably couple together causing the flexible belt body to form a loop. When the flexible belt body forms the loop, the first region has a different orientation to the second region.

In another embodiment, a method uses a smart wireless tracking belt for lockout/tagout. The method includes determining deployment of the smart wireless tracking belt by detecting fastening of the smart wireless tracking belt and reading sensors of the smart wireless tracking belt to determine no movement is detected during a settling period. The method then detects unexpected movement of the smart wireless tracking belt by reading sensor data from at least one movement sensor of the smart wireless tracking belt and processing the sensor data to detect movement of the smart wireless tracking belt. The method generates an alert when the unexpected movement is detected.

In another embodiment, a smart wireless tracking belt includes a flexible belt body having a head portion including a wireless transducing circuit, a tail portion having a plurality of magnets spaced along its length, a first physical connector and a second physical connector that removably couples with the first physical connector to cause the flexible belt body to form a loop. The wireless transducing circuit includes a magnetic sensor, at least one processor, and memory storing machine-readable instructions that, when executed by the processor, control the wireless transducing circuit to: detect an unfastening event when the magnetic sensor does not sense the at least one of the magnets as the tail portion is unfastened from the head portion; and transmit a wireless message indicative of the unfastening event to a remote server.

DETAILED DESCRIPTION OF THE EMBODIMENTS

Figure 1:
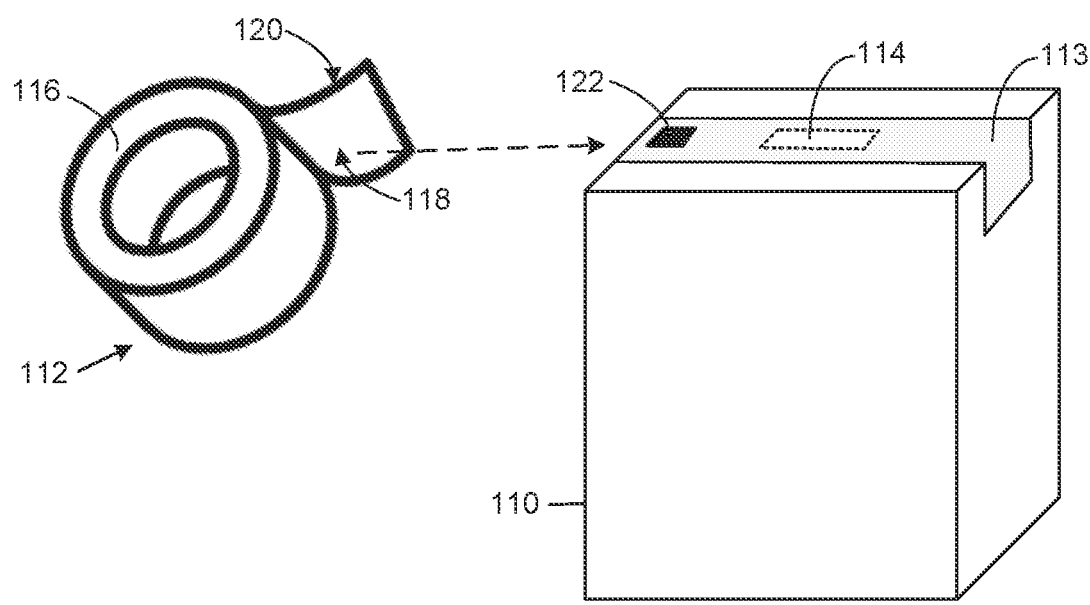
FIG. 1 is a schematic showing one example adhesive tape-agent platform, including wireless transducing circuit, used to seal a package for shipment, in embodiments.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 6A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

Further, each of the "agents", "nodes", "tape nodes", and "tape agents" may include flexible or non-flexible form factors unless otherwise specified. Thus, each of the "agents", "nodes", "tape nodes", and "tape agents" include flexible and non-flexible (rigid) form factors, or a combination thereof including flexible components and non-flexible components.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof. The term "processor" or "computer" or the like includes one or more of: a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC), a memory controller, bus controller, and other components that manage data flow between said processor associated memory, and other components communicably coupled to the system bus. Thus the terms "module," "manager," "component", and "unit" may include computer readable instructions that, when executed by a processor, implement the functionality discussed herein with respect to said "module," "manager," "component", and "unit".

Adhesive Tape Agent Platform

FIG. 1 is a schematic showing one example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
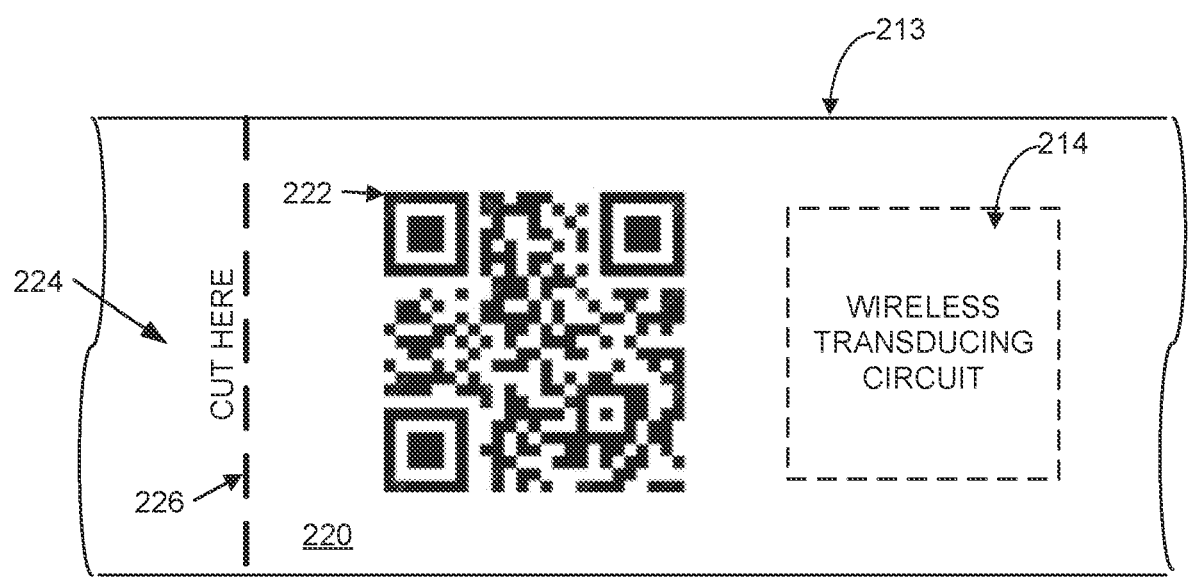
FIG. 2 is a schematic showing the non-adhesive surface of one segment of the adhesive tape agent platform of FIG. 1, in embodiments.

FIG. 2 is a schematic showing the non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example of FIG. 2, the segment 113 of the adhesive tape agent platform 112 includes an identifier 122 (e.g., a two-dimensional bar code, such as a QR Code), written instructions 224 (e.g., "Cut Here"), and an associated cut line 226 that indicates where the user should cut the adhesive tape agent platform 112. The written instructions 224 and the cut line 226 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 226 may demarcate the boundaries between adjacent segments at locations that are free of any active components of the wireless transducing circuit 114. The spacing between the wireless transducing circuit 114 and the cut lines 226 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape-agent platform to the package 110.

In some examples, the wireless transducing circuits 114 embedded in one or more segments 113 of the adhesive tape-agent platform 112 are activated when the adhesive tape agent platform 112 is cut along the cut line 226. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 226).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
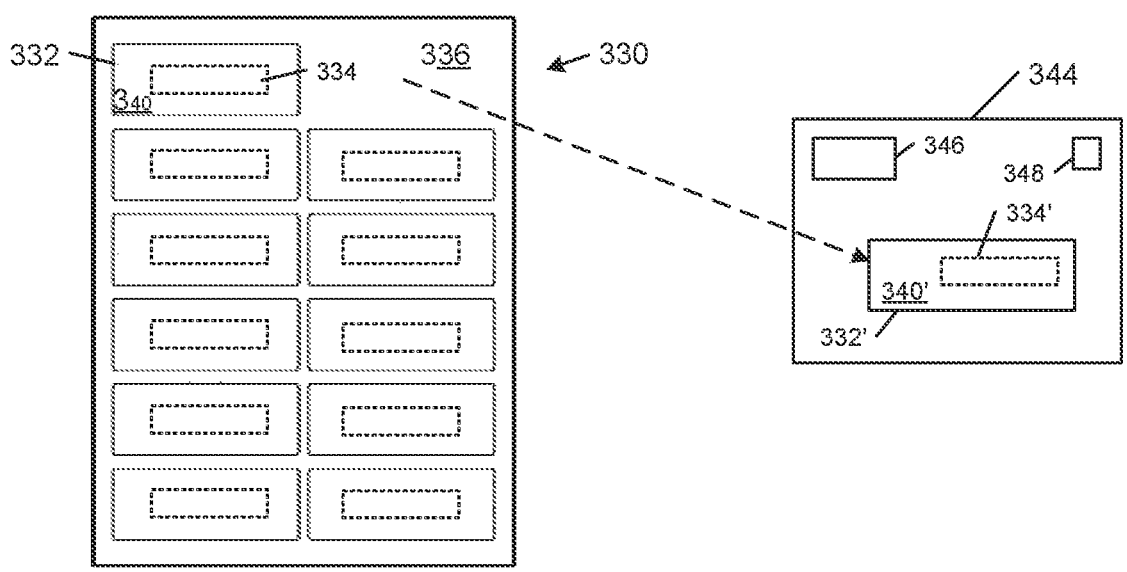
FIG. 3 is a schematic showing one example adhesive tape platform that includes a set of adhesive tape platform segments, in embodiments.

FIG. 3 is a schematic showing one example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Adhesive tape platform 330 may represent adhesive tape platform 112 if FIG. 1. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 44 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
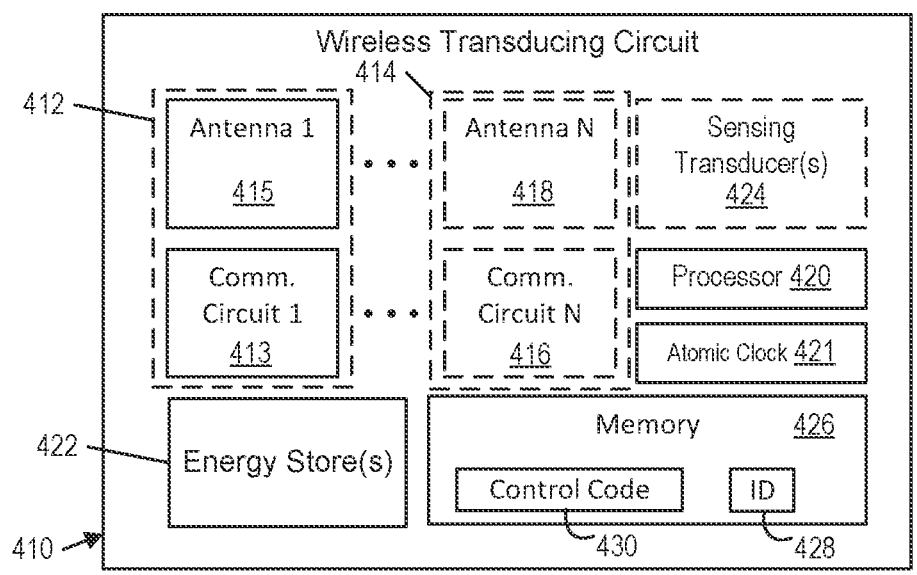
FIG. 4 is a block diagram illustrating components of an example wireless transducing circuit that includes one or more wireless communication modules, in embodiments.

FIG. 4 is a block diagram illustrating components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
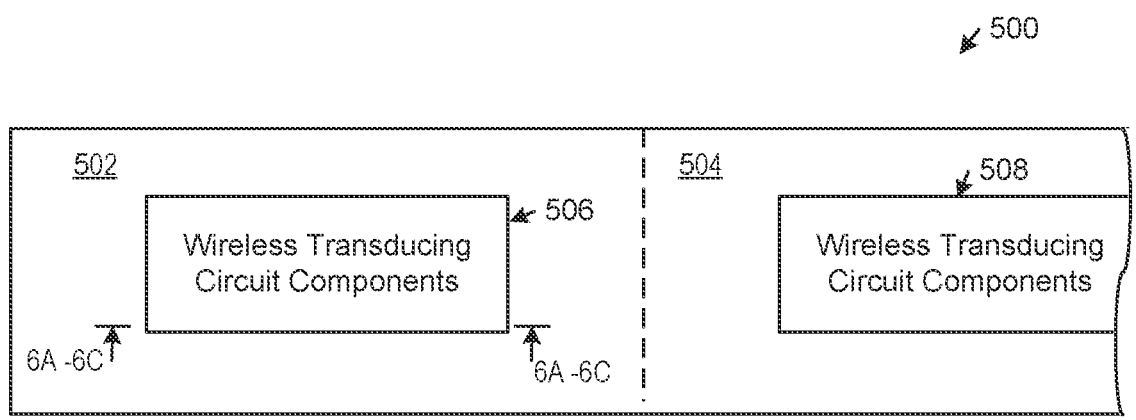
FIG. 5 is a top view of a portion of an example flexible adhesive tape platform that shows a first segment and a portion of a second segment, in embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 500 according to a roll-to-roll fabrication process is described in connection with FIGS. 6A-6C and as shown in FIGS. 7A and 7C of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 6A:
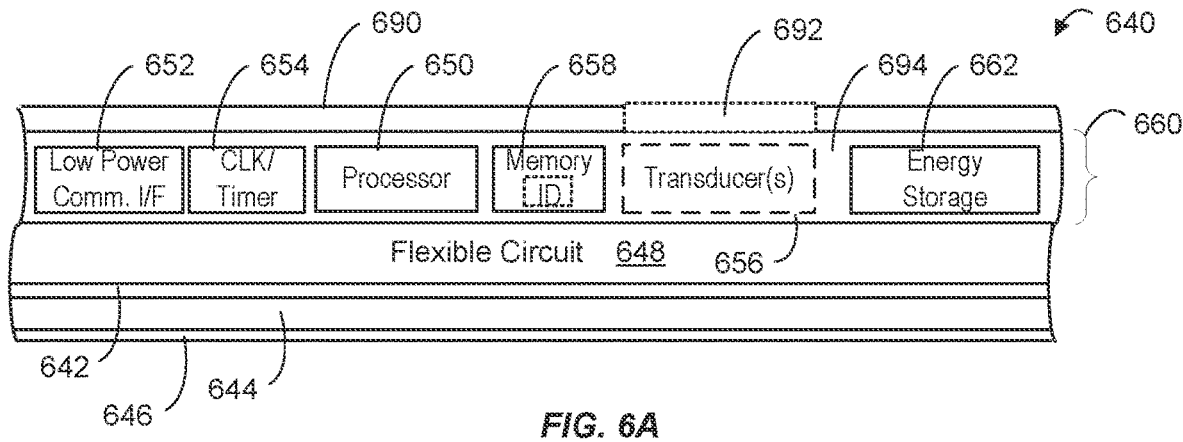
FIGS. 6A-C show cross sectional side views of three flexible adhesive tape agent platforms that each include a respective set of the components of the wireless transducing circuit of FIG. 5, in embodiments.

FIG. 6A shows a cross-sectional side view of a portion of an example segment 640 of a flexible adhesive tape agent platform (e.g., platform 500 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a pre-fabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

Figure 6B:
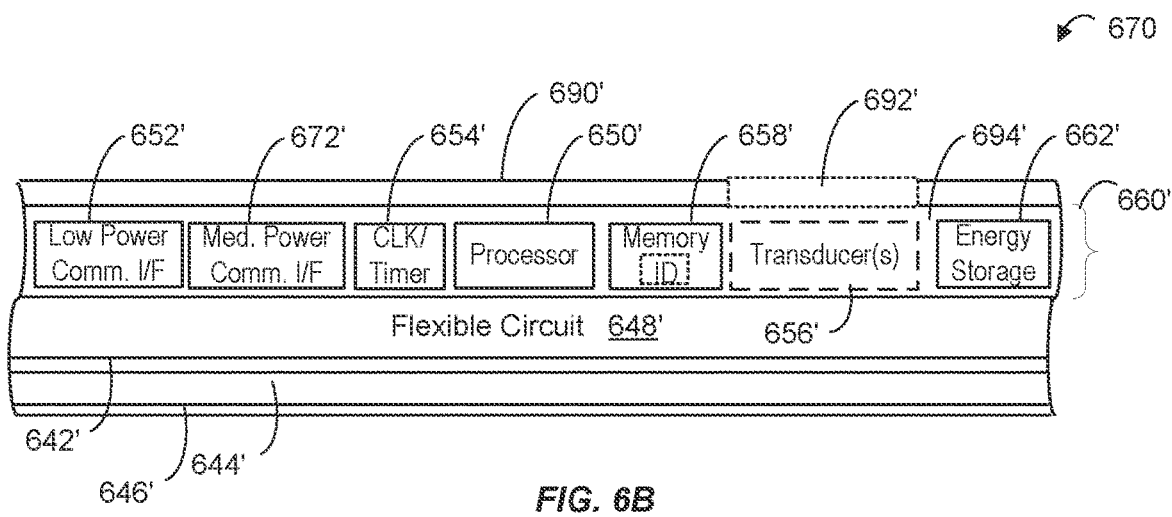

FIG. 6B shows a cross-sectional side-view of a portion of an example segment 670 of a flexible adhesive tape agent platform (e.g., platform 500 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

Figure 6C:
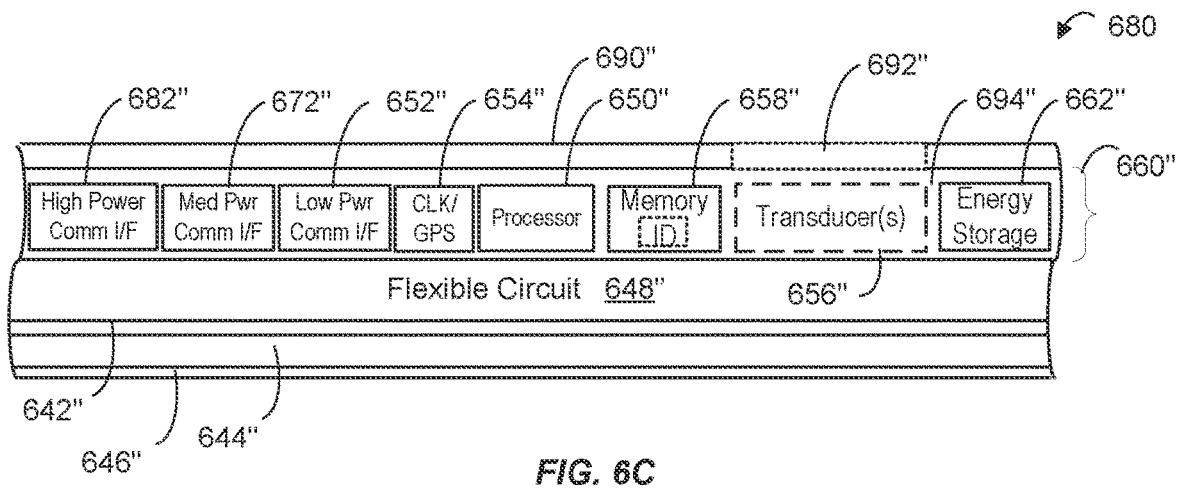

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652" and may include a medium-power communications-interface 672". The high-power communications-interface 682" has a range that provides global coverage to available infrastructure (e.g., the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682' and the transducers) on the front-side of the flexible circuit 648, 648', 648" to the electrodes of the energy storage device 662, 662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Figure 7:
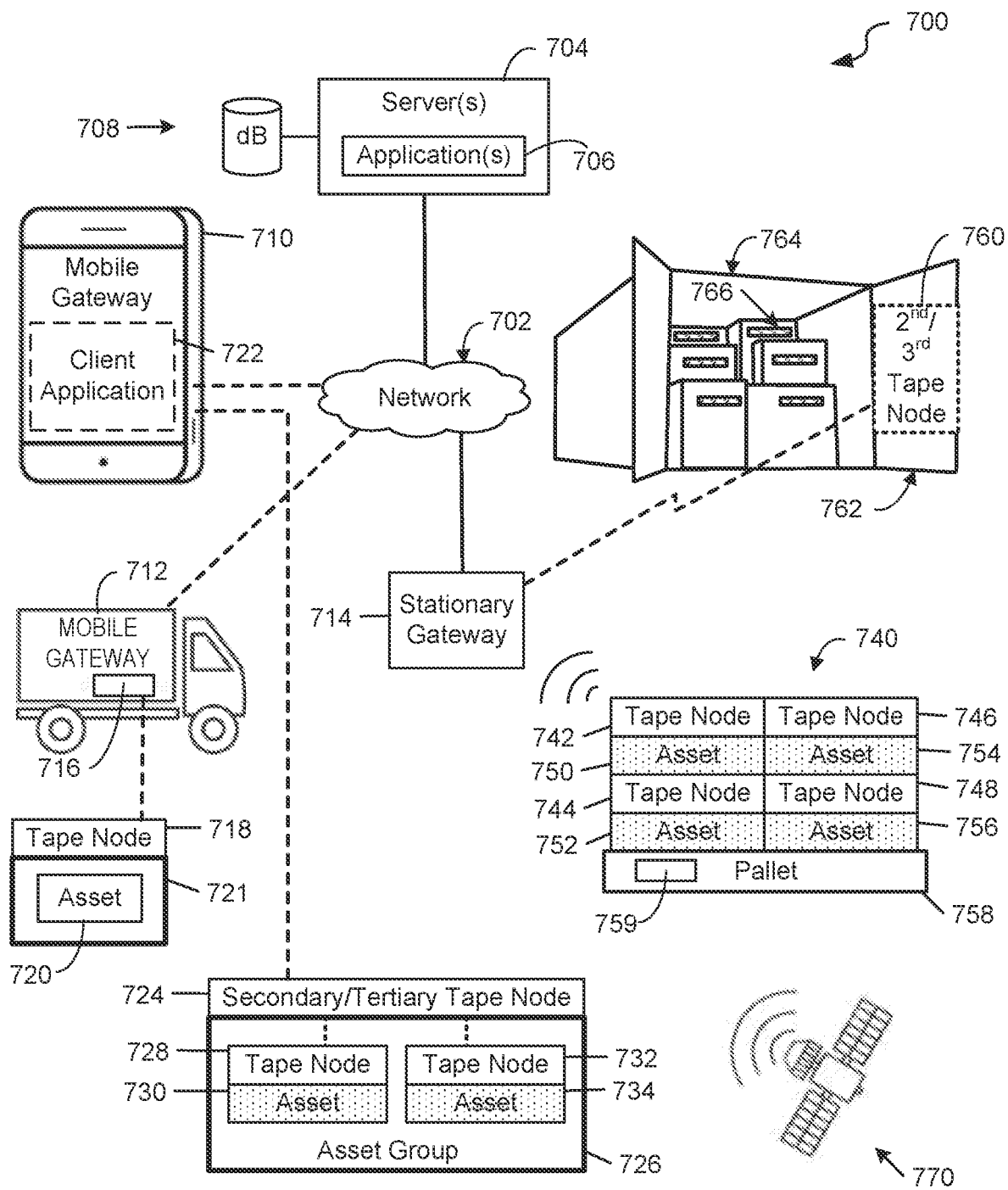
FIG. 7 shows an example network communications environment that includes a network supporting communications between servers, mobile gateways, a stationary gateway, and various types of tape nodes associated with various assets, in embodiments.

FIG. 7 shows an example network communications environment 700 that includes a network 702 that supports communications between one or more servers 704 executing one or more applications of a network service 708, mobile gateways 710 (a smart device mobile gateway), 712 (a vehicle mobile gateway), a stationary gateway 714, and various types of tape nodes that are associated with various assets (e.g., parcels, equipment, tools, persons, and other things). Hereinafter "tape nodes" may be used interchangeably with the "agents", as described above, with reference to FIGS. 1-6C; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 702 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 702 includes communications infrastructure equipment, such as a geolocation satellite system 770 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 720) or other stationary (e.g., stationary gateway 714) or mobile object (e.g., a, such as a delivery truck, such as mobile gateway 712) or stationary object (e.g., a structural element of a building). This process activates the tape node (e.g., the tape node 718) and causes the tape node 718 to communicate with the one or more servers 704 of the network service 708. In this process, the tape node 718 may communicate through one or more other tape nodes (e.g., the tape nodes 742, 744, 746, 748) in the communication hierarchy. In this process, the one or more servers 704 executes the network service application 706 to programmatically configure tape nodes 718, 724, 728, 732, 742, 744, 746, 748, that are deployed in the network communications environment 700. In some examples, there are multiple classes or types of tape nodes (e.g., the master agent, secondary agent, or tertiary agent discussed herein), where each tape node class has a different respective set of functionalities and/or capacities, as described herein with respect to the "agents."

In some examples, the one or more servers 704 communicate over the network 702 with one or more gateways 710, 712, 714 that are configured to send, transmit, forward, or relay messages to the network 702 in response to transmissions from the tape nodes 718, 724, 728, 732, 742, 744, 746, 748 that are associated with respective assets and within communication range. Example gateways include mobile gateways 710, 712 and a stationary gateway 714. In some examples, the mobile gateways 710, 712, and the stationary gateway 714 are able to communicate with the network 702 and with designated sets or groups of tape nodes.

In some examples, the mobile gateway 712 is a vehicle (e.g., a delivery truck or other mobile hub) that includes a wireless communications unit 716 that is configured by the network service 708 to communicate with a designated network of tape nodes, including tape node 718 (e.g., a master tape node) in the form of a label that is adhered to a parcel 721 (e.g., an envelope) that contains an asset 720, and is further configured to communicate with the network service 708 over the network 702. In some examples, the tape node 718 includes a lower-power wireless-communications interface of the type used in, e.g., segment 640 (shown in FIG. 6A), and the wireless communications unit 716 may implemented by a secondary or tertiary tape node (e.g., one of segment 670 or segment 680, respectively shown in FIGS. 6B and 6C) that includes a lower-power communications interfaces for communicating with tape nodes within range of the mobile gateway 712 and a higher-power communications-interface for communicating with the network 702. In this way, the tape node 718 and wireless communications unit 716 create a hierarchical wireless network of tape nodes for transmitting, forwarding, bridging, relaying, or otherwise communicating wireless messages to, between, or on behalf of the tape node 718 in a power-efficient and cost-effective way.

In some examples, a mobile gateway 710 is a mobile phone that is operated by a human operator and executes a client application 722 that is configured by a network service to communicate with a designated set of tape nodes, including a secondary or tertiary tape node 724 that is adhered to a parcel 726 (e.g., a box), and is further configured to communicate with a server 704 over the network 702. In the illustrated example, the parcel 726 contains a first parcel labeled or sealed by a master tape node 728 and containing a first asset 730, and a second parcel labeled or sealed by a master tape node 732 and containing a second asset 734. The secondary or tertiary tape node 724 communicates with each of the master tape nodes 728, 732 and also communicates with the mobile gateway 710. In some examples, each of the master tape nodes 728, 732 includes a lower-power wireless-communications interface of the type used in, e.g., segment 640 (shown in FIG. 6A), and the secondary/tertiary tape node 724 is implemented by a tape node (e.g., segment 670 or segment 680, shown in FIGS. 6B and 6C) that includes a low-power communications interface for communicating with the master tape nodes 728, 732 contained within the parcel 726, and a higher-power communications interface for communicating with the mobile gateway 710. The secondary or tertiary tape node 724 is operable to relay wireless communications between the master tape nodes 728, 732 contained within the parcel 726 and the mobile gateway 710, and the mobile gateway 710 is operable to relay wireless communications between the secondary or tertiary tape node 724 and the server 704 over the network 702. In this way, the master tape nodes 728 and 732 and the secondary or tertiary tape node 724 create a wireless network of nodes for transmitting, forwarding, relaying, or otherwise communicating wireless messages to, between, or on behalf of the master tape nodes 728, 732, the secondary or tertiary tape node 724, and the network service (not shown) in a power-efficient and cost-effective way.

In some embodiments, the client application 722 is installed on a mobile device (e.g., smartphone) that may also operate as mobile gateway 710. The client application 722 may cause the mobile device to function as a mobile gateway 710. For example, the client application 722 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 722) relays that data to the server 704 via cellular (2G, 3G, 4G, 5G) or Wi-Fi. Further, the client application 722 may cause the mobile device to establish a connection with, and receive pings (e.g., alerts to nearby assets that an environmental profile threshold has been exceeded), from the tape nodes or from the server 704. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 722 may share location data with the tape node, allowing the tape node to pinpoint its location.

In some examples, the stationary gateway 714 is implemented by a server 704 executing a network service application 706 that is configured by the network service 708 to communicate with a designated set 740 of master tape nodes 742, 744, 746, 748 that are adhered to respective parcels containing respective assets 750, 752, 754, 756 on a pallet 758. In other examples, the stationary gateway 714 is implemented by a secondary or tertiary tape node 760 (e.g., segments 670 or 680, respectively shown in FIGS. 6B and 6C) that is adhered to, for example, a wall, column or other infrastructure component of the physical premise's environment 700, and includes a low-power communications interface for communicating with nodes within range of the stationary gateway 714 and a higher-power communications interface for communicating with the network 702.

In one embodiment, each of the master tape nodes 742-748 is a master tape node and is configured by the network service 708 to communicate individually with the stationary gateway 714, which relays communications from the master tape nodes 742-748 to the network service 708 through the stationary gateway 714 and over the network 702. In another embodiment, one of the master tape nodes 742-748 at a time is configured to transmit, forward, relay, or otherwise communicate wireless messages to, between, or on behalf of the other master nodes on the pallet 758. In this embodiment, the master tape node may be determined by the master tape nodes 742-748 or designated by the network service 708. In some examples, the master tape nodes 742-748 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 759 is adhered to the pallet 758 and is configured to perform the role of a master node for the other master tape nodes 742-748. In these ways, the master tape nodes 742-748, 759 are configurable to create different wireless networks of nodes for transmitting, forwarding, relaying, bridging, or otherwise communicating wireless messages with the network service 408 through the stationary gateway 714 and over the network 702 in a power-efficient and cost-effective way.

In the illustrated example, the stationary gateway 714 also is configured by the network service 708 to communicate with a designated network of tape nodes, including the secondary or tertiary tape node 760 that is adhered to the inside of a door 762 of a shipping container 764, and is further configured to communicate with the network service 708 over the network 702. In the illustrated example, the shipping container 764 contains a number of parcels labeled or sealed by respective master tape nodes 766 and containing respective assets. The secondary or tertiary tape node 760 communicates with each of the master tape nodes 766 within the shipping container 764 and communicates with the stationary gateway 714. In some examples, each of the master tape nodes 766 includes a low-power wireless communications-interface (e.g., the low-power wireless-communication interface 652, with reference to FIG. 6A), and the secondary or tertiary tape node 760 includes a low-power wireless-communications interface (low-power wireless-communication interfaces 652', 652", with reference to FIGS. 6B-6C) for communicating with the master tape nodes 766 contained within the shipping container 764, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 714. In some examples, either a secondary or tertiary tape node, or both, may be used, depending on whether a high-power wireless-communication interface is necessary for sufficient communication.

In some examples, when the doors of the shipping container 764 are closed, the secondary or tertiary tape node 760 is operable to communicate wirelessly with the master tape nodes 766 contained within the shipping container 764. In some embodiments, both a secondary and a tertiary node are attached to the shipping container 764. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 760 is configured to collect sensor data from master tape nodes 766 and, in some embodiments, process the collected data to generate, for example, statistics from the collected data. When the doors of the shipping container 764 are open, the secondary or tertiary tape node 760 is programmed to detect the door opening (e.g., using a photodetector or an accelerometer component of the secondary or tertiary tape node 760) and, in addition to reporting the door opening event to the network service 708, the secondary or tertiary tape node 760 is further programmed to transmit the collected data and/or the processed data in one or more wireless messages to the stationary gateway 714. The stationary gateway 714, in turn, is operable to transmit the wireless messages received from the secondary or tertiary tape node 760 to the network service 708 over the network 702. Alternatively, in some examples, the stationary gateway 714 also is operable to perform operations on the data received from the secondary or tertiary tape node 760 with the same type of data produced by the secondary or tertiary tape node 760 based on sensor data collected from the master tape nodes 742-748. In this way, the secondary or tertiary tape node 760 and master tape node 766 create a wireless network of nodes for transmitting, forwarding, relaying, or otherwise communicating wireless messages to, between, or on behalf of the master tape node 766, the secondary or tertiary tape nodes 760, and the network service 708 in a power-efficient and cost-effective way.

In an example of the embodiment shown in FIG. 7, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-6C). The short-range master tape nodes typically are adhered directly to parcels containing assets. In the illustrated example, the master tape nodes 718, 728, 732, 742-748, 766 are short-range tape nodes. The short-range tape nodes typically communicate with a low-power wireless-communication protocol (e.g., Bluetooth LE, Zigbee, or Z-wave). The segment 670 are typically adhered to objects (e.g., a parcel 726 and a shipping container 764) that are associated with multiple parcels that are separated from the medium-range tape nodes by a barrier or a long distance. In the illustrated example, the secondary and/or tertiary tape nodes 724 and 760 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 700.

In the illustrated example, the mobile gateway 712 and the stationary gateway 714 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 712 (e.g., a truck). In these examples, the wireless communications unit 716 may be moved to different locations in the network communications environment 700 to assist in connecting other tape nodes to the wireless communications unit 716. In some examples, the stationary gateway 714 is a tape node that may be attached to a stationary structure (e.g., a wall) in the network communications environment 700 with a known geographic location (e.g., GPS coordinates). In these examples, other tape nodes in the environment may determine their geographic location by querying the stationary gateway 714.

In some examples, in order to conserve power, the tape nodes typically communicate according to a schedule promulgated by the network service 708. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 704, either directly or indirectly through a gateway tape node (e.g., the long-range tape node, such as wireless communication unit 716, adhered to the mobile gateway 712, or a long-range tape node, such as stationary gateway 714, that is adhered to an infrastructure component of the network communications environment 700). In other examples, the master tape node processes the information contained in the received data packets and transmits the processed information to the server 704.

Figure 8:
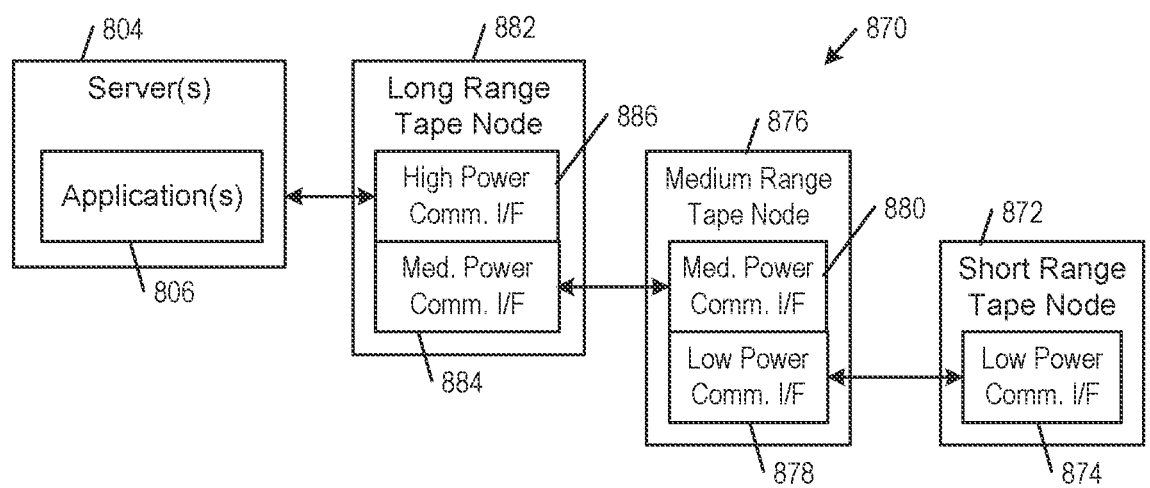
FIG. 8 shows one example hierarchical wireless communications network of tape nodes, in embodiments.

FIG. 8 shows an example hierarchical wireless communications network 870 of tape nodes. In this example, the short-range tape node 872 and the medium range tape node 876 communicate with one another over their respective low power wireless communication interfaces 874, 878. The medium range tape node 876 and the long-range tape node 882 communicate with one another over their respective medium power wireless communication interfaces 880, 884. The long-range tape node 882 and the one or more network service servers 804 (e.g., server(s) 704, FIG. 7) running applications 806 (e.g., application(s) 706, FIG. 7) communicate with one another over the high-power communication interface 884. In some examples, the low power communication interfaces 874, 878 establish wireless communications with one another in accordance with the Bluetooth LE protocol, the medium power communication interfaces 880, 884 establish wireless communications with one another in accordance with the LoRa communications protocol, and the high-power communication interface 886 establishes wireless communications with the one or more network service servers 804 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 804 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 804. The schedule usually dictates all aspects of the communication, including the times when particular tape nodes should communicate, the mode of communication, and the contents of the communication. In one example, the one or more network service servers 804 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 804, either directly or indirectly through a gateway tape node (e.g., the long-range wireless communication unit 716 adhered to the mobile gateway 712 (which could be a vehicle, ship, plane, etc.) or the stationary gateway 714 is a long-range tape node adhered to an infrastructure component of the environment 700). In other examples, the master tape node processes the information contained in the received data packets and transmits the processed information to the one or more network service servers 804/704.

Figure 9:
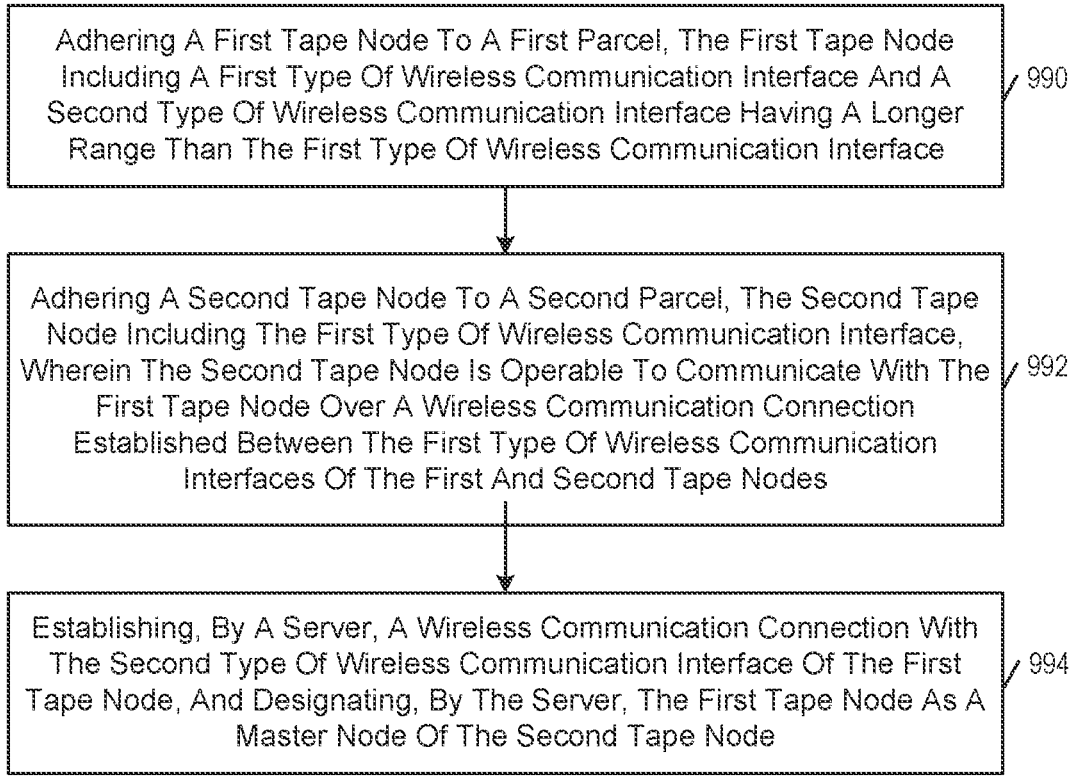
FIG. 9 shows one example method of creating a hierarchical communications network, in embodiments.

FIG. 9 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 9, block 990). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 9, block 992). An application executing on a computer system (e.g., the one or more network service servers 804 of a network service 808) establishes a wireless communication connection with the second type of wireless communication interface of the first tape node, and the application transmits programmatic code executable by the first tape node to function as a master tape node with respect to the second tape node (FIG. 9, block 994).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 10A:
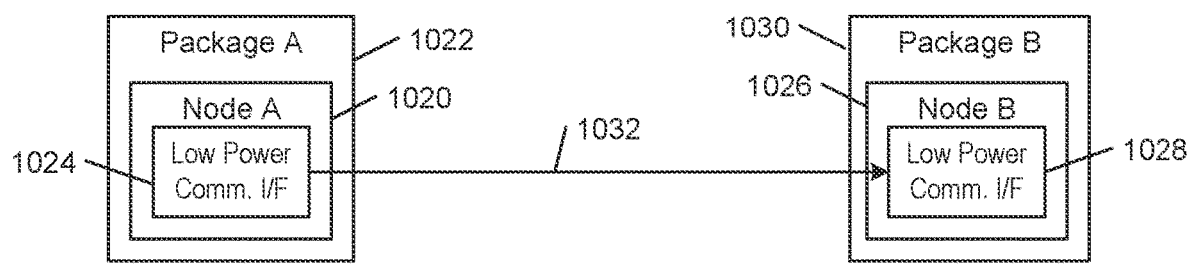
FIGS. 10A and 10B show example communication between tape nodes attached to packages, in embodiments.

Referring to FIG. 10A, a node 1020 (Node A) is associated with a package 1022 (Package A). In some embodiments, the node 1020 may be implemented as a tape node that is used to seal the package 1022 or it may be implemented as a label node that is used to label the package 1022; alternatively, the node 1020 may be implemented as a non-tape node that is inserted within the package 1022 or embedded in or otherwise attached to the interior or exterior of the package 1022. In the illustrated embodiment, the node 1020 includes a low power communications interface 1024 (e.g., a Bluetooth Low Energy communications interface). Another node 1026 (Node B), which is associated with another package 1030 (Package B), is similarly equipped with a compatible low power communications interface 1028 (e.g., a Bluetooth Low Energy communications interface).

In an example scenario, in accordance with the programmatic code stored in its memory, node 1026 (Node B) requires a connection to node 1020 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1020 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1032 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
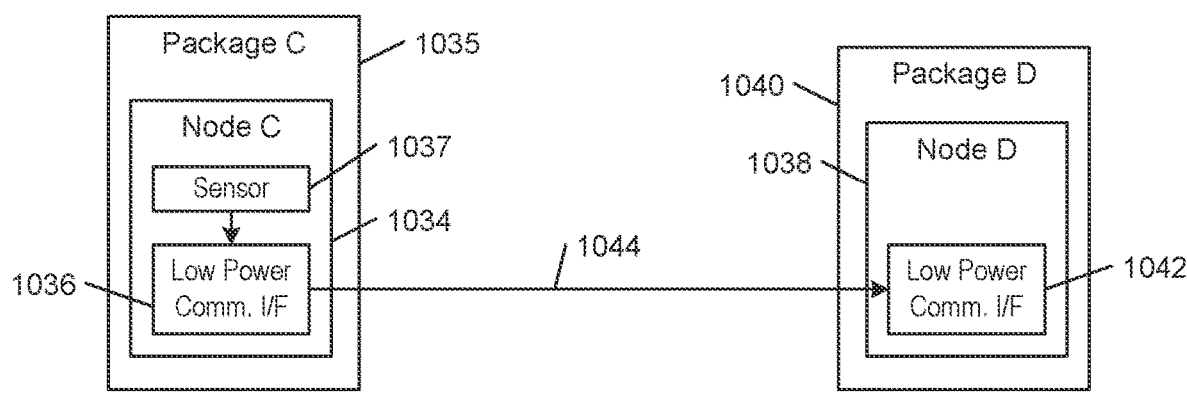

Referring to FIG. 10B, a node 1034 (Node C) is associated with a package 1035 (Package C). In the illustrated embodiment, the Node C includes a low power communications interface 1036 (e.g., a Bluetooth Low Energy communications interface), and a sensor 1037 (e.g., a temperature sensor). Another node 1038 (Node D), which is associated with another package 1040 (Package D), is similarly equipped with a compatible low power communications interface 1042 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1044 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
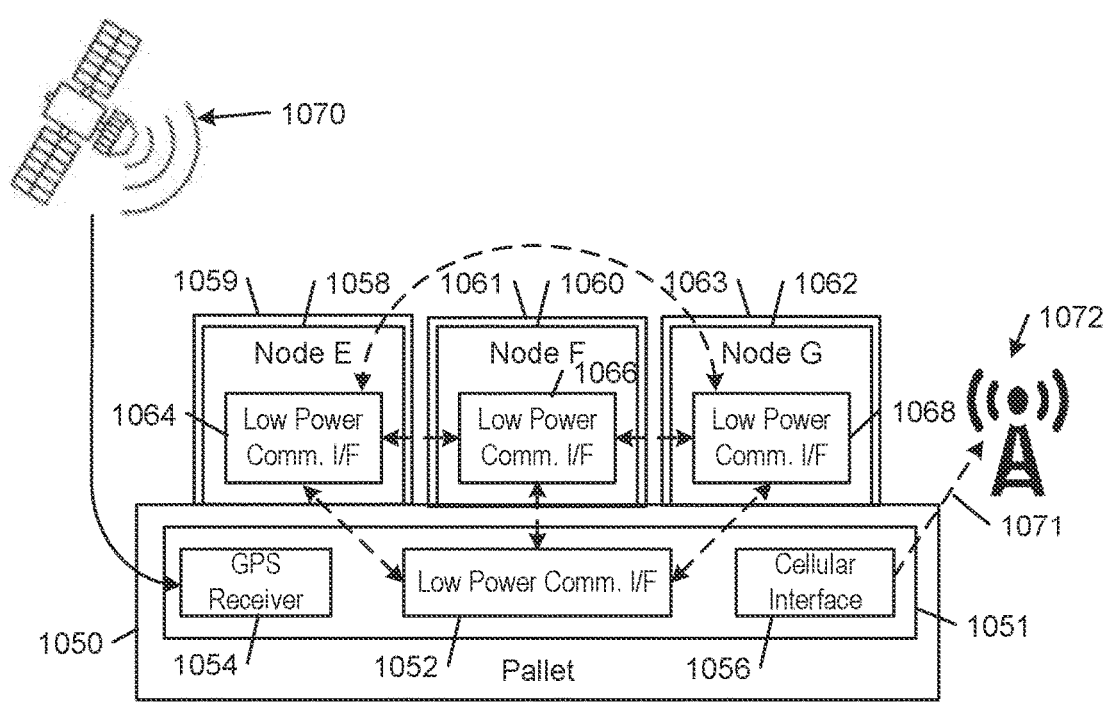
FIG. 10C shows example communication between a tape node attached to a pallet and tape nodes attached to packages on the pallet, in embodiments.

Referring to FIG. 10C, a pallet 1050 is associated with a master node 1051 that includes a low-power communications interface 1052, a GPS receiver 1054, and a cellular communications interface 1056. In some embodiments, the master node 1051 may be implemented as a tape node or a label node that is adhered to the pallet 1050. In other embodiments, the master node 1051 may be implemented as a non-tape node that is inserted within the body of the pallet 1050 or embedded in or otherwise attached to the interior or exterior of the pallet 1050.

The pallet 1050 provides a structure for grouping and containing packages 1059, 1061, 1063 each of which is associated with a respective peripheral node 1058, 1060, 1062 (Node E, Node F, and Node G). Each of the peripheral nodes 1058, 1060, 1062 includes a respective low power communications interface 1064, 1066, 1068 (e.g., Bluetooth Low Energy communications interface). In the illustrated embodiment, each of the nodes E, F, G, and the master node 1051 are connected to each of the other nodes over a respective low power communications path (shown by dashed lines).

In some embodiments, the packages 1059, 1061, 1063 are grouped together because they are related. For example, the packages 1059, 1061, 1063 may share the same shipping itinerary or a portion thereof. In an example scenario, the master pallet node 1051 scans for advertising packets that are broadcasted from the peripheral nodes 1058, 1060, 1062. In some examples, the peripheral nodes broadcast advertising packets during respective scheduled broadcast intervals. The master node 1051 can determine the presence of the packages 1059, 1061, 1063 in the vicinity of the pallet 1050 based on receipt of one or more advertising packets from each of the nodes E, F, and G. In some embodiments, in response to receipt of advertising packets broadcasted by the peripheral nodes 1058, 1060, 1062, the master node 1051 transmits respective requests to the server to associate the master node 1051 and the respective peripheral nodes 1058, 1060, 1062. In some examples, the master tape node requests authorization from the server to associate the master tape node and the peripheral tape nodes. If the corresponding packages 1059, 1061, 1063 are intended to be grouped together (e.g., they share the same itinerary or certain segments of the same itinerary), the server authorizes the master node 1051 to associate the peripheral nodes 1058, 1060, 1062 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1051 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1058, 1060, 1062 include environmental sensors for obtaining information regarding environmental conditions in the vicinity of the associated packages 1059, 1061, 1063. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1051 can determine its own location based on geolocation data transmitted by a satellite-based radio navigation system 1070 (e.g., GPS, GLONASS, and NAVSTAR) and received by the GPS receiver 1054 component of the master node 1051. In an alternative embodiment, the location of the master pallet node 1051 can be determined using cellular based navigation techniques that use mobile communication technologies (e.g., GSM, GPRS, CDMA, etc.) to implement one or more cell-based localization techniques. After the master node 1051 has ascertained its location, the distance of each of the packages 1059, 1061, 1063 from the master node 1051 can be estimated based on the average signal strength of the advertising packets that the master node 1051 receives from the respective peripheral node. The master node 1051 can then transmit its own location and the locations of the package nodes E, F, and G to a server over a cellular interface connection with a cellular network 1072. Other methods of determining the distance of each of the packages 1059, 1061, 1063 from the master node 1051, such as Received Signal-Strength Index (RSSI) based indoor localization techniques, also may be used.

In some embodiments, after determining its own location and the locations of the peripheral nodes, the master node 1051 reports the location data and the collected and optionally processed (e.g., either by the peripheral nodes peripheral nodes 1058, 1060, 1062 or the master node 1051) sensor data to a server over a cellular communication path 1071 on a cellular network 1072.

In some examples, nodes are able to autonomously detect logistics execution errors if packages that are supposed to travel together no longer travel together and raise an alert. For example, a node (e.g., the master node 1051 or one of the peripheral nodes 1058, 1060, 1062) alerts the server when the node determines that a particular package 1059 is being or has already been improperly separated from the group of packages. The node may determine that there has been an improper separation of the particular package 1059 in a variety of ways. For example, the associated peripheral node 1058 that is bound to the particular package 1059 may include an accelerometer that generates a signal in response to movement of the package from the pallet. In accordance with its intelligent agent program code, the associated peripheral node 1058 determines that the master node 1051 has not disassociated the particular package 1059 from the group and therefore broadcasts advertising packets to the master node, which causes the master node 1051 to monitor the average signal strength of the advertising packets and, if the master node 1051 determines that the signal strength is decreasing over time, the master node 1051 will issue an alert either locally (e.g., through a speaker component of the master node 1051) or to the server.

Figure 11:
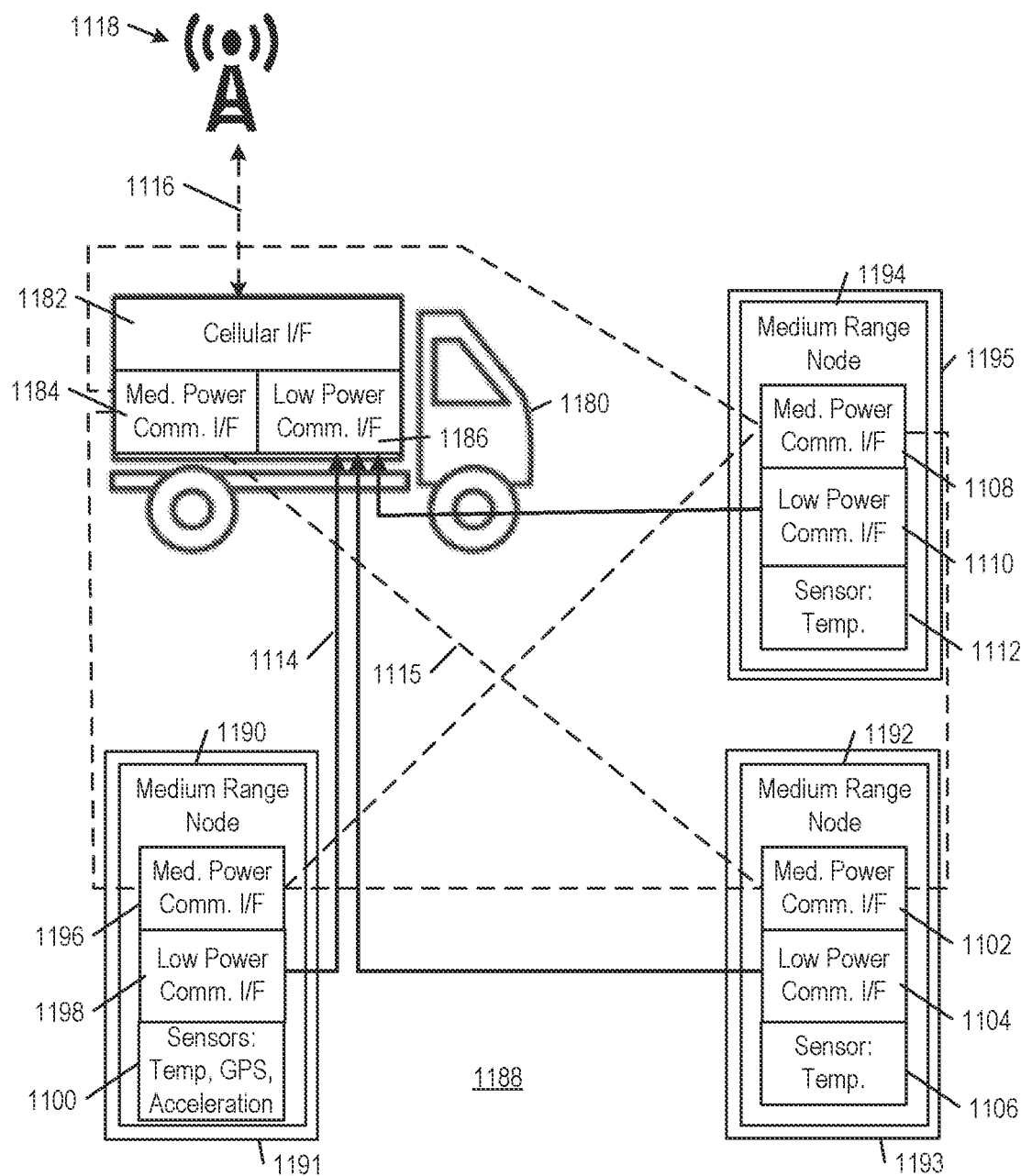
FIG. 11 shows a truck configured as a mobile node, or mobile hub, with a cellular communications interface, a medium-power communications interface, and a low power communications interface, in embodiments.

Referring to FIG. 11, a truck 1180 is configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1194 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1115), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 12:
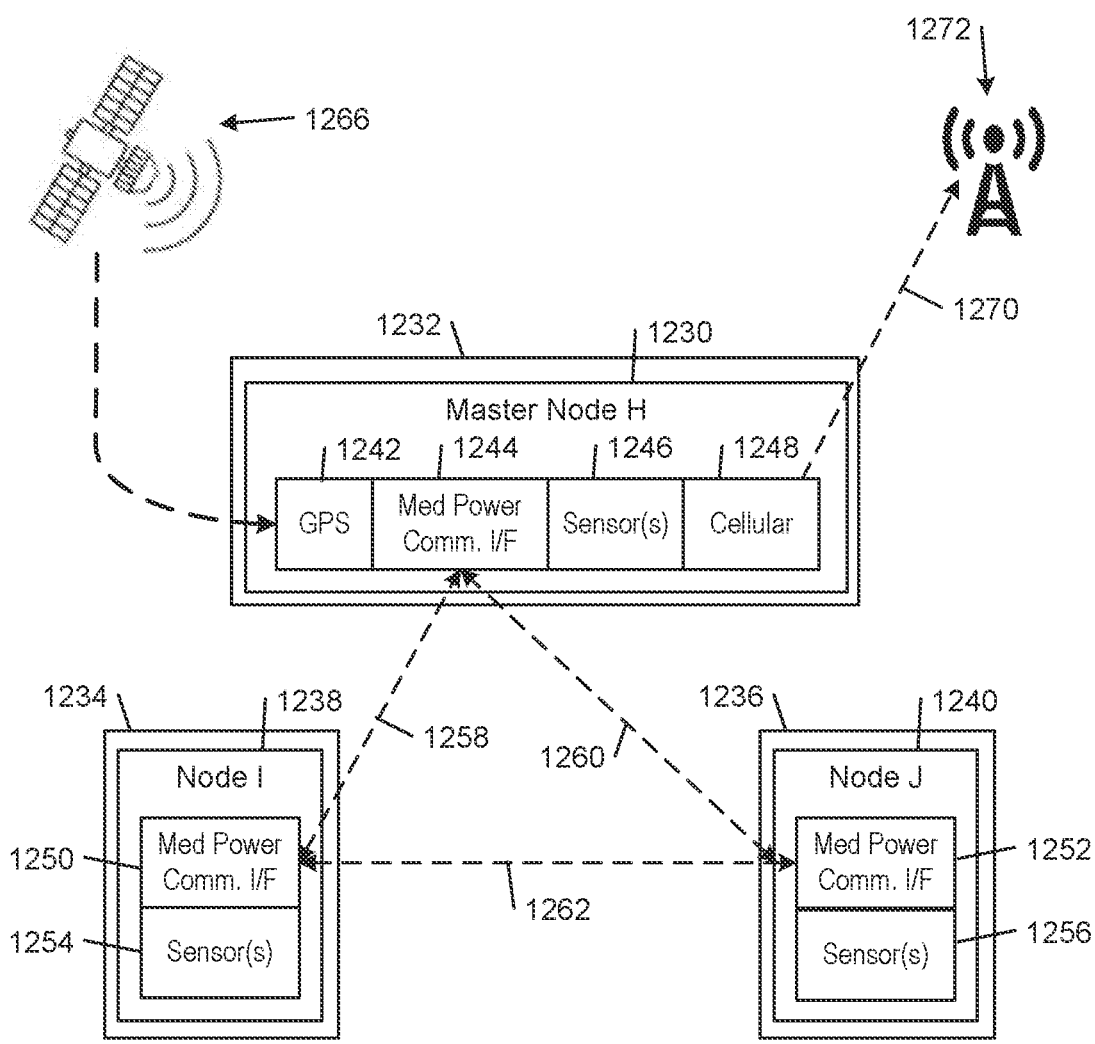
FIG. 12 shows a master node associated with a logistic item that is grouped together with other logistic items associated with peripheral nodes, in embodiments.

Referring to FIG. 12, a master node 1230 is associated with a logistic item 1232 (e.g., a package) and grouped together with other logistic items 1234, 1236 (e.g., packages) that are associated with respective peripheral nodes 1238, 1240. The master node 1230 includes a GPS receiver 1242, a medium power communications interface 1244, one or more sensors 1246, and a cellular communications interface 1248. Each of the peripheral nodes 1238, 1240 includes a respective medium power communications interface 1250, 1252 and one or more respective sensors 1254, 1256. In the illustrated embodiment, the peripheral and master nodes are connected to one another other over respective pairwise communications paths (shown by dashed lines). In some embodiments, the nodes 1230, 1238, 1240 communicate through respective LoRa communications interfaces over LoRa formatted communications paths 1258, 1260, 1262.

In the illustrated embodiment, the master and peripheral nodes 1230, 1238, 1240 include environmental sensors for obtaining information regarding environmental conditions in the vicinity of the associated logistic items 1232, 1234, 1236. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1230 periodically broadcasts advertising packets in the surrounding area. When the peripheral nodes 1238, 1240 are within range of master node 1230, and are operating in a listening mode, the peripheral nodes 1238, 1240 will extract the address of master node 1230 and potentially other information (e.g., security information) from the advertising packets. If, according to their respective programmatic code, the peripheral nodes 1238, 1240 determine that they are authorized to connect to the master node 1230, the peripheral nodes 1238, 1240 will attempt to pair with the master node 1230. In this process, the peripheral nodes 1238, 1240 and the master node 1230 determine each other's identities, capabilities, and services. For example, after successfully establishing a respective communication path 1258, 1260 with each of the peripheral nodes 1238, 1240 (e.g., a LoRa formatted communication path), the master node 1230 determines certain information about the peripheral nodes 1238, 1240, such as their identity information (e.g., peripheral nodes), their capabilities (e.g., measuring temperature data), and their services include transmitting temperature data to other nodes.

After establishing LoRa formatted communications paths 1258, 1260 with the peripheral nodes 1238, 1240, the master node 1230 transmits requests for the peripheral nodes 1238, 1240 to transmit their measured and/or locally processed temperature data to the master node 1230.

In the illustrated embodiment, the master node 1230 can determine its own location based on geolocation data transmitted by a satellite-based radio navigation system 1266 (e.g., GPS, GLONASS, and NAVSTAR) and received by the GPS receiver 1242 component of the master node 1230. In an alternative embodiment, the location of the master node 1230 can be determined using cellular based navigation techniques that use mobile communication technologies (e.g., GSM, GPRS, CDMA, etc.) to implement one or more cell-based localization techniques. After the master node 1230 has ascertained its location, the distance of each of the logistic items 1234, 1236 from the master node 1230 can be estimated based on the average signal strength of the advertising packets that the master node 1230 receives from the respective peripheral node. The master node 1230 can then transmit its own location and the locations of the package nodes H, J, and I to a server over a cellular interface connection with a cellular network 1272. Other methods of determining the distance of each of the logistic items 1234, 1236 from the master node 1230, such as Received Signal-Strength Index (RSSI) based indoor localization techniques, also may be used.

In some embodiments, after determining its own location and the locations of the peripheral nodes, the master node 1230 reports the location data, the collected and optionally processed (e.g., either by the peripheral nodes peripheral nodes 1238, 1240 or the master node 1230) sensor data to a server over a cellular communication path 1270 on a cellular network 1272.

Figure 13A:
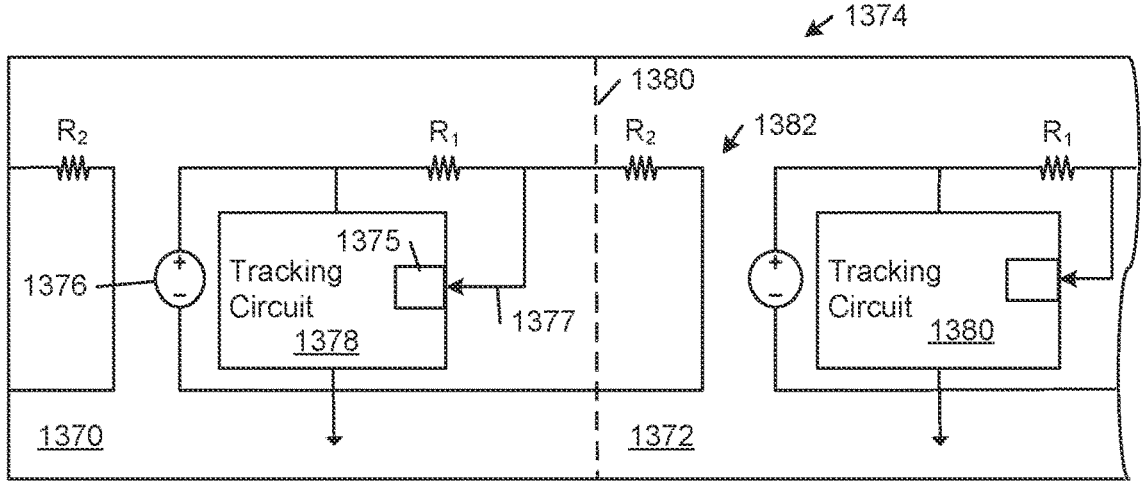
FIGS. 13A and 13B each show one example wake circuit that delivers power to a tracking circuit in response to an event, in embodiments.

Referring to FIG. 13A, in some examples, each of one or more of the segments 1370, 1372 of a tracking adhesive product 1374 includes a respective circuit 1375 that delivers power from the respective energy source 1376 to the respective tracking circuit 1378 (e.g., a processor and one or more wireless communications circuits) in response to an event. In some of these examples, the wake circuit 1375 is configured to transition from an off-state to an on-state when the voltage on the wake node 1377 exceeds a threshold level, at which point the wake circuit transitions to an on-state to power-on the segment 1370. In the illustrated example, this occurs when the user separates the segment from the tracking adhesive product 1374, for example, by cutting across the tracking adhesive product 1374 at a designated location (e.g., along a designated cut-line 1380). In particular, in its initial, un-cut state, a minimal amount of current flows through the resistors R1 and R2. As a result, the voltage on the wake node 1377 remains below the threshold turn-on level. After the user cuts across the tracking adhesive product 1374 along the designated cut-line 1380, the user creates an open circuit in the loop 1382, which pulls the voltage of the wake node above the threshold level and turns on the wake circuit 1375. As a result, the voltage across the energy source 1376 will appear across the tracking circuit 1378 and, thereby, turn on the segment 1370. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 1378 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 13B:
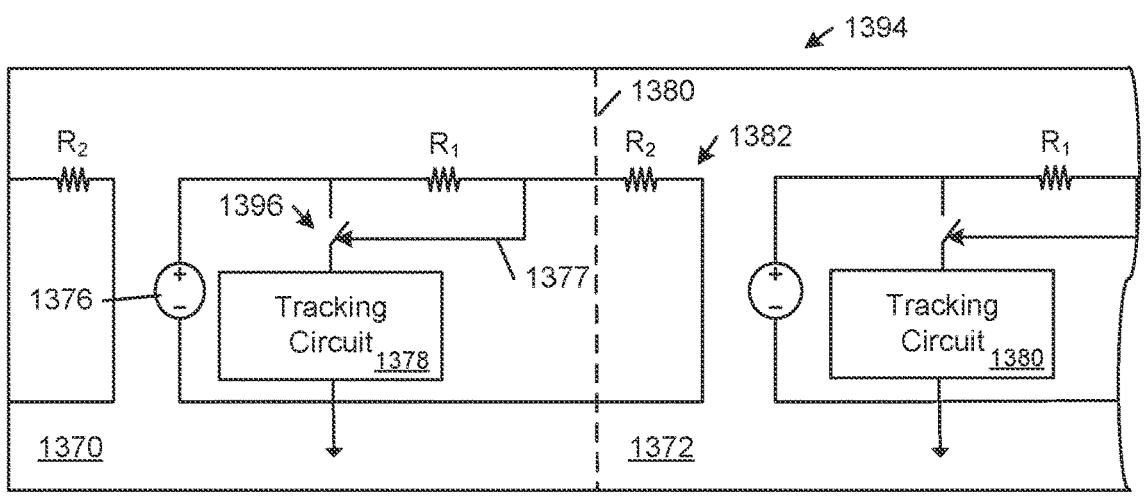

FIG. 13B shows another example of a tracking adhesive product 1394 that delivers power from the respective energy source 1376 to the respective tracking circuit 1378 (e.g., a processor and one or more wireless communications circuits) in response to an event. This example is similar in structure and operation as the tracking adhesive product 1394 shown in FIG. 13A, except that the wake circuit 1375 is replaced by a switch 1396 that is configured to transition from an open state to a closed state when the voltage on the switch node 1377 exceeds a threshold level. In the initial state of the tracking adhesive product 1394, the voltage on the switch node is below the threshold level as a result of the low current level flowing through the resistors R1 and R2. After the user cuts across the tracking adhesive product 1394 along the designated cut-line 1380, the user creates an open circuit in the loop 1382, which pulls up the voltage on the switch node above the threshold level to close the switch 1396 and turn on the tracking circuit 1378.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 13C:
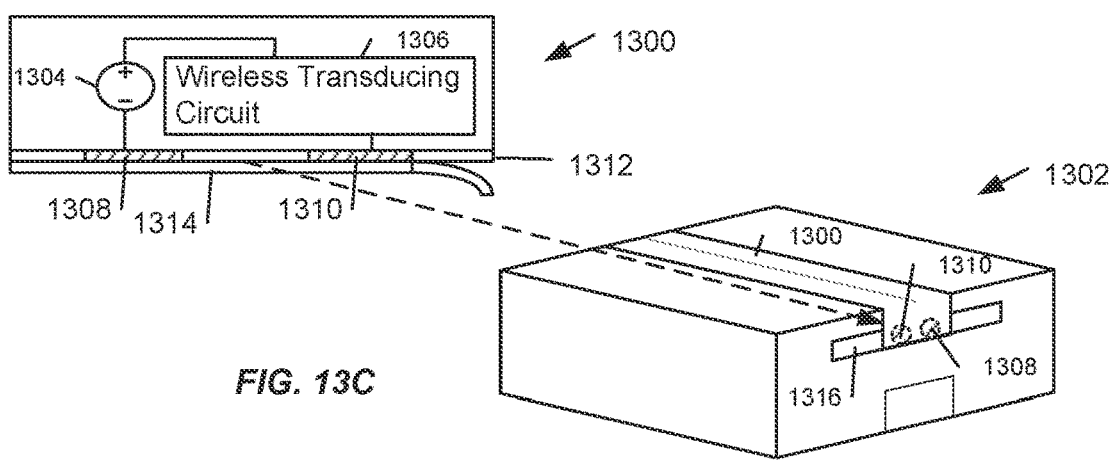
FIG. 13C shows a diagrammatic cross-sectional front view of an example adhesive tape platform and a perspective view of an example asset, in embodiments.

FIG. 13C shows a diagrammatic cross-sectional front view of an example adhesive tape platform 1300 and a perspective view of an example asset 1302. Instead of activating the adhesive tape platform in response to separating a segment of the adhesive tape platform from a roll or a sheet of the adhesive tape platform, this example is configured to supply power from the energy source 1304 to turn on the wireless transducing circuit 1306 in response to establishing an electrical connection between two power terminals 1308, 1310 that are integrated into the adhesive tape platform. In particular, each segment of the adhesive tape platform 1300 includes a respective set of embedded tracking components, an adhesive layer 1312, and an optional backing sheet 1314 with a release coating that prevents the segments from adhering strongly to the backing sheet 1314. In some examples, the power terminals 1308, 1310 are composed of an electrically conductive material (e.g., a metal, such as copper) that may be printed or otherwise patterned and/or deposited on the backside of the adhesive tape platform 1300. In operation, the adhesive tape platform can be activated by removing the backing sheet 1314 and applying the exposed adhesive layer 1312 to a surface that includes an electrically conductive region 1316. In the illustrated embodiment, the electrically conductive region 1316 is disposed on a portion of the asset 1302. When the adhesive backside of the adhesive tape platform 1300 is adhered to the asset with the exposed terminals 1308, 1310 aligned and in contact with the electrically conductive region 1316 on the asset 1302, an electrical connection is created through the electrically conductive region 1316 between the exposed terminals 1308, 1310 that completes the circuit and turns on the wireless transducing circuit 1306. In particular embodiments, the power terminals 1308, 1310 are electrically connected to any respective nodes of the wireless transducing circuit 1306 that would result in the activation of the tracking circuit 1306 in response to the creation of an electrical connection between the power terminals 1308, 1310.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Tracking Belts for Asset Tracking

A tracking device comprises a flexible belt body configured to loop around a portion of an asset. In some embodiments, the asset is a container or support for other objects or items. In further embodiments, the asset is a pallet. The flexible belt body has a first portion and a second portion configured to be connected. For example, the first and second portions may be respective fabric strips of hook-and-loop fasteners. In other examples, the first and second portions may be respective portions of adhesives, buckles, snaps, clasps, buttons, zippers, squeeze buckles, or g-hooks. In other examples, other methods of connecting the first and second portion of the flexible belt body may be used, such that the first and second portion of the flexible belt body may be connected easily and quickly—e.g., within five minutes and without requiring the use of additional tools.

Further, because a container or support may be used over multiple phases of transportation of assets, or may be reused across multiple assets, multiple asset types, and/or under multiple conditions of transportation, the first and second portions of the flexible belt body are configured such that the connection is maintained under stress experienced during one or more phases of standard transport. For example, stress during standard transportation may include vibration or shaking, handling by users or by machinery, changes in temperature (e.g., via refrigeration units), changes in pressure (e.g., transportation via airplane), and the like.

In some embodiments, the flexible belt body is configured to loop around a central portion of the asset. For example, if the asset is a pallet, the flexible belt body is configured to be looped around a center stringer of the pallet. The center stringer may be, for example, a stringer or runner of the pallet. In further embodiments, a stringer or runner of the pallet may comprise a solid or notched beam. In other embodiments, the center stringer may include a block. The center stringer may include a wood material, a metal material, a plastic material, polymer material, a composite material, some other material, or some combination thereof. The pallet may include a plurality of center stringers, according to some embodiments. In other embodiments, the flexible belt body may be looped around other portions of the pallet, e.g., other stringers on the pallet and/or top or bottom deck boards, or may be looped around portions of other equipment, e.g., arms or handles on machinery that may be valuable to track.

The tracking device further comprises electronic components. The electronic components comprise an antenna, a wireless communications system, a processor, and an energy source, wherein each of the electronic components are electrically connected. The electronic components may additionally comprise a non-transitory computer-readable storage medium comprising electronic instructions for operation of the tracking device. In some embodiments, the electronic components further comprise one or more sensors configured to capture sensor data describing an environment of the pallet. The sensors may be, for example, one or more of: a GPS sensor, a capacitive sensor, a pressure sensor, a humidity sensor, a light sensor, a sound sensor, an altimeter, a gyroscope, an accelerometer, a temperature sensor, a flex sensor, and a strain sensor.

In some embodiments, the electronic components are similar or the same as those described in conjunction with FIG. 4, and thus any functionality or component of the "agents" discussed above with respect to FIGS. 1-13C may apply to, and be included in, the following embodiments. In other embodiments, the electronic components may comprise additional, fewer, or different components than those described in FIG. 4, based on, for example, desired functions for the tracking device or environmental conditions under which the tracking device operates.

In some embodiments, one or more of the electronic components are positioned closer to a top surface of the tracking device than to a bottom surface contacting or facing a portion of the pallet, such that the electronic components are oriented away from the portion of the pallet when the first and second portions of the flexible belt body are connected. Because the tracking device is looped around the portion of the pallet, electronic components positioned on a bottom surface of the tracking device risk impacting the portion of the pallet, and the tracking device may be damaged in the process of retrofitting the pallet or during transportation. In some embodiments wherein the flexible belt body is tightly wrapped around a portion of the pallet, electronic components positioned on a bottom surface of the tracking device additionally risk impacting each other. As such, electronic components are positioned on or closer to a top surface of the tracking device when the tracking device is equipped to a pallet and the flexible belt body is connected.

In some embodiments, one or more electronic components are more sensitive or fragile, e.g., trackers, are positioned on the tracking device in a first region of the tracking device. The first region of the tracking device is configured to be positioned towards an interior of the asset when the flexible belt body is wrapped around a portion of the asset, so as to receive protection by structural components of the asset from environmental stress or impacts. More durable electronic components or components that benefit from exposure to the exterior of the asset, e.g., light sensors that may detect more valuable data if exposed to an exterior of the pallet or solar-powered sensors or other components that require exposure to the environment of the asset, are positioned on a second region of the tracking device. The second region of the tracking device is configured to be positioned on or oriented towards an exterior of the asset when the flexible belt body is wrapped around the portion of the asset. For example, if the asset is a pallet, the first region of the tracking device is positioned in or oriented towards an interior section of the pallet, and the second region of the tracking device is positioned or oriented towards the exterior of the pallet when the flexible belt body is wrapped around the center stringer of the pallet.

In some embodiments, the tracking device further comprises a two-dimensional barcode, such as a QR code. The two-dimensional barcode is oriented towards an exterior of the asset when the flexible belt body is looped around the portion of the asset and the first and second portions of the flexible belt body are connected, such that a user of the tracking device is able to access and scan the two-dimensional barcode after installation of the tracking device on the asset. In some embodiments, the tracking device may be initialized responsive to a user of the tracking device scanning a QR code, e.g., using a mobile phone or other client device that transmits an instruction to the tracking device to begin standard operation for deployment into an environment. In other embodiments, the tracking device or the wireless tracking system 400 provides information to a mobile phone or other client device responsive to the mobile phone or client device scanning the QR code, e.g., information describing assets associated with a pallet; a destination or starting location associated with a pallet; historic journeys performed by the pallet; sensor data captured and stored by the tracking device during a journey; and the like. In other embodiments, a barcode, a different kind of two-dimensional barcode, or some other graphical code is used, instead of a QR code.

In some embodiments, the tracking device further comprises one or more graphics, such as illustrations or written instructions, directing a user of the tracking device to position the tracking device on the pallet and to connect the first and second portions of the flexible belt body. For example, the illustrations and written instructions may direct a user of the tracking device to correctly position the first and second portions of the flexible belt body to ensure a secure connection, and/or may direct the user of the tracking device to loop the tracking device around a correct portion of a pallet. In some embodiments, the illustrations and written instructions instruct the user to orient the tracking device such that the first region and the second region are oriented correctly as described above.

A method is further disclosed herein for retrofitting pallets with tracking devices and deploying retrofitted pallets. A tracking device is looped around a portion of a pallet. For example, the tracking device comprises a flexible belt body configured to be looped around a center stringer of a pallet. The flexible belt body comprises a first portion and a second portion, the first and second portions configured to connect, e.g., the first and second portions being respective strips of hook-and-loop fastener. The tracking device is oriented such that a first region of the tracking device is positioned towards an interior of the asset, so as to protect one or more sensitive or fragile electronic components positioned in the first region of the device, and such that a second region of the tracking device is positioned towards an exterior of the asset, so as to expose one or more durable electronic components or components that benefit from exposure to the exterior of the asset, as discussed previously. For example, the tracking device is rotated, twisted, adjusted, or otherwise oriented to correctly position the first and second regions relative to the asset. In some embodiments, the components in the first region of the device are protected from physical damage by portions of the asset by being positioned in the interior where external force or trauma cannot reach the first region. The tracking device is connected via the first and second portions of the flexible belt body. The tracking device is initialized. For example, the tracking device is initialized via a user of the wireless tracking system scanning a QR code or other barcode on the tracking device with a mobile phone or other client device. Responsive to the tracking device being initialized, the retrofitted pallet may be deployed in the environment.

Figure 14:
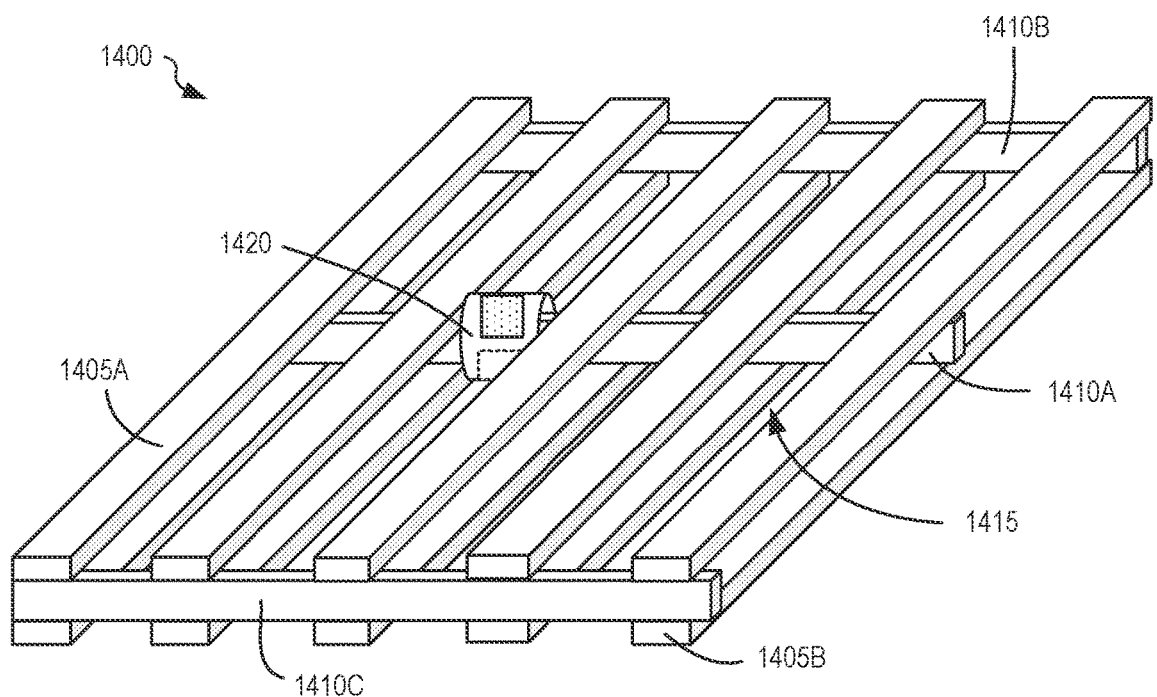
FIG. 14 is a perspective view showing one example smart wireless tracking belt retrofitted to a pallet, in embodiments.

FIG. 14 is a perspective view showing a smart wireless tracking belt 1420, also referred to as a tracking device or tracking belt, retrofitted to a pallet 1400, in accordance with some embodiments. The pallet 1400 has top and bottom sets of deck boards including deck boards 1405A, 1405B (collectively referred to as deck boards 1405) and a set of stringers 1410, including a center stringer 1410A and at least stringers 1410B and 1410C positioned at each side of the pallet. The pallet 1400 may have additional or fewer deck boards 1405 and stringers 1410 than shown in FIG. 14, and the deck boards and stringers may be oriented or shaped differently than shown in FIG. 14. For example, the pallet 1400 may be a plastic pallet wherein the deck boards 1405 are a single, monolithic component, or the pallet may have smaller or larger gaps between the deck boards and/or the stringers 1410. In the example of FIG. 14, smart wireless tracking belt 1420 is looped around the center stringer 1410A of the pallet 1400 and positioned such that electronic components of the tracking device are positioned along a top surface of the tracking device or closer to the top surface than to a bottom surface of the tracking device (where the top surface does not directly contact the center stringer of the pallet).

The pallet 1400 comprises an interior section 1415 and an exterior section. As shown in FIG. 14, an interior section 1415 of the pallet 1400 is defined as a space between the top set of deck boards 1405A, the bottom set of deck boards 1405B, and the stringers 1410B, 1410C at each side of the pallet 1400. Because the interior section 1415 of the pallet 1400 is enclosed by the sets of deck boards 1405 and the stringers 1410B, 1410C, objects within the interior section of the pallet are protected from exposure to, for example, physical damage during transportation. In contrast, an exterior of the pallet 1400 is represented by one or more exposed portions of the pallet, e.g., the tops of the top set of deck boards 1405A, the bottoms of the bottom set of deck boards 1405B, and the exterior faces of the stringers 1410B, 1410C at each side of the pallet. Objects placed, adhered, or otherwise attached to the exterior of the pallet 1400 may be exposed to physical damage, as well as other sensory input such as light and audio data.

In other embodiments, the interior section 1415 of a pallet 1400 may be defined as a space between single, monolithic components. In other embodiments, the interior section 1415 of the pallet 1400 may be a subset of the space described in conjunction with FIG. 14, e.g., may be defined as a space between the top and bottom sets of deck boards 1405A, 1405B, stringers 1410B at sides of pallet 1400, and a center stringer 1410A of pallet 1400.

In other embodiments, where smart wireless tracking belt 1420 is associated with an asset, the interior section of an asset may be defined as any protected space in an interior cavity of the asset. Smart wireless tracking belt 1420 is looped around any portion of the asset such that a first region of the tracking device having sensitive components is oriented or positioned towards the protected interior section of the asset, and such that a second region of the tracking device having durable components or components that benefit from exposure to the exterior of the component is oriented or positioned towards an exterior section of the asset. For example, the asset may be a box having an interior, protected section and an exterior section, wherein smart wireless tracking belt 1420 is looped around a handle of the box. In other examples, other types of assets may be used.

Figure 15:
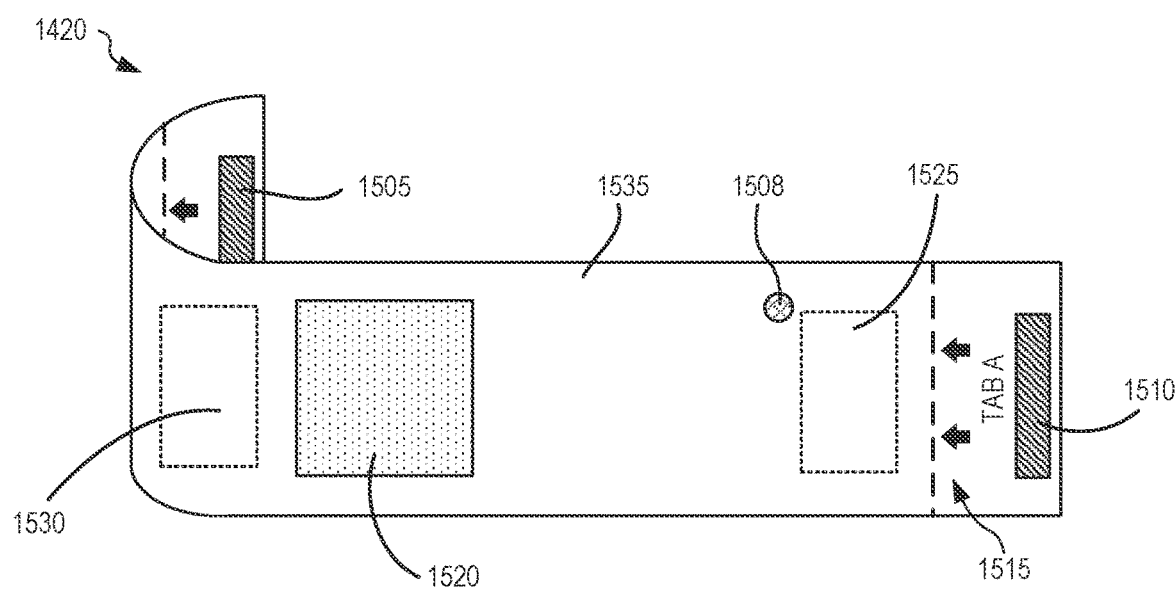
FIG. 15 is a diagrammatic view showing the smart wireless tracking belt of FIG. 14 in further example detail, in embodiments.

FIG. 15 is a diagrammatic view showing smart wireless tracking belt 1420 of FIG. 14 in further example detail, in embodiments. Smart wireless tracking belt 1420 includes a two-dimensional barcode 1520 (e.g., a QR code), electronic components (e.g., wireless transducing circuit 410 of FIG. 4) in a first region 1525, one or more graphics 1515, and a first physical connector 1505 and a second physical connector 1510 that connect together. Advantageously, the smart wireless tracking belt 1420 removably attaches to itself to form a loop. The first and second physical connectors 1505, 1510 may be, for example, respective parts of a hook-and-loop fastener. In other examples, the first and second physical connectors 1505, 1510 may be respective parts of other methods of fastening or connecting the portions, e.g., adhesives, buckles, snaps, clasps, buttons, zippers, squeeze buckles, g-hooks, and the like.

Smart wireless tracking belt 1420 may include a status display 1508 (e.g., an LED) positioned at an outer surface and controlled by the electronic components (e.g., wireless transducing circuit 410) within first region 1525. Although shown position at the outer surface, status display 1508 may alternatively, or simultaneously, be positioned at an inner surface of smart wireless tracking belt 1420 without departing from the scope hereof. In certain embodiments, wireless transducing circuit 410 controls status display 1508 to indicate a status of smart wireless tracking belt 1420 and/or a status of an asset (e.g., pallet 1400) to which smart wireless tracking belt 1420 is attached. In one example, wireless transducing circuit 410 controls status display 1508 to indicate that first and second physical connectors 1505, 1510 have been unfastened or that tampering of smart wireless tracking belt 1420 has been detected. In another example, wireless transducing circuit 410 controls status display 1508 to indicate that smart wireless tracking belt 1420, and thus any asset/pallet to which it is attached, is in not in an intended location, or that it is in a location that it should not be in (e.g., by comparison of an itinerary for the asset assigned to, and being tracked by, the smart wireless tracking belt 1420, and the current location determined by the smart wireless tracking belt 1420). In another example, wireless transducing circuit 410 controls status display 1508 to indicate that smart wireless tracking belt 1420 is out of network communication range, such as when smart wireless tracking belt 1420 cannot make one or more of LoRa, Bluetooth, cellular, satellite, Wi-Fi, or other wireless connection. In another example, wireless transducing circuit 410 controls status display 1508 to indicate that smart wireless tracking belt 1420 has detected mishandling of the asset or pallet, such as when detected movements are outside of a defined tolerance for the asset or pallet, thereby indicating when inspection and/or repair of the asset or pallet is needed. Advantageously, status display 1508 may alert a user when intervention may be necessary.

In some embodiments, smart wireless tracking belt 1420 may comprise multiple sets of electronic components (e.g., multiple wireless transducing circuit 410, or components of wireless transducing circuit 410 divided into multiple sets of components). For example, a first set of electronic components is positioned within smart wireless tracking belt 1420 to have antennae and/or sensors oriented towards an interior of a pallet when smart wireless tracking belt 1420 is attached to pallet 1400, and a second set of electronic components is positioned within smart wireless tracking belt 1420 to have antennae and/or sensors oriented towards an exterior of pallet 1400.

As shown by the example orientation of smart wireless tracking belt 1420 in FIG. 14, the two-dimensional barcode 1520 and the first region 1525 with the electronic components are configured so as to be oriented towards an exterior section of the pallet 1400 when retrofitted to the pallet. Further, smart wireless tracking belt 1420 may be positioned, when retrofitted to pallet 1400, such that the two-dimensional barcode 1520 is accessible from an exterior of the pallet. As described above, smart wireless tracking belt 1420 includes the first region 1525 that may have sensitive electronic components and/or electronic components requiring protection and/or shielding during transportation and a second region 1530 that may have more durable electronic components and/or electronic components that benefit from exposure to an exterior of the pallet 1400 during transportation (e.g., light and/or noise sensors). Smart wireless tracking belt 1420 is constructed such that, when smart wireless tracking belt 1420 is correctly positioned on the pallet 1400, the first region 1525 is oriented towards an interior of the pallet to reduce the likelihood that the electronic components would sustain damage during transportation of the pallet. For example, smart wireless tracking belt 1420 is configured such that it may attach to the asset or the pallet where portions of the asset and/or the pallet 1400 shield the first region 1525 of smart wireless tracking belt 1420 from physical damage. The second region 1530 is oriented towards an exterior of the pallet 1400 so as to enable electronic devices to gather adequate data during transportation. In some embodiments, one or more electronic components of the first region 1525 and the second region 1530 may additionally be positioned along a top surface of the tracking device 1420, so as to avoid direct contact with a central stringer or other portion of the pallet 1400 when positioned on the pallet.

In some embodiments, fragile or sensitive electronic components positioned in the first region 1525 of the tracking device 1420 include one or more of: PCB, memory storage components, communications systems, energy storage components, antennae, and one or more sensors that do not require access to an exterior of the pallet. In some embodiments, the tracking device 1420 further comprises a means of reinforcing the first region 1425 so as to further reduce the likelihood of damaging the fragile or sensitive electronic components. For example, a portion of a substrate layer of the first region 1525 of the tracking device 1420 may be a stiffer substrate material than other regions of the tracking device. In another example, the first region 1525 of the tracking device 1420 may comprise an additional substrate layer or layer of other protective material, wherein the additional substrate layer may or may not be present in other regions of the tracking device. In another example, a protective cover, such as a plastic or plexiglass film, may be applied to the first region 1425 of the tracking device 1420 (e.g., during initialization or prior to deployment). In some embodiments, electronic components positioned in the second region 1530 of the tracking device 1420 include one or more of: solar-powered energy harvesting components, one or more sensors (e.g., light sensors, sound sensors, pressure sensors, temperature sensors) that capture more accurate data when oriented towards an exterior of the pallet, regions of the tracking device having no electronic components, regions of the tracking device comprising only conductive traces, and the like.

As shown in FIGS. 14 and 15, smart wireless tracking belt 1420 has a flexible belt form factor, such that smart wireless tracking belt 1420 may be looped around the center stringer 1410A of the pallet 1400. For example, smart wireless tracking belt 1420 has a flexible belt body 1535 that supports other components of smart wireless tracking belt 1420. In other embodiments, smart wireless tracking belt 1420 may comprise a substantially rigid section (e.g., a stiff or rigid structure including one or more electronic components) affixed to a flexible belt that may be looped around a portion of the asset or the pallet 1400 without impacting the integrity of the rigid section. In other embodiments, smart wireless tracking belt 1420 may have other form factors and/or structures, and the electronic components may be distributed differently across smart wireless tracking belt 1420.

Figure 16A:
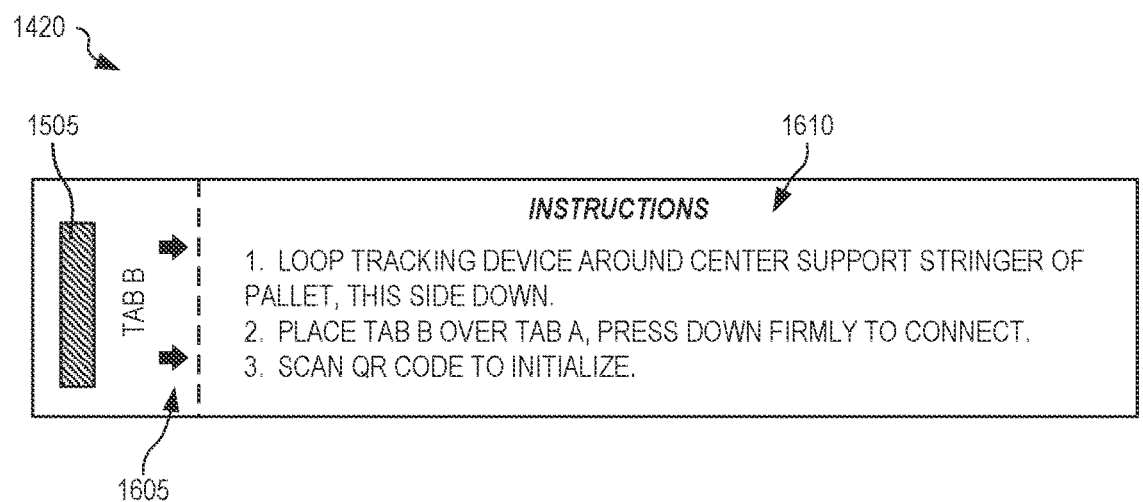
FIGS. 16A-16B are diagrammatic views of the smart wireless tracking belt of FIGS. 14 and 15 showing example graphics that facilitate correct retrofitting of the smart wireless tracking belt onto the asset or the pallet, in embodiments.
Figure 16B:
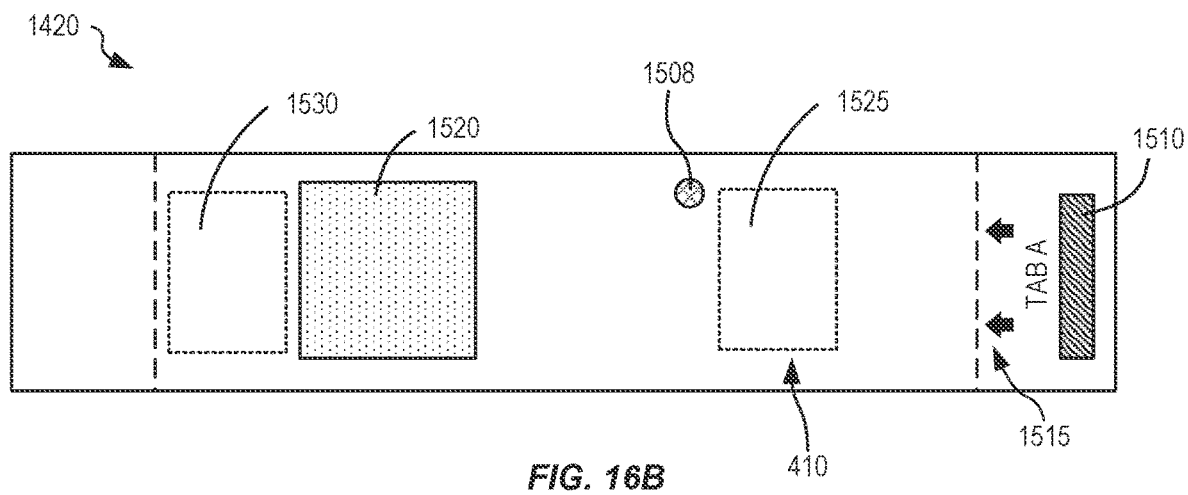

FIGS. 16A-16B are diagrammatic views of smart wireless tracking belt 1420 of FIGS. 14 and 15 showing example graphics that facilitate correct retrofitting of the smart wireless tracking belt onto the asset or the pallet 1400, in accordance with some embodiments. FIG. 16A shows a first side of smart wireless tracking belt 1420 with the first physical connector 1505 configured to connect to a second portion 1510, an illustration 1605 directing a user of the tracking device to make a connection between the first physical connector 1505 ("TAB B") and the second physical connector 1510 ("TAB A"), and written instructions 1610 for retrofitting the pallet 1400 with smart wireless tracking belt 1420 ("Loop tracking device around center stringer of pallet, this side down. Place Tab B over Tab A, press down firmly to connect.") and initializing the tracking device for deployment into an environment ("Scan QR code to initialize").

FIG. 16B shows a second side of smart wireless tracking belt 1420, opposite the first side, with the second physical connector 1510 configured to connect to the first physical connector 1505, graphics 1515 directing a user of the tracking device to make a connection between the first physical connector 1505 ("TAB B") and the second physical connector 1510 ("TAB A"), and the two-dimensional barcode 1520. FIG. 16B also shows the first region 1525 and the second region 1530 that may each include electronic components.

In other embodiments, the first and second sides of smart wireless tracking belt 1420 may include additional, fewer, or different graphics for directing the user of the tracking device to retrofit a pallet with the tracking device and to initialize the tracking device for deployment into an environment. Instructions for initializing the tracking device may include, for example, shaking the tracking device prior to retrofitting the pallet; cutting or tearing a portion of the tracking device; and the like.

Figure 17:
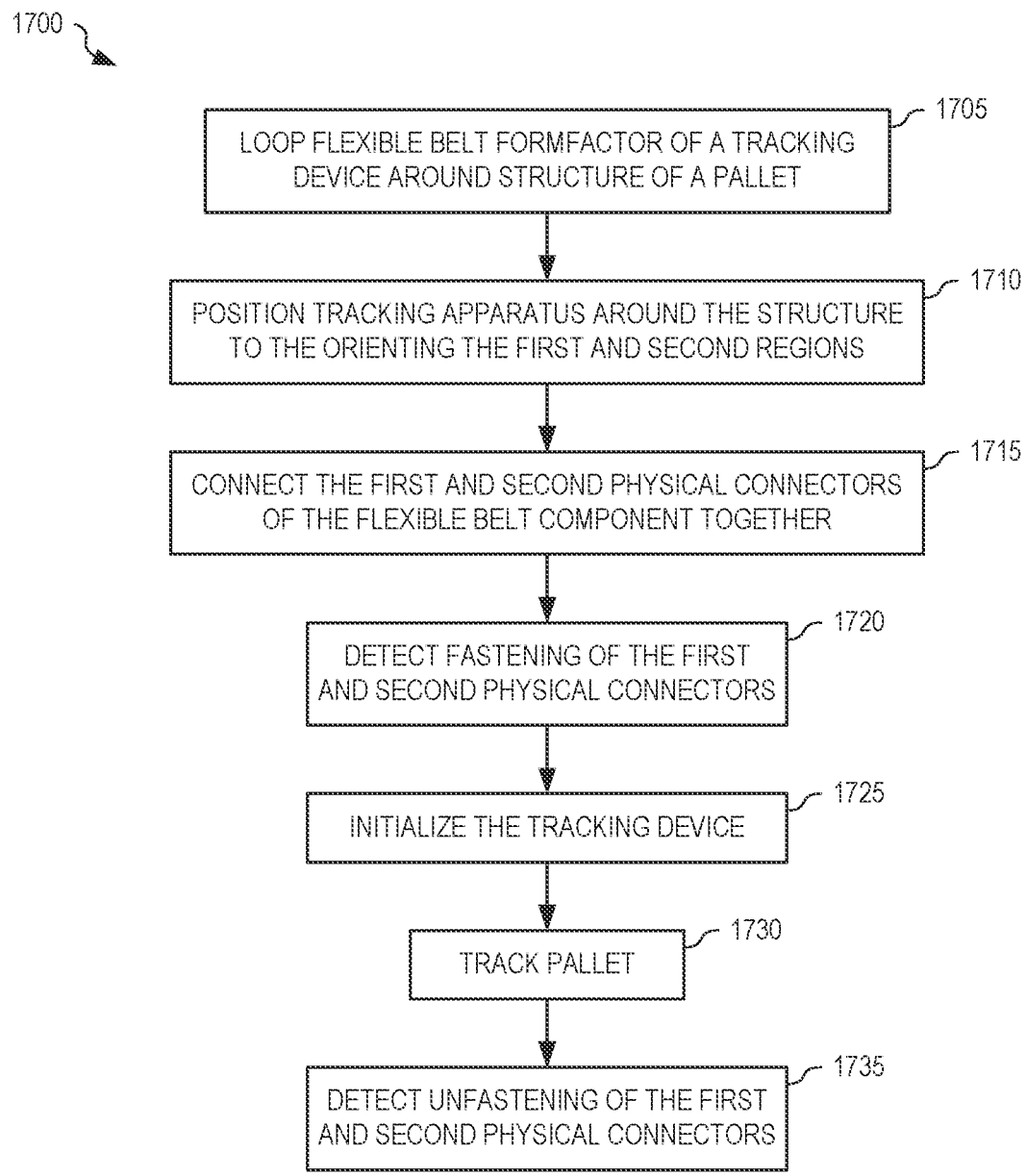
FIG. 17 is a flowchart illustrating one example method for retrofitting and tracking a pallet in an environment, in embodiments.

FIG. 17 is a flowchart illustrating one example method 1700 for retrofitting and tracking a pallet in an environment, in accordance with some embodiments. In block 1705, smart wireless tracking belt 1420 of FIGS. 14, 15, 16A and 16B is looped around a portion of a pallet 1400. The flexible belt form factor of smart wireless tracking belt 1420 allows it to be wrapped around structure of pallet 1400. In block 1710, smart wireless tracking belt 1420 is positioned such that first region 1525 is oriented towards an interior of pallet 1400 and second region 1530 is oriented towards an exterior of pallet 1400. In block 1715, first physical connector 1505 and second physical connector 1510 are connect together. For example, in embodiments wherein the first and second physical connectors 1505 and 1510 are respective parts of a hook-and-loop type fastener, the first and second physical connectors 1505 and 1510 are connected by a user of smart wireless tracking belt 1420 aligning the first physical connector 1505 with the second physical connector 1510 and applying pressure to force the physical connectors 1505 and 1510 together. In other examples, the first and second physical connectors 1505 and 1510 are connected via other methods, such as by via fastening of a buckle or button, applying an adhesive, or by another entity in an environment using an automatic dispenser or application device.

Block 1720 is optional. If included, in block 1720, the smart wireless tracking belt detects that it is fastened. In one example of block 1720, smart wireless tracking belt 1420 detects fastening of the first and second physical connectors 1505 and 1510 together. In one example of block 1720, smart wireless tracking belt 1420 determines that captured vibration data (e.g., from an accelerometer or other sensor of wireless transducing circuit 410) corresponds to fastening of smart wireless tracking belt 1420 to pallet 1400. In certain embodiments, wireless transducing circuit 410 detects coupling of first and second physical connectors 1505 and 1510 together using one or more of electrical signals, magnetic signals, and so on. In certain embodiment, when coupling of first and second physical connectors 1505 and 1510 together is detected, smart wireless tracking belt 1420 causes status display 1508 to indicate (e.g., by temporary illumination or flashing) that smart wireless tracking belt 1420 is secured, and thereby ready to initiate operation.

In block 1725, smart wireless tracking belt 1420 is initialized. In one example of block 1725, a user initializes smart wireless tracking belt 1420 by scanning two-dimensional barcode 1520 of smart wireless tracking belt 1420 using a mobile phone or other client device. Based on the scanned two-dimensional barcode 1520, the mobile phone or other client device wirelessly transmits (e.g., using one or more of Bluetooth, Wi-Fi, NFC, protocols, etc.) an instruction to smart wireless tracking belt 1420 instructing smart wireless tracking belt 1420 to begin a tracking operation. In certain embodiments, smart wireless tracking belt 1420 initiates the tracking operation automatically responsive to detecting fastening of the first and second physical connectors together, in block 1720. In certain embodiments, smart wireless tracking belt 1420 initiates the tracking operation automatically responsive to capturing and analyzing sensor data corresponding to a start of operation. For example, smart wireless tracking belt 1420 may initiate the tracking operation when captured vibration data corresponds to loading of pallet 1400 by a forklift and/or when sensor data corresponds to movement of pallet 1400 by a vehicle (e.g., a truck). In certain embodiment, when tracking operations are initiated, smart wireless tracking belt 1420 may cause status display 1508 to indicate (e.g., by temporarily illumination or flashing) that smart wireless tracking belt 1420 is initiated. In another embodiment, smart wireless tracking belt 1420 initiates the tracking operation in response to receiving an instruction via a gateway node, server, tape node, or other entity of the tracking network (e.g., network communications environment 700 of FIG. 7).

In block 1730, smart wireless tracking belt 1420 tracks movement of pallet 1400. Since pallet 1400 is retrofitted with smart wireless tracking belt 1420, as pallet 1400 is deployed into the environment, movements of pallet 1400 are tracked by smart wireless tracking belt 1420. In certain scenarios, pallet 1400 is deployed with at least one other pallet that is retrofitted with tracing devices. In certain scenarios, not all pallets are retrofitted with a tracking device. Tracking device 1420 may communicate with one or more other tracking devices of the other retrofitted pallets. For example, where multiple pallets are collectively moving to a shared destination, tracking device 1420 of each retrofitted pallet 1400 may communicate during transportation and may cooperate to share (e.g., divide) functions to be performed during the transportation. In certain embodiments, smart wireless tracking belt 1420 is associated with assets being transported on pallet 1400, and/or may receive or access information describing the transportation to be executed, such as an expected destination, functions to be performed during the transportation, an expected timeline of events such as loading and unloading, and the like.

In block 1735, smart wireless tracking belt 1420 detects unfastening of the first and second physical connectors 1505 and 1510. In one embodiment, smart wireless tracking belt 1420 detect movement indicative of unfastening of the first and second physical connectors 1505 and 1510. In other embodiments, smart wireless tracking belt 1420 uses one or more of electrical signals, magnetic signals, and so on, to detect unfastening of the first and second physical connectors 1505 and 1510. In certain embodiment, upon detecting unfastening of the first and second physical connectors 1505 and 1510, smart wireless tracking belt 1420 activates status display 1508, thereby warning of potential tampering and/or unauthorized removal.

In other embodiments, method 1700 may comprise different, fewer, or additional steps than those shown in FIG. 17 and described above, and method 1700 may be performed by one or more entities of a wireless tracking system (e.g., network communications environment 700). Additionally, the blocks described in FIG. 17 may be performed in a different order.

Advantageously, the flexible belt form factor of smart wireless tracking belt 1420 also allows it to attach to an asset to be tracked. Smart wireless tracking belt 1420 may be wrapped and secured around a suitably sized and positioned structural element of the asset or smart wireless tracking belt 1420 may be wrapped and secured around a carrying handle of a case (or similar container) protecting the asset. For example, where the asset has an interior section or cavity forming a protected space between one or more elements of the asset that form an exterior portion, smart wireless tracking belt 1420 may be positioned around one of the elements forming the exterior portion of the asset such that first region 1525 is positioned towards or within the interior section of the asset and the second region 1530 is oriented towards or positioned at the exterior section of the asset.

Figure 18:
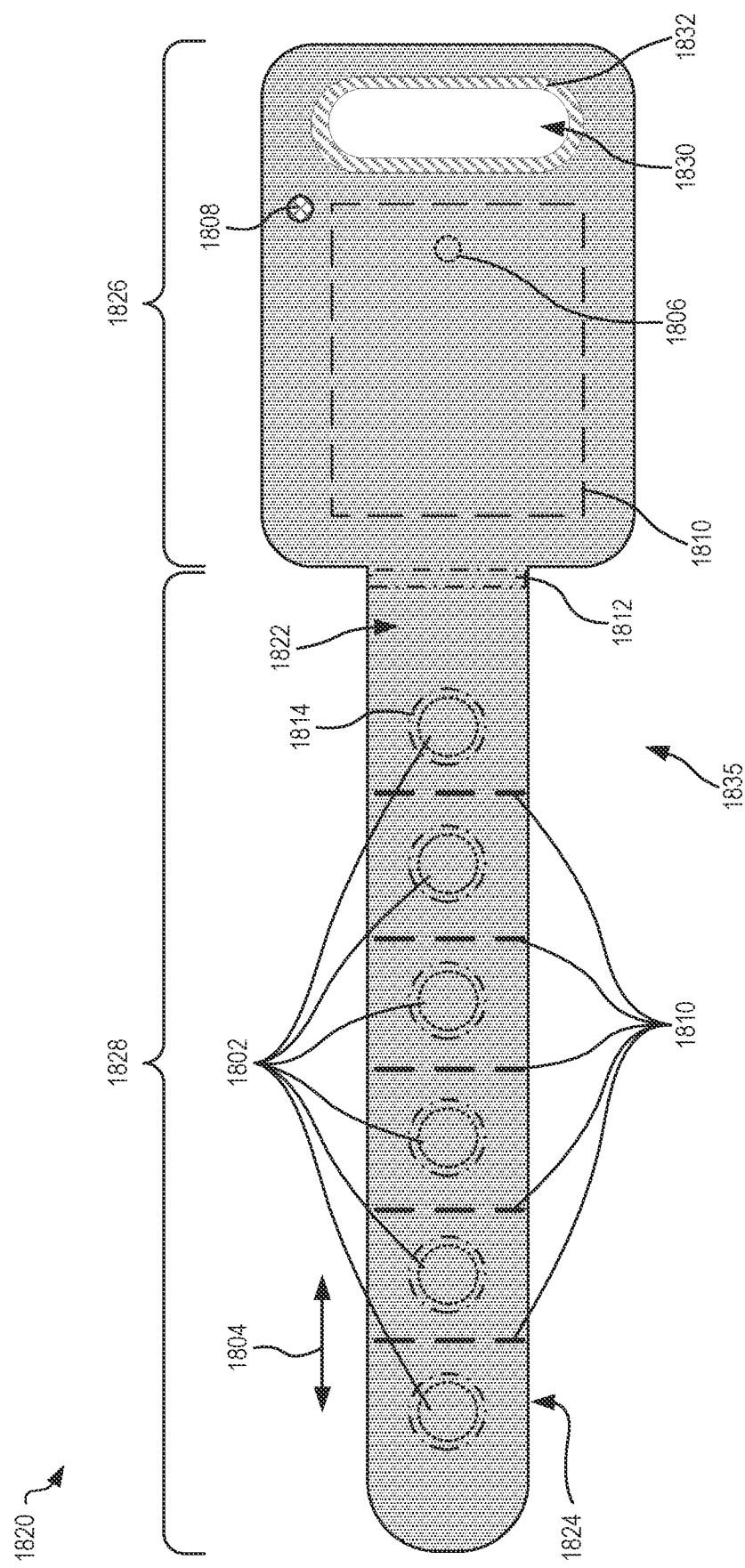
FIG. 18 is a schematic diagram illustrating the outer surface of one example smart wireless tracking belt, in embodiments.
Figure 19:
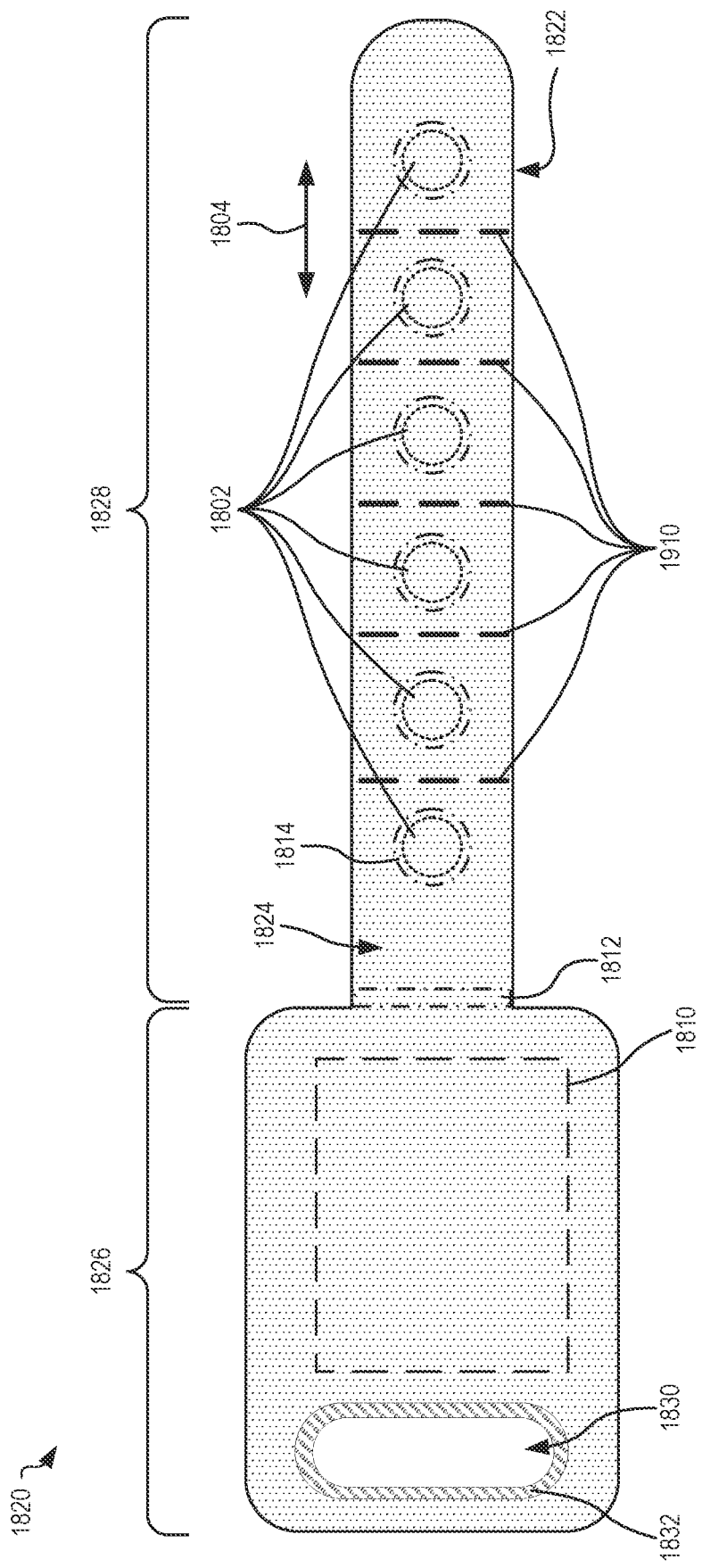
FIG. 19 is a schematic diagram illustrating the inner surface of the smart wireless tracking belt of FIG. 18 in further example detail, in embodiments.

FIG. 18 a schematic diagram illustrating an outer surface 1822 (e.g., top side) of one example smart wireless tracking belt 1820, according to some embodiments. FIG. 19 is a schematic diagram illustrating inner surface 1824 (e.g., bottom side) of smart wireless tracking belt 1820 of FIG. 18 in further example detail. FIGS. 18 and 19 are best viewed together with the following description.

Smart wireless tracking belt 1820 may represent smart wireless tracking belt 1420 of FIGS. 14 and 15 and uses a hook-and-loop type fastener. Smart wireless tracking belt 1820 has a flexible belt body 1835 formed with a head portion 1826 and a tail portion 1828. FIG. 18 shows an outside surface 1822 (e.g., top side) of flexible belt body 1835 formed by a fabric layer with hooks (e.g., the hook part of the hook-and-loop fastener). An inside surface 1824 (e.g., a bottom side) of flexible belt body 1835, opposite outside surface 1822, is formed by a fabric layer with loops (e.g., the loop part of the hook-and-loop fastener). In other embodiments, outside surface 1822 is formed by a fabric layer with loops (e.g., the loop part of the hook-and-loop fastener) and inside surface 1824 (e.g., a bottom side) is formed by a fabric layer with hooks (e.g., the hook part of the hook-and-loop fastener). A head portion 1826 of smart wireless tracking belt 1820 includes a wireless transducing circuit 1810 (e.g., similar to wireless transducing circuit 410 of FIG. 4) between (e.g., within a pocket formed by) the fabrics of outer surface 1822 and inner surface 1824. Tail portion 1828 of smart wireless tracking belt 1820 is narrower than head portion 1826, and head portion 1826 also includes a slot 1830, formed with a grommet 1832, sized to receive tail portion 1828 when smart wireless tracking belt 1820 is attached to an object (e.g., a pallet, an asset, or any other suitable object to be tracked). Smart wireless tracking belt 1820 is flexible and is attached to the object by looping smart wireless tracking belt 1820 around the object, passing tail portion 1828 through slot 1830, and pressing inside surface 1824 of tail portion 1828 to outside surface 1822 of head portion 1826, thereby causing the hook-and-loop fastener to secure (e.g., smart wireless tracking belt 1820 fastens to itself). In certain embodiments, slot 1830 and grommet 1832 may be omitted. In other embodiments, grommet 1832 may be replaced with a buckle (e.g., similar to a belt buckle) that includes at least one prong that may be passed through one of at least one hole within tail portion 1828 to fasten smart wireless tracking belt 1820.

A plurality of permanent magnets 1802 are spaced at intervals 1804 along tail portion 1828 and positioned within (e.g., between outer surface 1822 and inner surface 1824) tail portion 1828. In certain embodiments, magnets 1802 are electromagnets (e.g., a magnetic coil) activated by wireless transducer circuit 1810. In these embodiments, part of the wireless transducer circuit 1810, such as conductive traces or wires, may extend to the tail portion 1828 and connect to the electromagnets. Wireless transducing circuit 1810 includes a magnetic sensor 1806 (e.g., a hall-effect sensor, hall-effect switch, magnetic switch, etc.) positioned at or near outer surface 1822 that detects proximity of at least one of magnets 1802 when smart wireless tracking belt 1820 is closed (e.g., fastened to itself as described above). Accordingly, wireless transducing circuit 1810 uses magnetic sensor 1806 to detect a fastening state (fastened to itself or unfastened) of smart wireless tracking belt 1820. For example, wireless transducing circuit 1810 may read sensor data from magnetic sensor 1806 at intervals and process the sensor data to determine a fastening event when magnetic sensor 1806 detects a magnetic field from one or more of magnets 1802 and detect an unfastening event when magnetic sensor 1806 does not detects a magnetic field from any of magnets 1802. In some embodiments, the wireless transducing circuit 1810 may detect a fastening or unfastening event when magnetic sensor 1806 detects a change in the magnetic field that corresponds to a respective fastening or unfastening event.

Smart wireless tracking belt 1820 may include a status display 1808 (e.g., an LED) positioned at inner surface 1824 and controlled by wireless transducing circuit 1810. Although shown at inner surface 1824, status display 1808 may alternatively, or simultaneously, be positioned at outer surface 1822 without departing from the scope hereof. In certain embodiments, wireless transducing circuit 1810 controls status display 1808 to indicate a status of smart wireless tracking belt 1820. In the example of FIGS. 18 and 19, the status display 1808 includes an LED, but in other embodiments the status display 1808 may include an LED array, a LCD display panel, an LED display, an OLED display, a flexible display panel, one or more micro LEDs, or some other type of display. In some embodiments, the status display 1808 may display information other than a status of the wireless tracking belt 1820.

Advantageously, smart wireless tracking belt 1820 includes a plurality of first cut lines 1810, at intervals along outer surface 1822 of tail portion 1828, and second cut lines 1910, at intervals along inner surface 1824 of tail portion 1828 and aligned with first cut lines 1810, marking locations where a user may cut tail portion 1828 to shorten a length of smart wireless tracking belt 1820. For example, the user may customize the length of smart wireless tracking belt 1820 for an intended application. Cut lines 1810 and 1910 are positioned between magnets 1802 and thereby guide the user where to cut to avoid magnets 1802.

The smart wireless tracking belt may also include a seal 1814 around each magnet to prevent the magnet from falling out of tail portion 1828 when it is cut. Seal 1814 may be formed using one or more of: stitching, an adhesive, a sealed pocket, thermal welding, or some other type of seal and/or material. Head portion 1826 may also include a weatherproof seal 1812 that is positioned to protect wireless transducing circuit 1810 from the elements, such as water, humidity, and/or other traumatic environmental conditions.

Figure 20:
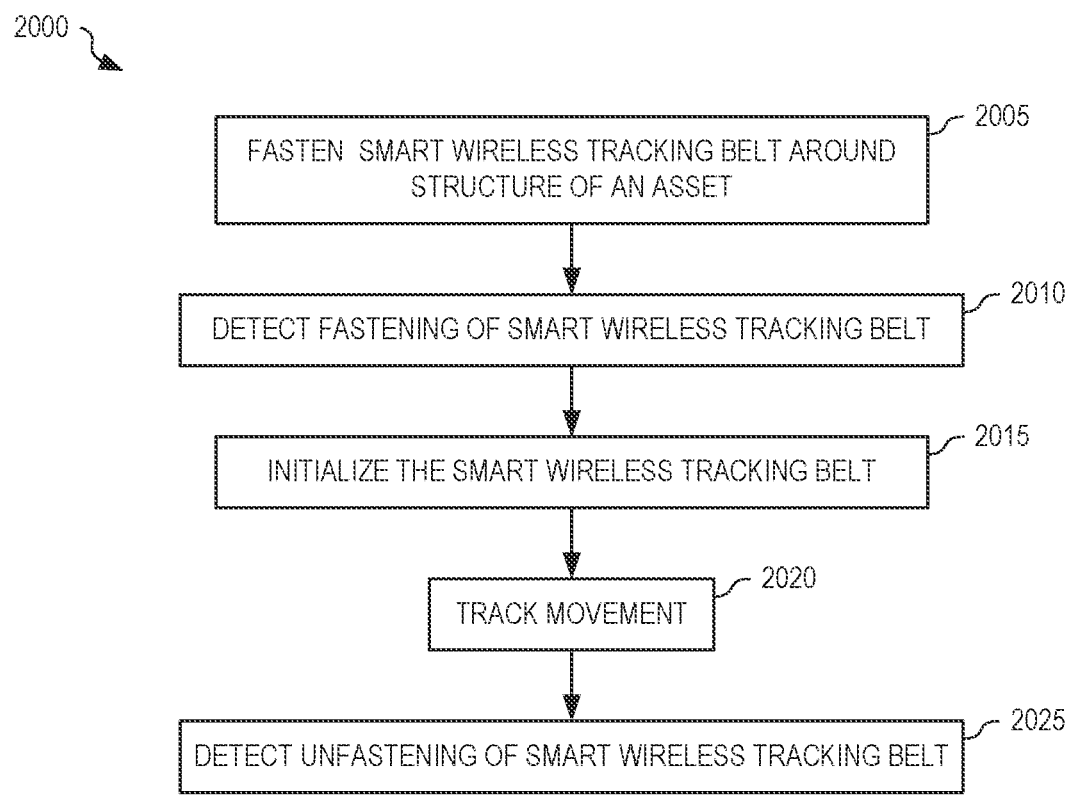
FIG. 20 is a flowchart illustrating one example method for automatically activating a smart wireless tracking belt when attached to an asset, in embodiments.

FIG. 20 is a flowchart illustrating one example method 2000 for automatically activating a smart wireless tracking belt when attached to an asset. Steps 2010 through 2020 of method 2000 are implemented by smart wireless tracking belt 1820 of FIGS. 18 and 19 for example. In block 2005, the smart wireless tracking belt is looped around a portion of an asset and fastened to itself. In one example, the flexible belt form factor of smart wireless tracking belt 1820 allows it to be wrapped around suitable structure of an asset, the tail portion 1828 passed through slot 1830, and pressed against head portion 1826, as described above. In block 2010, fastening of the smart wireless tracking belt is detected. In one example of block 2010, wireless transducing circuit 1810 uses magnetic sensor 1806 to detect a magnetic field of at least one magnet 1802, which is indicative that smart wireless tracking belt 1820 is fastened.

In block 2015, smart wireless tracking belt 1820 is initialized. In one example of block 2015, in response to detecting the fastening of the smart wireless tracking device 1820 in block 2010, smart wireless tracking device 1820 automatically initiates its tracking operation. In block 2020, the smart wireless tracking belt tracks movement. In one example of block 2020, the wireless transducing circuit 1810 starts tracking movement of smart wireless tracking belt 1820, and thereby movement of any asset that it is secured around. In block 2025, unfastening of the smart wireless tracking belt is detected. In one example, wireless transducing circuit 1810 determines, using magnetic sensor 1806, that the magnetic field from magnets 1802 is not detected and thereby determines that the smart wireless tracking belt 1820 has been unfastened. In certain embodiments, when unfastening of the smart wireless tracking belt 1820 is unexpected and/or unauthorized, wireless transducing circuit 1810 activates status display 1808 to indicate the unauthorized removal of smart wireless tracking belt 1820. In certain embodiments when unfastening of the smart wireless tracking belt 1820 is unauthorized, smart wireless tracking belt 1820 may transmit a message indicative of the unfastening to another device (e.g., a server and/or mobile gateway).

In other embodiments, method 2000 may comprise different, fewer, or additional steps than those shown in FIG. 20 and described above, and method 2000 may be performed by one or more entities of a wireless tracking system (e.g., network communications environment 700). Additionally, the blocks described in FIG. 20 may be performed in a different order.

Advantageously, the flexible belt form factor of smart wireless tracking belt 1820 also allows it to attach to an asset to be tracked. Smart wireless tracking belt 1820 may be wrapped and secured around a suitably sized and positioned structural element of the asset or smart wireless tracking belt 1820 may be wrapped and secured around a carrying handle of a case (or similar container) protecting the asset.

Figure 21B:
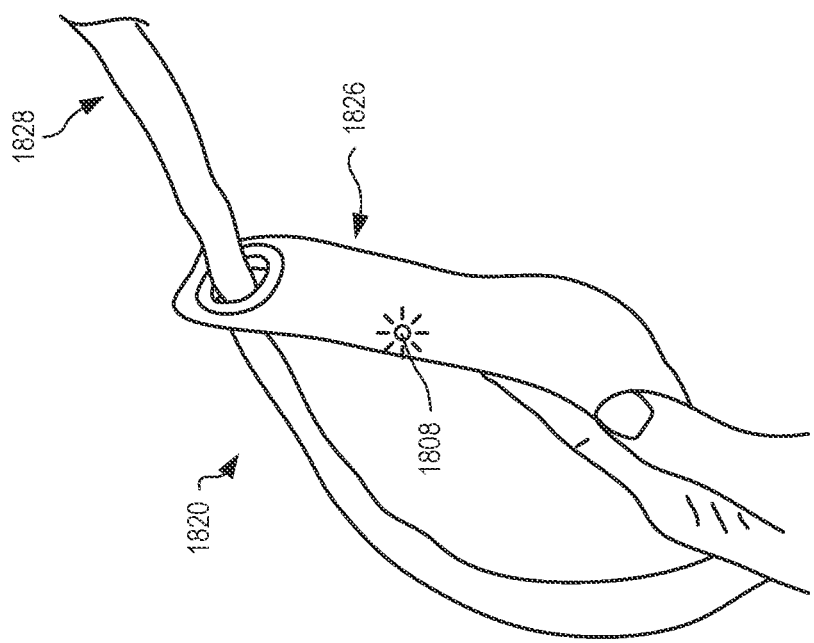
FIG. 21B is a perspective view illustrating the smart wireless tracking belt of FIG. 18 in an unfastened state, in embodiments.
Figure 21A:
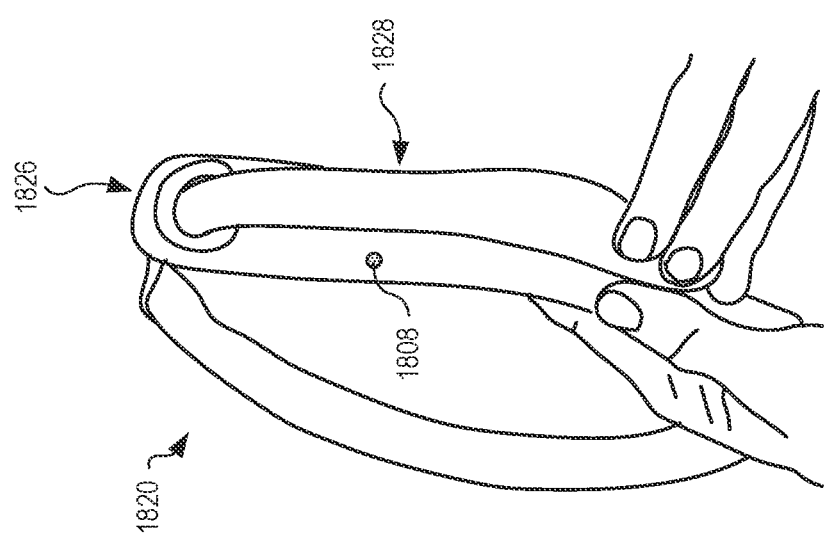
FIG. 21A is a perspective view illustrating the smart wireless tracking belt of FIG. 18 in a fastened state, in embodiments.

FIG. 21A is a perspective view illustrating smart wireless tracking belt 1820 of FIG. 18 in a fastened state and FIG. 21B is a perspective view illustrating smart wireless tracking belt 1820 in an unfastened state. As shown in FIG. 21A, smart wireless tracking belt 1820 is closed (e.g., fastened to itself) such that tail portion 1828 overlaps head portion 1826, whereby wireless transducer circuit 1810, using magnetic sensor 1806, detects a magnetic field from at least one magnet 1802, and thereby determines that smart wireless tracking belt 1820 is closed.

When smart wireless tracking belt 1820 is unfastened, as shown in FIG. 21B, magnetic sensor 1806 does not detect the magnetic field from any of magnets 1802, and wireless transducer circuit 1810 thereby determines that smart wireless tracking belt 1820 is unfastened. In response to detecting a change in the fastened and/or unfastened states, wireless transducer circuit 1810 may control status display 1808 to indicate the change in state, such as by controlling status display 1808 to illuminate or flash corresponding to the detected state change. For example, upon detecting a change from a fastened state to an unfastened state, wireless transducer circuit 1810 may cause status display 1808 to illuminate continuously or to flash. Further, even when refastened, wireless transducer circuit 1810 may maintain illumination of status display 1808 to indicate that smart wireless tracking belt 1820 was unfastened.

Smart wireless tracking belt 1820 may record, within internal memory, each fastening and unfastening event detected with a corresponding tag that include a time and date of the event. Smart wireless tracking belt 1820 may also send a message of the event to a server (e.g., server(s) 704, FIG. 7) of network communication environment 700.

Figure 22:
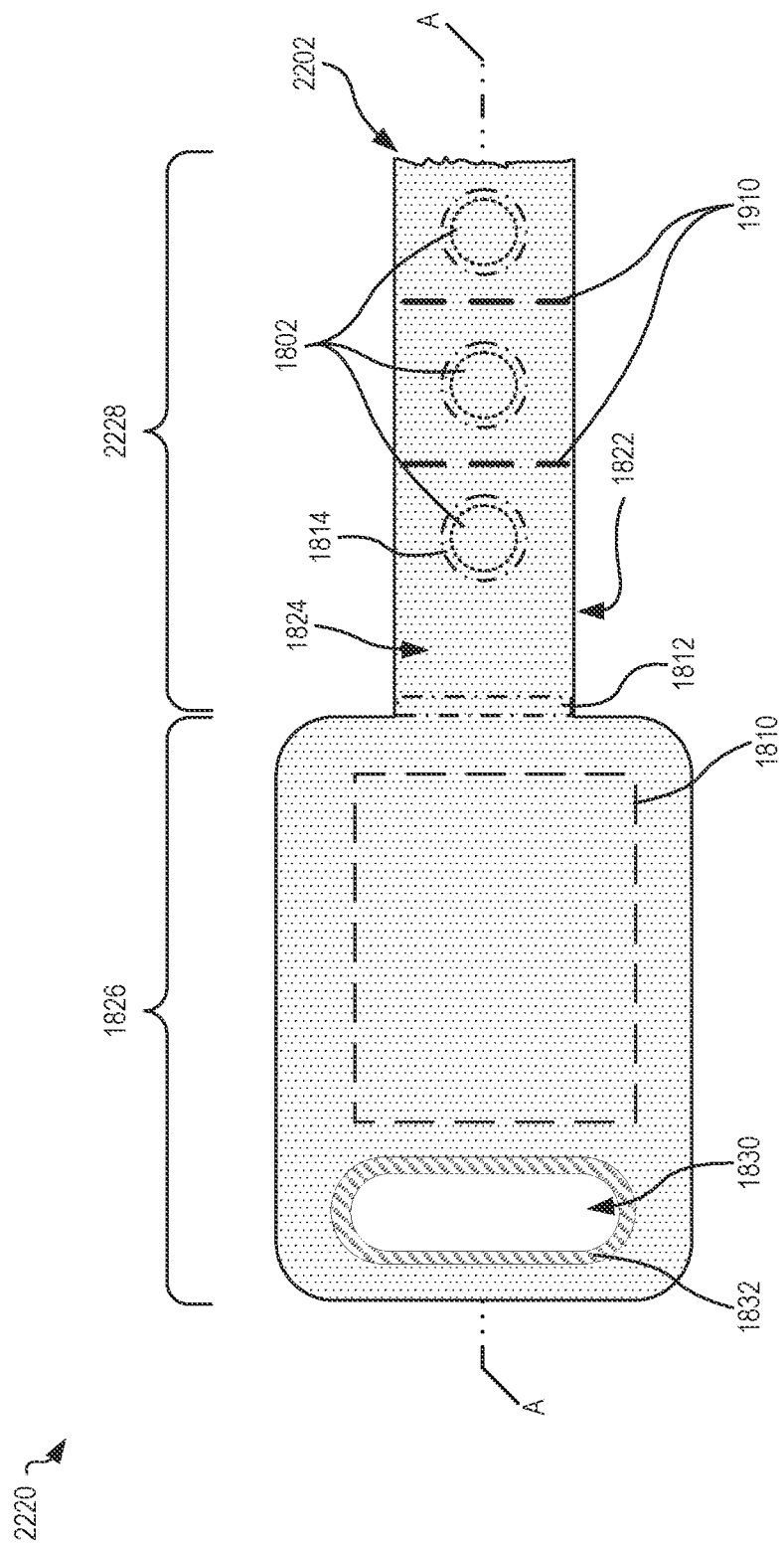
FIG. 22 is a schematic diagram illustrating a cut smart wireless tracking belt that represents the smart wireless tracking belt of FIG. 18 after the tail portion has been cut to shorten a length of the smart wireless tracking belt, in embodiments.

FIG. 22 is a schematic diagram illustrating a cut smart wireless tracking belt 2220 that represents smart wireless tracking belt 1820 of FIG. 18 after tail portion 1828 has been cut, at cut location 2202, to shorten a length of smart wireless tracking belt 2220. Advantageously, smart wireless tracking belt 2220 is still able to detect its fastened and unfastened status after the cut.

Figure 23:
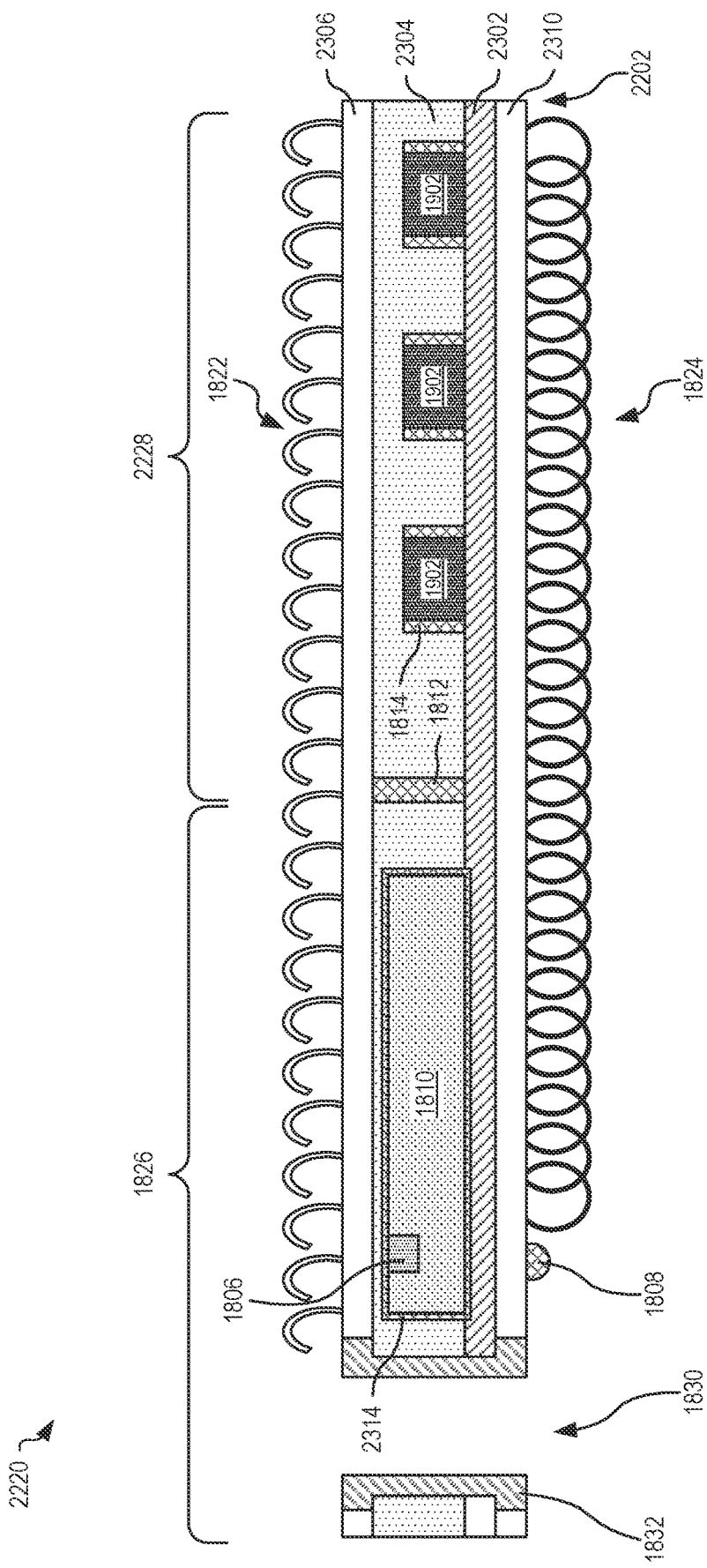
FIG. 23 is a schematic diagram showing a cross-section A-A of the cut smart wireless tracking belt of FIG. 22, illustrating further example detail, in embodiments.

FIG. 23 is a schematic diagram showing a cross-section A-A of cut smart wireless tracking belt 2220 of FIG. 22, illustrating further example detail, according to some embodiments. Smart wireless tracking belt 2220 includes a flexible substrate 2302 supporting wireless transducer circuit 1810 and magnets 1802 and seals 1814 that are covered by a cover layer 2304. Outer surface 1822 is formed by a fabric layer with hooks 2306 and inner surface 1824 is formed by a fabric layer with loops 2310. In certain embodiments, wireless transducer circuit 1810 may be further protected by a weather resistant seal 2314 that substantially surrounds wireless transducer circuit 1810.

Figure 24:
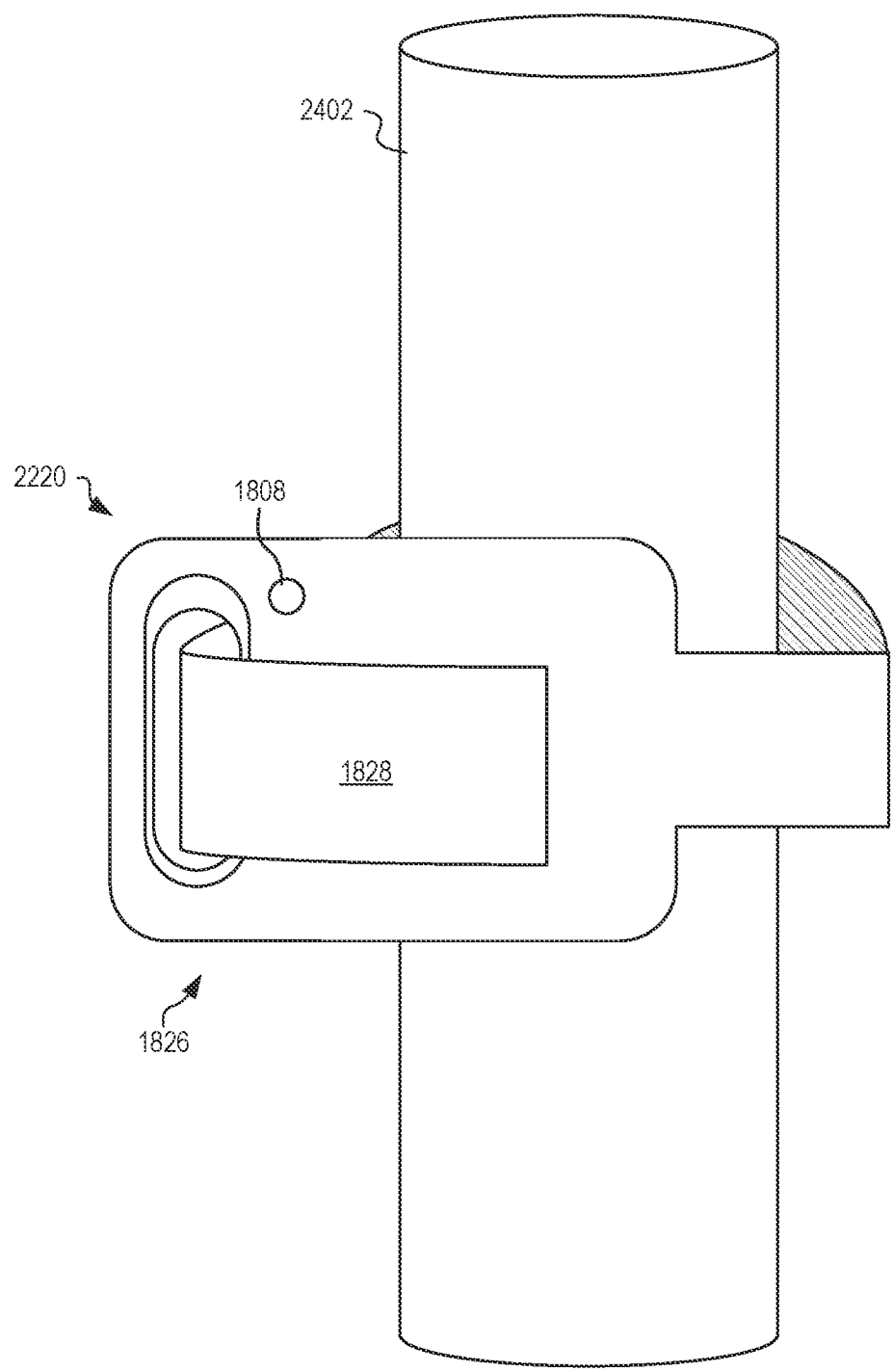
FIG. 24 is perspective view of the cut smart wireless tracking belt of FIG. 22 wrapped around an object and fastened to itself, in embodiments.

FIG. 24 is perspective view of cut smart wireless tracking belt 2220 of FIG. 22 wrapped around an object 2402 and fastened to itself. Advantageously, smart wireless tracking belt 2220 is easily fitted to object 2402 and automatically detects when it is fastened to itself and thereby automatically begins tracking of object 2402.

Lockout/Tagout

The Occupational Safety and Health Administration (OSHA) indicates that 'Lockout/tagout" refers to specific practices and procedures to safeguard employees from the unexpected energization or startup of machinery and equipment, or the release of hazardous energy during service or maintenance activities. This requires, in part, that a designated individual turns off and disconnects the machinery or equipment from its energy source(s) before performing service or maintenance and that the authorized employee(s) either lock or tag the energy-isolating device(s) to prevent the release of hazardous energy and take steps to verify that the energy has been isolated effectively. If the potential exists for the release of hazardous stored energy or for the re-accumulation of stored energy to a hazardous level, the employer must ensure that the employee(s) take steps to prevent injury that may result from the release of the stored energy. Lockout devices hold energy-isolation devices in a safe or "off" position. They provide protection by preventing machines or equipment from becoming energized because they are positive restraints that no one can remove without a key or other unlocking mechanism, or through extraordinary means, such as bolt cutters. Tagout devices, by contrast, are prominent warning devices that an authorized employee fastens to energy-isolating devices to warn employees not to reenergize the machine while he or she services or maintains it. Tagout devices are easier to remove and, by themselves, provide employees with less protection than do lockout devices.'

Figure 25:
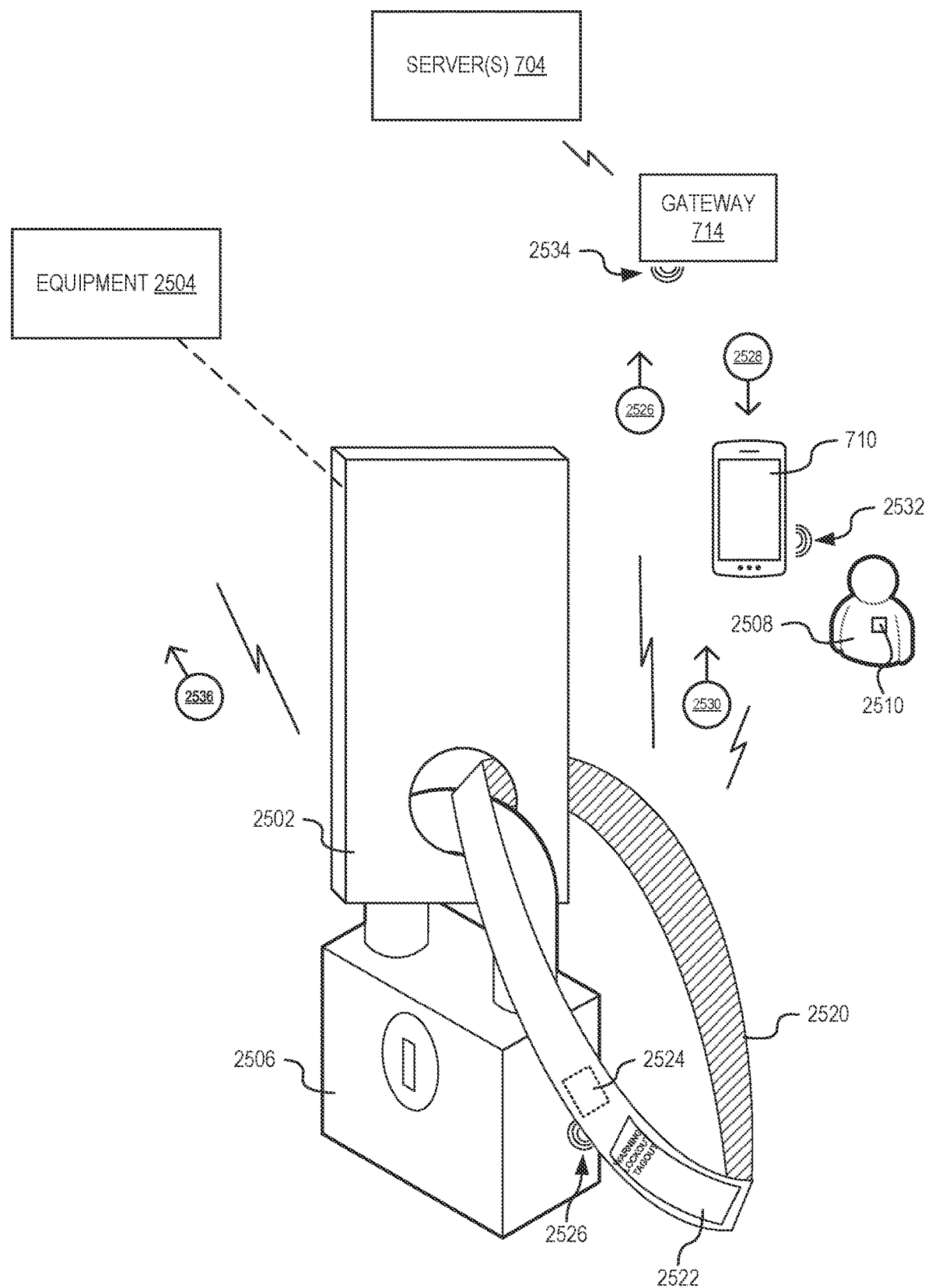
FIG. 25 is a schematic diagram illustrating example use of a smart wireless tracking belt to monitor and/or implement a lockout/tagout protocol, in embodiments.

FIG. 25 is a schematic diagram illustrating example use of a smart wireless tracking belt 2520 to monitor and/or implement a lockout/tagout protocol. Smart wireless tracking belt 2520 may represent smart wireless belt 1820 of FIGS. 18-21B and cut smart wireless belt 2220 of FIGS. 22-24.

A physical lockout control 2502 implements a lockout/tagout of an equipment 2504. For example, equipment 2504 may represent a machine in a factory that is scheduled for maintenance, and physical lockout control 2502 is coupled with a power switch of equipment 2504 that may be physically blocked using a padlock 2506 to prevent inadvertent activation of equipment 2504, as part of an OSHA safety protocol. Other types of physical lockout control 2502 and locking devices may be used without departing from the scope hereof. For example, authorized personnel 2508 (e.g., a service engineer performing the maintenance or an authorized supervisor thereof) applies padlock 2506 when equipment 2504 is deactivated to ensure that equipment 2504 cannot be reactivated by anyone other than authorized personnel 2508 (e.g., the service engineer using a key to unlock padlock 2506 when maintenance is complete and equipment 2504 may be reactivated). Although described for use with the OSHA safety protocol, smart wireless tracking belt 2520 and the described operation may be used without following the OSHA safety protocol and/or without the use of padlock 2506, whereby smart wireless tracking belt 2520 detects manipulation and/or attempted operation of equipment 2504 while such manipulation and/or operation is undesired (e.g., access is restricted). For example, physical lockout control 2502 may represent any physical control lever of equipment 2504, whereby smart wireless tracking belt 2520 detects and reports movement of, or tampering with, physical control lever.

Figure 28:
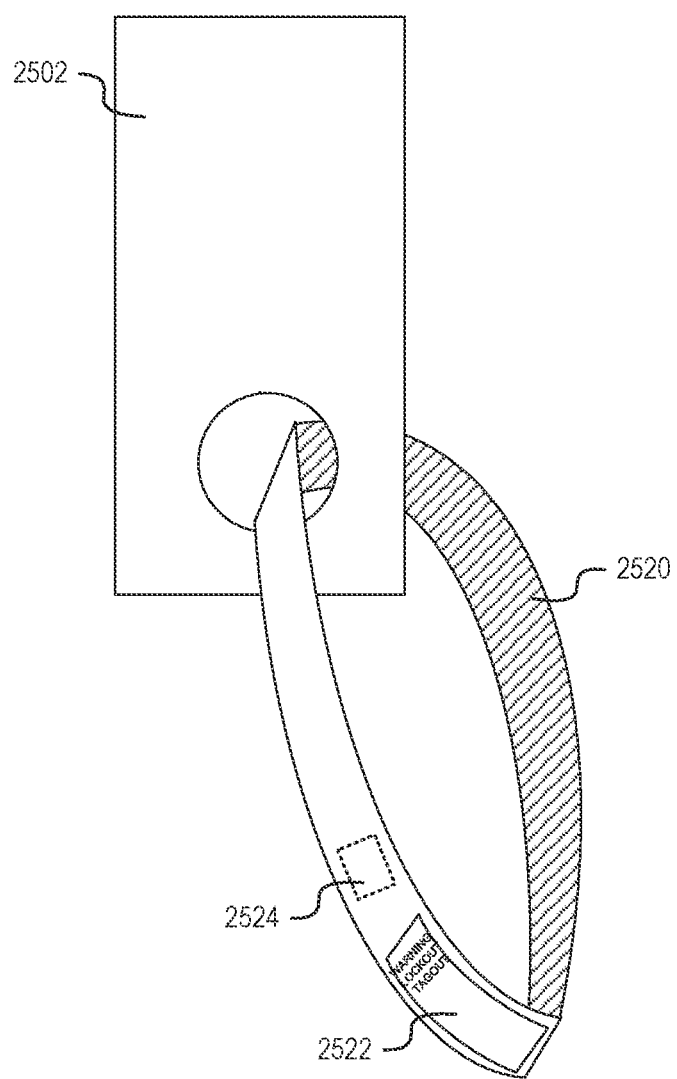
FIG. 28 is a schematic diagram illustrating an alternative scenario where the smart wireless tracking belt of FIG. 25 is looped through physical lockout control, in embodiments.
Figure 29:
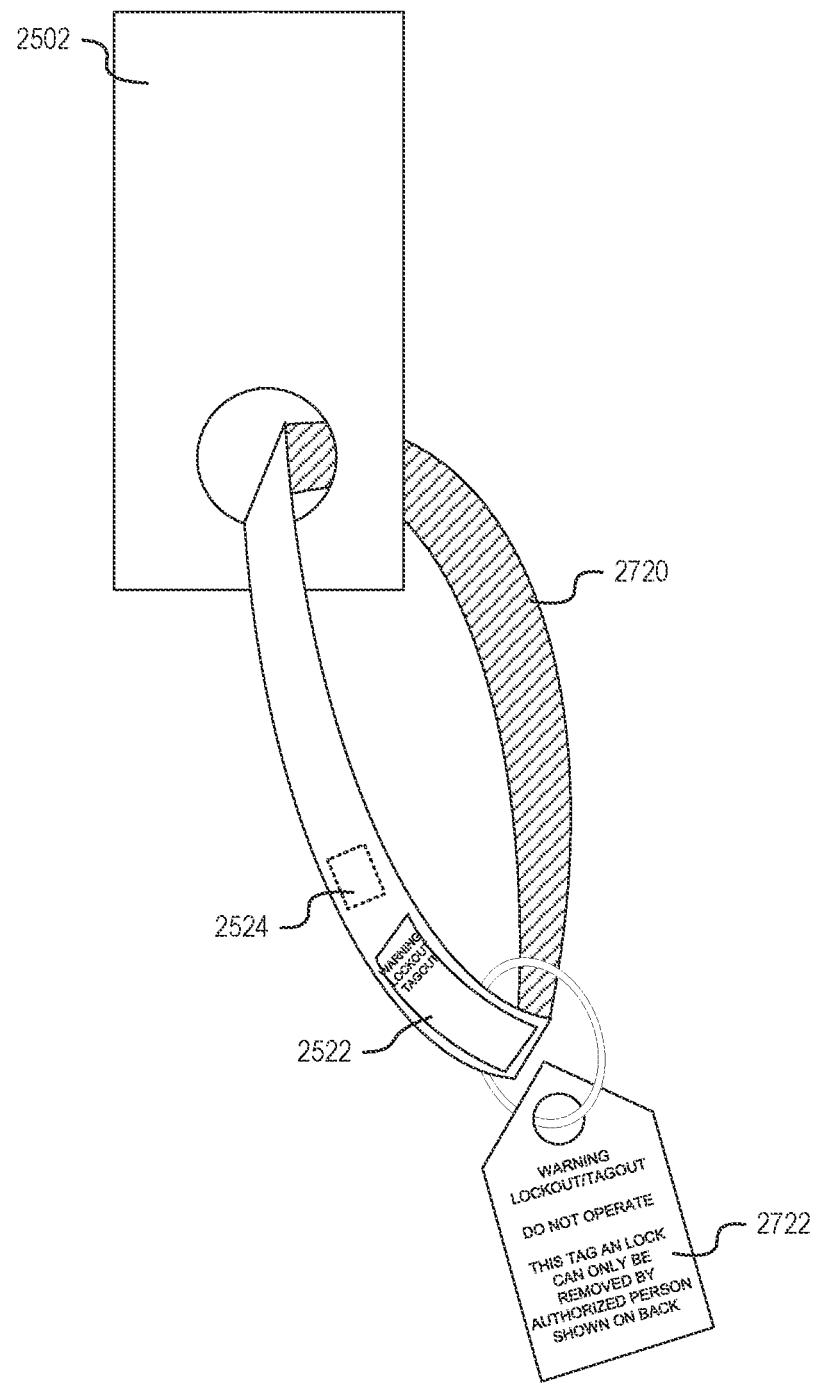
FIG. 29 is a schematic diagram illustrating one alternative scenario where the smart wireless tracking belt of FIG. 27, with an attached warning display, is looped through a physical lockout control, in embodiments.

As shown in FIG. 25, smart wireless tracking belt 2520 is looped through physical lockout control 2502, as is padlock 2506, and fastened on itself as described above. However, as illustrated by FIGS. 28 and 29, smart wireless tracking belt 2520 may operate without padlock 2506. In one example of operation, authorized personnel 2508 uses mobile gateway 710 to assign and/or associate smart wireless tracking belt 2520 with one or both of physical lockout control 2502 and equipment 2504, and then applies smart wireless tracking belt 2520 to physical lockout control 2502 when preparing and securing equipment 2504 for maintenance.

When fastening is detected, smart wireless tracking belt 2520 initiates and reads, at intervals, one or more sensors 2524, including an accelerometer, within smart wireless tracking belt 2520 and processes the accelerometer data to detect a settling period (e.g., 10 seconds) of inactivity (e.g., no movement of smart wireless tracking belt 2520 that indicates that deployment of smart wireless tracking belt 2520 is complete). After detecting the first settling period of inactivity, smart wireless tracking belt 2520 transitions to a monitoring/tampering detect mode, whereby any significant movement detected by sensors 2524 causes smart wireless tracking belt 2520 to transmit a wireless message indicative of detected movement (e.g., caused by tampering with physical lockout control 2502 and/or padlock 2506) to one or both of stationary gateway 714 (see FIG. 7) and/or mobile gateway 710. For example, smart wireless tracking belt 2520 may transmit a notification to server 704 of tracking system 700, either directly using a long range wireless communication system (e.g., cellular or satellite communications) onboard the smart wireless tracking belt or indirectly by transmitting the notification to a gateway node or another wireless node using an onboard short range or medium range wireless communication system (e.g., BLE or LoRa) and the gateway node or other wireless node relays the notification to server 704.

Smart wireless tracking belt 2520 may also include a warning display 2522 that may indicate the purpose of smart wireless tracking belt 2520 being used with the lockout/tagout protocol and may also indicate who is authorized to unfasten and remove smart wireless tracking belt 2520. For example, warning display 2522 may warns unauthorized users not to remove smart wireless tracking belt 2520, and not to change the state of, or operate, equipment 2504. In certain embodiments, warning display 2522 is a message and/or graphics printed on smart tracking device 2520. In other embodiments, warning display 2522 is an electronic display (e.g., an LED, an LED panel, another light emitting element, an electronic paper display, an OLED display, an LCD display, or some other type of display). Warning display 2522 may operate similarly to status display 1808 of FIGS. 18 and 19. In certain embodiments, smart wireless tracking belt 2520 also includes an audio device (e.g., a speaker) for outputting an audio alert 2526 such as an alarm sound and/or a spoken message when smart wireless tracking belt 2520 is moved and/or unfastened.

In certain embodiments, smart wireless tracking belt 2520 transmits wireless message 2526 indicative of detected movement to server(s) 704 via stationary gateway 714, and in response to message 2526 and verifying the assignment and activation of smart wireless tracking belt 2520, server(s) 704 sends an alert 2528 to mobile gateway 710, via stationary gateway 714. Mobile gateway 710 notifies authorized personnel 2508 of potential tampering with physical lockout control 2502 in response to alert 2528. In another example of operation, smart wireless tracking belt 2520 transmits wireless message 2530 indicative of detected movement directly to mobile gateway 710, when in range, or via gateway 714 when mobile gateway 710 is not in range. Advantageously, authorized personnel 2508 is alerted (e.g., via a sound 2532) to a potentially dangerous situation of someone trying to activate equipment 2504 while maintenance is taking place. In certain embodiments, wireless message 2526 may cause gateway 714, when in proximity of equipment 2504, to emit an alarm (e.g., a sound 2534) to warn of unauthorized tampering with physical lockout control 2502.

In certain embodiments, smart wireless tracking belt 2536 transmits wireless message 2536 indicative of detected movement to equipment 2504 (e.g., when equipment 2504 is smart and incudes a wireless receiver), whereby equipment 2504 may initiate further lockout and/or shutdown actions to prevent unwanted operation of equipment 2504.

When padlock 2506 is to be removed (e.g., when maintenance is complete and equipment 2504 may be reactivated), authorized personnel 2508 uses mobile gateway to deactivate smart wireless tracking belt 2520, removes smart wireless tracking belt 2520 after unfastening it, and then unlocks padlock 2506 if used. In certain embodiments, when smart wireless tracking belt 2520 detects proximity of a smart badge (e.g., a wireless enabled badge that transmits a unique ID) and/or a client device (e.g., mobile gateway 710 that transmits a unique ID) that indicates (e.g., based on the unique ID identifying a person authorized to remove smart wireless tracking belt 2520 and/or padlock 2506) authority to remove smart wireless tracking belt 2520 and/or padlock 2506, smart wireless tracking belt 2520 may transition to a deactivated mode, whereby events of the detected movement and/or unfastening are send to server(s) 704 together with the unique ID indicating authorization, and therefore no alarm is generated.

Figure 26:
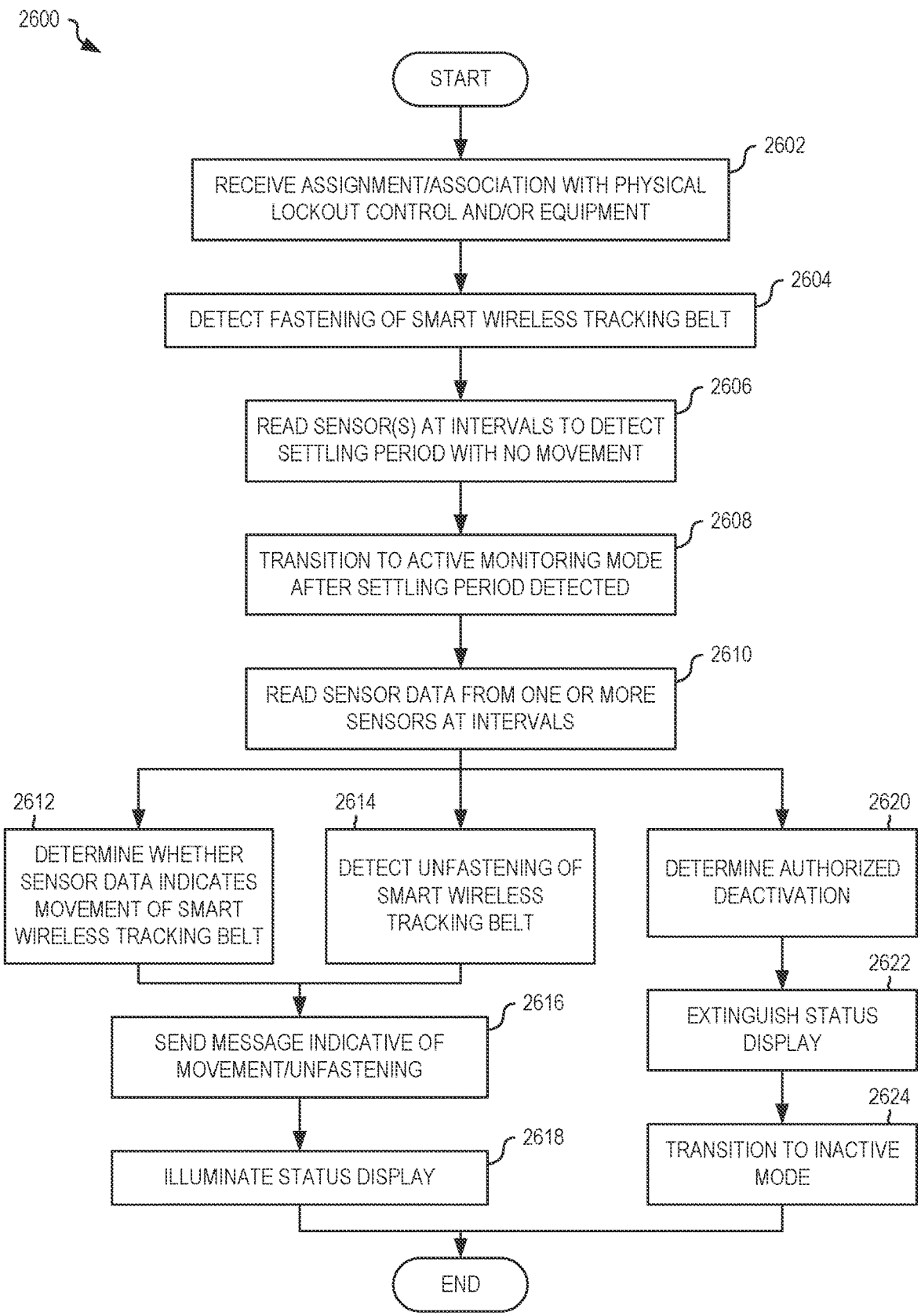
FIG. 26 is a flowchart illustrating one example method for implementing a lockout/tagout protocol using the smart wireless tracking belt of FIG. 25, in embodiments.

FIG. 26 is a flowchart illustrating one example method 2600 for implementing a lockout/tagout protocol using smart wireless tracking belt 2520 of FIG. 25, in embodiments. Method 2600 is implemented, at least in part, by smart wireless tracking belt 2520.

In block 2602, method 2600 received assignment/association with physical lockout control and/or equipment. In one example of block 2602, smart wireless tracking belt 2520 receives a wireless communication associating it with at least one of physical lockout control 2502 and equipment 2504. For example, server(s) 704 may include a database for storing relationships between an ID of smart wireless tracking belt 2520 and an ID of physical lockout control 2502 and/or an ID of equipment 2504.

In block 2604, method 2600 detects fastening of smart wireless tracking belt 2520. In one example of block 2604, wireless transducing circuit 1810, as implemented within smart wireless tracking belt 2520, uses magnetic sensor 1806 to detect a fastening of smart wireless tracking belt 2520. In block 2606, method 2600 reads sensors at intervals to detect a settle period with no movement. In one example of block 2606, smart wireless tracking belt 2520 reads sensors 2524 and processes at least accelerometer data to detect a settling period of 10 seconds of inactivity that indicates deployment of smart wireless tracking belt 2520 is complete. In block 2608, method 2600 transitions to an active monitoring mode after the settling period is detected. In one example of block 2608, smart wireless tracking belt 2520 transitions to an armed mode in which detected movement indicates inadvertent tampering with smart wireless tracking belt 2520 or with padlock 2506. In certain embodiments, in one or both of blocks 2604 and 2608, smart wireless tracking belt 2520 logs the detected event and/or sends a wireless message indicative of a unique ID of smart wireless tracking belt 2520 and/or a current date and time, to server 704 and/or mobile gateway 710, to indicate the transition into the armed mode.

Blocks 2610 through 2618 repeat at intervals to detect movement and unfastening of smart wireless tracking belt 2520. In block 2610, method 2600 reads sensor data from one or more sensors at intervals. In one example of block 2610, smart wireless tracking belt 2520 reads sensor data from sensors 2524 and magnetic sensor 1806 at intervals.

Blocks 2612, 1614 and 1620 may occur substantially in parallel. In block 2612, method 2600 determines whether sensor data captured in step indicates movement of the smart wireless tracking belt. In one example of block 2612, wireless transducing circuit 1810 processes at least accelerometer data of the sensor data read in block 2610 to determine whether smart wireless tracking belt 2520 is being moved. In block 2614, method 2600 detects unfastening of the smart wireless tracking belt. In one example of block 2624, wireless transducing circuit 1810 processes at least sensor data read from magnetic sensor 1806 in block 2610 to determine whether smart wireless tracking belt 2520 is unfastened.

In block 2616, method 2600 sends a message indicating detected movement and/or unfastening. In one example of block 2616, smart wireless tracking belt 2520 sends message 2526, indicative of detected movement with the unique ID of smart wireless tracking belt 2520 and a current date and time, to server 704 via gateway 714. In another example of block 2616, method 2600 sends message 2530, indicating detected unfastening with the unique ID of smart wireless tracking belt 2520 and a current date and time, to mobile gateway 710. In block 2618, method 2600 illuminates the status display. In one example of block 2618, wireless transducing circuit 1810 illuminates status display 1808.

Blocks 2620, 2622, and 2624 are optional and may be omitted in embodiments where smart wireless tracking belt 2520 does not automatically identify authorized movement. If included, in block 2620, method 2600 determines authorized deactivation. In one example of block 2620, smart wireless tracking belt 2520 detects proximity of a smart badge worn by a person moving and/or unfastening smart wireless tracking belt 2520, and/or a client device carried by a person moving and/or unfastening smart wireless tracking belt 2520, receives a unique ID from the smart badge or client device, validates (e.g., within an internal lookup table and/or by communication with server 704) that the unique ID indicates authorization to deactivate smart wireless tracking belt 2520 and/or open padlock 2506. In embodiments where block 2620 is not included, smart wireless tracking belt 2520 may not check for proximity of a smart badge worn by a person when smart wireless tracking belt 2520 is moved. Accordingly, any movement detected by smart wireless tracking belt 2520 is assumed unauthorized.

If included, in block 2622, method 2600 extinguishes status display. In one example of block 2622, smart wireless tracking belt 2520 deactivates status display 1808 if active. In block 2624, method 2600 transitions to an inactive mode. In one example of block 2624, smart wireless tracking belt 2520 transitions to an inactive mode in which smart wireless tracking belt 2520 is not actively detecting motion and/or does not send messages indicative of detected motion. When deactivated, smart wireless tracking belt 2520 may send to server 704 and/or mobile gateway 710, a deactivation message indicating the unique ID of smart wireless tracking belt 2520, the unique ID of the authorized personnel, and a current date and time.

In certain embodiments, block 2620 is invoked by any of block 2612 and 2614 when movement and/or unfastening is detected. Accordingly, when smart wireless tracking belt 2520 is removed by authorized personnel, smart wireless tracking belt 2520 prevents warning messages and/or alerts from being generated and sent.

Advantageously, where multiple smart wireless tracking belts 2520 are deployed, each has its own unique ID, and each smart wireless tracking belt 2520 may be configured to have different, or the same, authorized personnel. For example, each smart wireless tracking belt 2520 may store a set of IDs for authorized personnel, where the set of authorized personnel is different (sets may have overlap) or the same for each smart wireless tracking belt 2520 depending on the situation. In this embodiment, to remove smart wireless tracking belt 2520, such as to allow operation of a piece of equipment, smart wireless tracking belt 2520 may require two operators (e.g., an authorized employee and their supervisor) present such that both IDs are concurrently detected. In further example, to unlock a piece of equipment smart wireless tracking belt 2520 may require that two people of different authority levels (or security access authorization) be present. Such operation may be implemented by one smart wireless tracking belt 2520 that includes a set of two IDs of authorized personnel or may be implemented by deploying two smart wireless tracking belts 2520, where each requires a different one of the two IDs. Where two smart wireless tracking belts 2520 are deployed of different equipment, each may have different requirements for authorization from the other.

Figure 27:
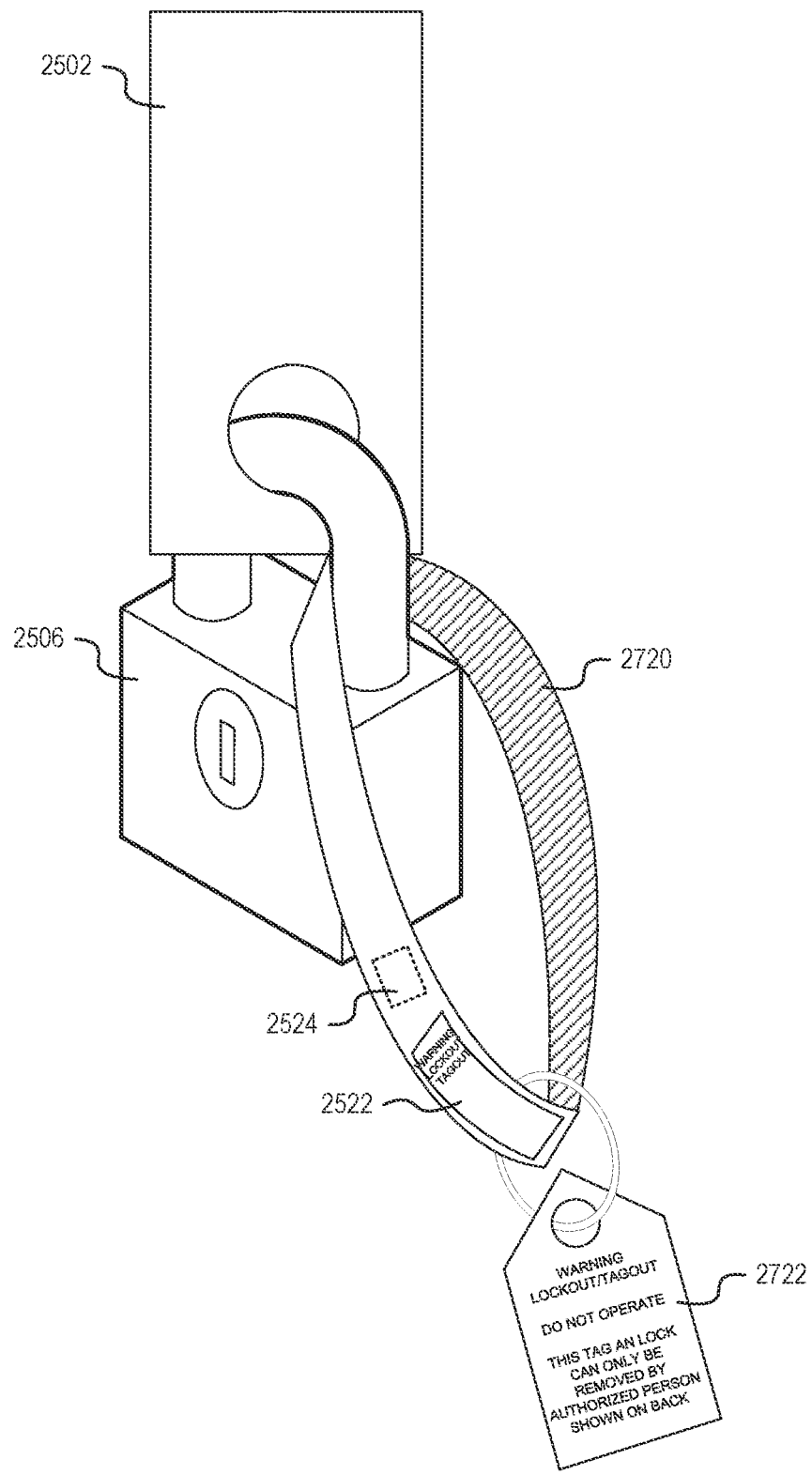
FIG. 27 is a schematic diagram illustrating one example smart wireless tracking belt with an attached warning display, in embodiments.

FIG. 27 is a schematic diagram illustrating one example smart wireless tracking belt 2720 with an attached warning display 2722. Smart wireless tracking belt 2720 is similar to smart wireless tracking belt 2520 of FIG. 25, but excludes built-in warning display 2522, and includes attached warning display 2722, for example, in the form of a tag that conforms to OSHA lockout/tagout regulations. Further, the use of attached warning display 2722 allows smart wireless tracking belt 2520 to be used for different purposes, whereby the appropriate attached warning display 2722 is selected for the intended use. For example, smart wireless tracking belt 2520 may be generic, and a user writes the relevant information (e.g., name of authorized user, time, etc.) on attached warning display 2722 (e.g., a label tag) with pen, marker, or label maker (or digitally using a user device and associated database of tracking tags). After user, attached warning display 2722 may be removed from smart wireless tracking belt 2520. Smart wireless tracking belt 2520 may then be used again with another attached warning display 2722.

FIG. 28 is a schematic diagram illustrating an alternative scenario where smart wireless tracking belt 2520 of FIG. 25 is looped through physical lockout control 2502. In this scenario, smart wireless tracking belt 2520 is used without padlock 2506 and operates to detect movement of physical lockout control 2502 and thereby detect any inadvertent attempt at operating equipment 2504 and/or removal of smart wireless tracking belt 2520 therefrom. That is, use of smart wireless tracking belt 2520 alone detects any inadvertent attempt at activating equipment 2504.

Figure 30:
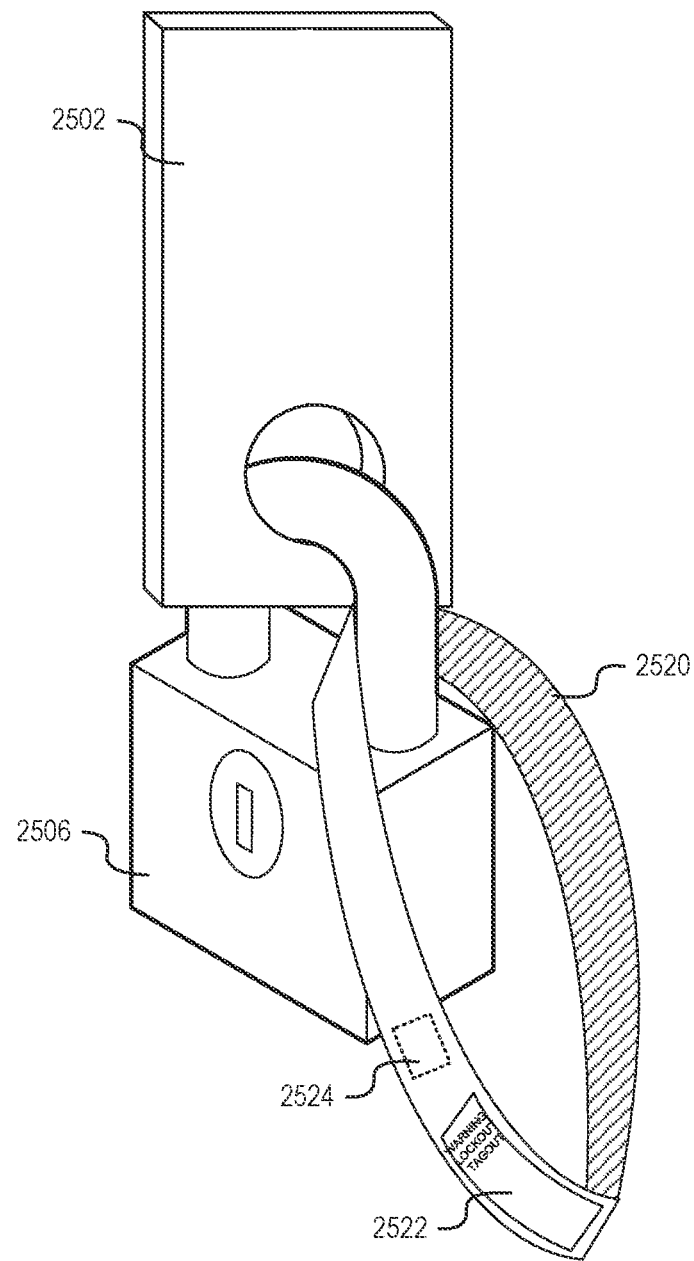
FIG. 30 is a schematic diagram illustrating an alternative scenario where the smart wireless tracking belt of FIG. 25 is looped through a physical lockout control with a padlock, in embodiments.

FIG. 29 is a schematic diagram illustrating one alternative scenario where smart wireless tracking belt 2720 of FIG. 27, with attached warning display 2722, is looped through physical lockout control 2502. In this scenario, smart wireless tracking belt 2720 is used without padlock 2506 and operates to detect movement of physical lockout control 2502 and/or removal of smart wireless tracking belt 2720 therefrom. Smart wireless tracking belt 2720 includes attached warning display 2722, for example, in the form of a tag that conforms to OSHA lockout/tagout regulations FIG. 30 is a schematic diagram illustrating an alternative scenario where smart wireless tracking belt 2520 of FIG. 25 is deployed around the closed shackle of padlock 2506 and fastened on itself as described above. In this embodiment, smart wireless tracking belt 2520 detects movement (e.g., tampering) with padlock 2506.

Figure 31:
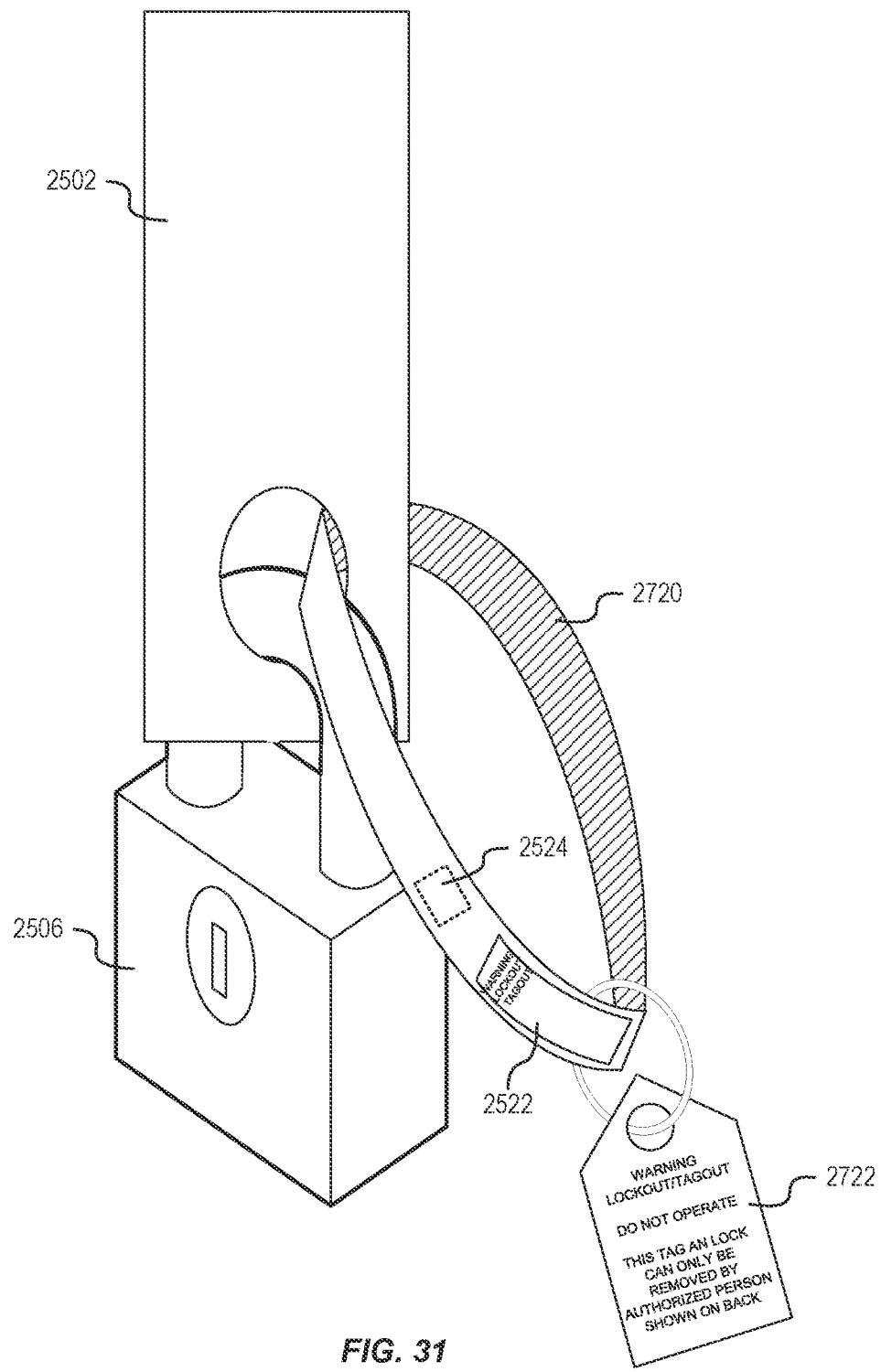
FIG. 31 is a schematic diagram illustrating one alternative scenario where the smart wireless tracking belt of FIG. 27, with an attached warning display, is looped through a physical lockout control with a padlock, in embodiments.

FIG. 31 is a schematic diagram illustrating one alternative scenario where smart wireless tracking belt 2720 of FIG. 27, with attached warning display 2722, is looped through physical lockout control 2502 with padlock 2506.

The smart wireless tracking belt may include a warning display that warns unauthorized users not to remove the smart wireless tracking belt and not to change the state of or operate the equipment (removing the portion from isolation). The warning display may be a message and/or graphics printed on the smart tracking device, for example. In other examples, the warning display is an electronic display (such as an LED, an LED panel, another light emitting element, an electronic paper display, an OLED display, an LCD display, or some other type of display). The smart wireless tracking belt may also include a speaker for playing an audio alarm when the smart wireless tracking belt is unfastened.

Figure 32:
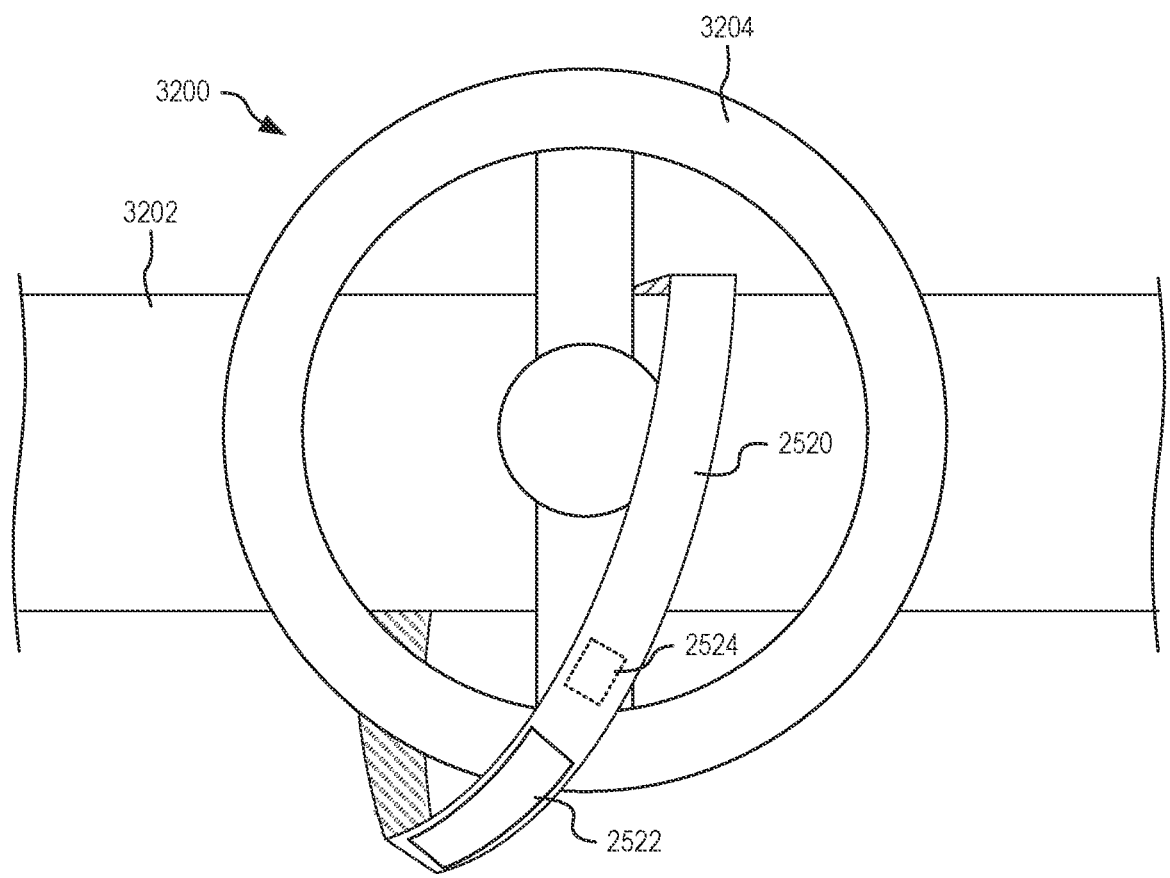
FIG. 32 is a schematic diagram illustrating example use of the smart wireless tracking belt of FIG. 25 to monitor and/or implement a lockout/tagout protocol for a valve that controls flow of a fluid through a pipe, in embodiments.

FIG. 32 is a schematic diagram illustrating example use of smart wireless tracking belt 2520 of FIG. 25 to monitor and/or implement a lockout/tagout protocol for a valve 3200 that controls flow of a fluid through a pipe 3202. Smart wireless tracking belt 2520 is looped through a handle 3204 of valve 3200 and around pipe 3202 when valve 3200 is closed, for example. To open valve 3200, by turning handle 3204, requires that smart wireless tracking belt 2520 be moved and removed. In this scenario, smart wireless tracking belt 2520 operates to detect movement of valve handle 3204 and thereby detect any inadvertent attempt at changing flow through pipe 3202 and/or removal of smart wireless tracking belt 2520 therefrom. That is, use of smart wireless tracking belt 2520 alone detects any inadvertent attempt at operating valve 3200.

In this embodiment, smart wireless tracking belt 2520 serves as notice to operators that the position of the valve or switch 3200 should not be changed. In certain embodiments, the smart wireless tracking belt 2520 may be positioned with respect to the valve or switch 3200 in a manner that physically restricts a user from changing the position of the valve or switch 3200 without removing the smart wireless tracking belt 2520. Therefore, the smart wireless tracking belt 2520 can track when the valve or switch 3200 is potentially moved. In embodiments, the valve or switch 3200 may be locked in place, such as using lock 2506 discussed above, and smart wireless tracking belt 2520 operates to detect if the lock 2506 is unlocked, removed, or broken as discussed above. Smart wireless tracking belt 2520 may operate to periodically transmit a "heartbeat signal" such as a ping or message that indicates the valve 3200 or lock 2506 has not been removed, locked, broken, or changed positions (or whether such removal, lock, break, or position change has occurred).

In embodiments, although only one smart wireless tracking belt 2520 is shown in FIG. 32, multiple tracking devices may be used. For example, on smart wireless tracking belt 2520 may be used to monitor lockout/tagout as discussed above, and another may be used to monitor valve position of valve 3200 as shown in FIG. 32. Alternatively, a single device may perform both functions (e.g. spec., both lockout/tagout and valve position monitoring).

Additional Embodiments

In other embodiments, the tracking devices may be applied to other entities in the environment, e.g., forklifts or other machinery that may be moved. In these embodiments, the tracking devices may have the flexible belt form factor and may be looped around, for example, a handle or portion of a frame of the machinery. Alternately, the tracking devices may have other form factors, e.g., form factor similar to that of a luggage tag, or tapes, stickers, and the like.

In other embodiments, the tracking devices may be applied to specific assets in the environment, e.g., valuable assets requiring individualized tracking.

In other embodiments, entities in the environment (e.g., pallets) may be retrofitted on a rolling basis, e.g., as required for given assets or journeys, such that standard operations of the environment are not slowed or delayed by the retrofitting. In other embodiments, entities in the environment may be retrofitted in batches, en masse, or on other timescales.

Figure 33:
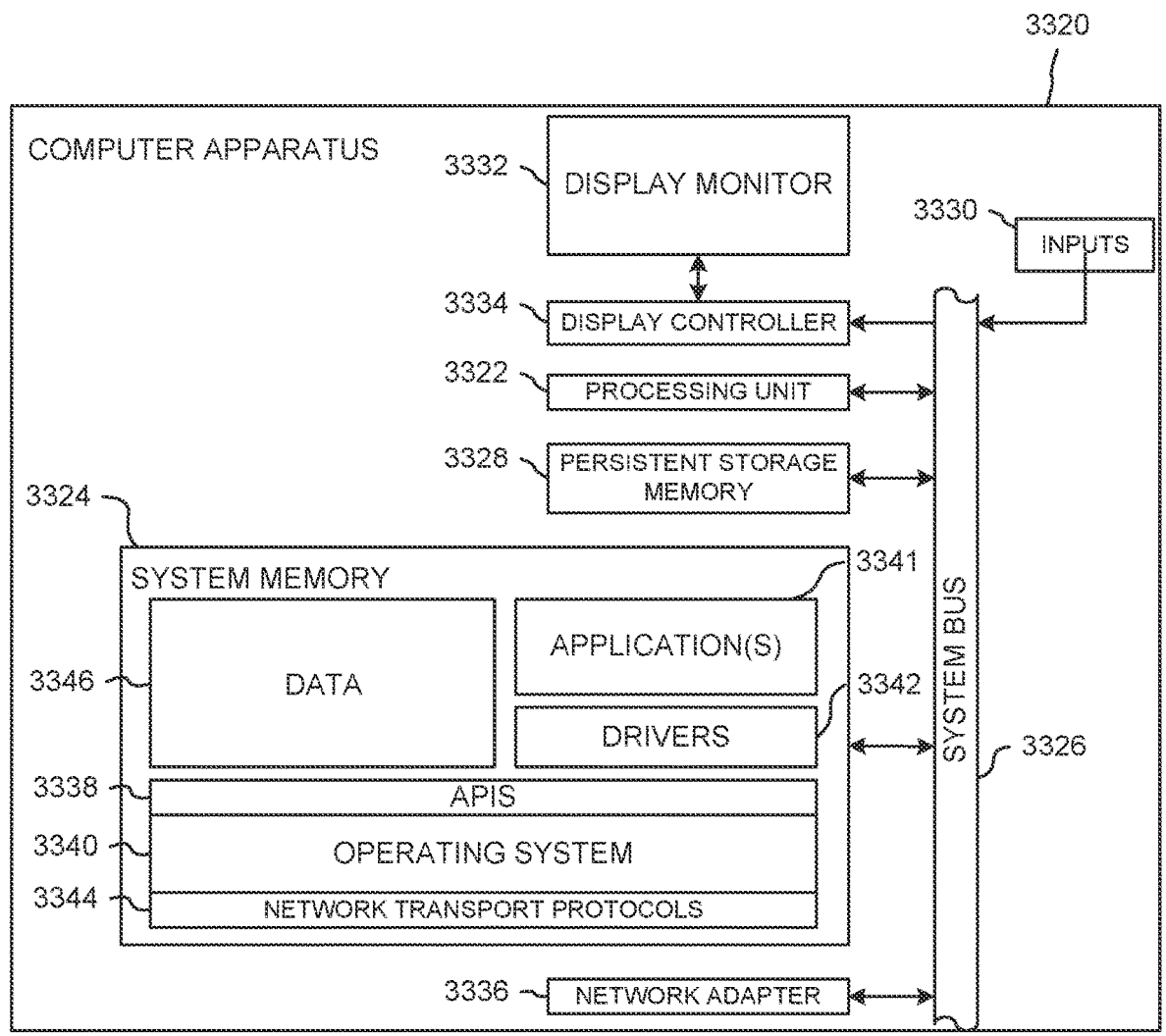
FIG. 33 shows one example of computer apparatus that, either alone or in combination with one or more other computing apparatus, is operable to implement one or more of the computer systems described in this specification, in embodiments.

FIG. 33 shows an example embodiment of computer apparatus 3320 that, either alone or in combination with one or more other computing apparatus, is operable to implement one or more of the computer systems described in this specification. The computer apparatus 3320 includes a processing unit 3322, a system memory 3324, and a system bus 3326 that couples the processing unit 3322 to the various components of the computer apparatus 3320. The processing unit 3322 may include one or more data processors, each of which may be in the form of any one of various commercially available computer processors. The system memory 3324 includes one or more computer-readable media that typically are associated with a software application addressing space that defines the addresses that are available to software applications. The system memory 3324 may include a read only memory (ROM) that stores a basic input/output system (BIOS) that contains start-up routines for the computer apparatus 3320, and a random-access memory (RAM). The system bus 3326 may be a memory bus, a peripheral bus, or a local bus, and may be compatible with any of a variety of bus protocols, including PCI, VESA, Microchannel, ISA, and EISA. The computer apparatus 3320 also includes a persistent storage memory 3328 (e.g., a hard drive, a floppy drive, a CD ROM drive, magnetic tape drives, flash memory devices, and digital video disks) that is connected to the system bus 3326 and contains one or more computer-readable media disks that provide non-volatile or persistent storage for data, data structures and computer-executable instructions.

A user may interact (e.g., input commands or data) with the computer apparatus 3320 using one or more input devices 3330 (e.g. one or more keyboards, computer mice, microphones, cameras, joysticks, physical motion sensors, and touch pads). Information may be presented through a graphical user interface (GUI) that is presented to the user on a display monitor 3332, which is controlled by a display controller 3334. The computer apparatus 3320 also may include other input/output hardware (e.g., peripheral output devices, such as speakers and a printer). The computer apparatus 3320 connects to other network nodes through a network adapter 3336 (also referred to as a "network interface card" or NIC).

A number of program modules may be stored in the system memory 3324, including application programming interfaces 3338 (APIs), an operating system (OS) 3340 (e.g., the Windows® operating system available from Microsoft Corporation of Redmond, Washington U.S.A.), software applications 3341 including one or more software applications programming the computer apparatus 3320 to perform one or more of the steps, tasks, operations, or processes of the positioning and/or tracking systems described herein, drivers 3342 (e.g., a GUI driver), network transport protocols 3344, and data 3346 (e.g., input data, output data, program data, a registry, and configuration settings).

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features (A1) A smart wireless tracking belt includes a wireless transducing circuit and a flexible belt body having a first region having a first portion of the wireless transducing circuit, a second region having a second portion of the wireless transducing circuit, a first physical connector, and a second physical connector. The first physical connector and the second physical connector are configured to removably couple together causing the flexible belt body to form a loop and when the flexible belt body forms the loop, the first region has a different orientation to the second region.

(A2) In embodiments of (A1), the flexible belt body forming a head portion and a tail portion including a plurality of magnets spaced along its length, the head portion including the wireless transducing circuit including a magnetic sensor, at least one processor, and memory storing machine-readable instructions that, when executed by the processor, control the wireless transducing circuit to detect a fastening event when the magnetic sensor senses at least one of the magnets in response to the tail portion being fastened to the head portion.

(A3) Embodiments of either (A1) or (A2), the memory further including machine-readable instruction that, when executed by the at least one processor, control the wireless transducing circuit to detect an unfastening event when the magnetic sensor does not sense the at least one of the magnets in response to the tail portion being fastened to the head portion.

(A4) Embodiments of any of (A1)-(A3), the memory further including machine-readable instruction that, when executed by the at least one processor, control the wireless transducing circuit to store each of the fastening event and the unfastening event in the memory.

(A5) Embodiments of any of (A1)-(A4), the memory further including machine-readable instruction that, when executed by the at least one processor, control the wireless transducing circuit to transmit a wireless message to a server for each of the fastening event and the unfastening event.

(A6) Embodiments of any of (A1)-(A5), the memory further including machine-readable instruction that, when executed by the at least one processor, control the wireless transducing circuit to cause the status display to indicate the unfastening event.

(A7) In embodiments of any of (A1)-(A6), the head portion forming a slot that receives the tail portion when the smart wireless tracking belt is fastened to form a loop.

(A8) In embodiments of any of (A1)-(A7), the first physical connector is positioned at a first end of the flexible belt body and the second physical connector is positioned at a second end of the flexible belt body, opposite the first end.

(A9) In embodiments of any of (A1)-(A8), the first physical connector and the second physical connector are selected from the group consisting of: adhesives, buckles, snaps, clasps, buttons, zippers, squeeze buckles, or g-hooks.

(A10) In embodiments of any of (A1)-(A9), when the flexible belt body forms the loop, the first physical connector is on an outer layer of the loop and the second physical connector is on an inner layer of the loop.

(A11) In embodiments of any of (A1)-(A10), the wherein the first physical connector and the second physical connector are respective parts of a hook-and-loop fastener.

(A12) In embodiments of any of (A1)-(A11), at least one second electronic component, wherein the first electronic component is more resilient than the second electronic component, and wherein the smart wireless tracking belt protects the second region more than the first region.

(A13) In embodiments of any of (A1)-(A12), second electronic component requiring a second orientation, wherein, when the first physical connector and the second physical connector are coupled together, the first electronic component is in the first orientation, and the second electronic component is in the second orientation.

(A14) In embodiments of any of (A1)-(A13), when looped around part of a pallet, the second orientation is in a direction away from the pallet and the second portion comprises one or more sensors configured to capture sensor data of an environment of the pallet.

(A15) In embodiments of any of (A1)-(A14), the one or more sensors include one or more of: a GPS sensor, a capacitive sensor, a pressure sensor, a humidity sensor, a light sensor, a sound sensor, an altimeter, a gyroscope, an accelerometer, a temperature sensor, a flex sensor, and a strain sensor.

(A16) Embodiments of any of (A1)-(A15), further including one or more graphics displayed on an external surface of the flexible belt body to aid a user in orienting the flexible belt body on the pallet.

(A17) In embodiments of any of (A1)-(A16), the first portion comprises one or more of: PCB, memory storage components, communications systems, energy storage components, antennae, and one or more sensors that do not require access to the exterior of the pallet.

(A18) In embodiments of any of (A1)-(A17), the part of the pallet is a center stringer.

(A19) Embodiments of any of (A1)-(A18), further including a two-dimensional barcode displayed on an exterior surface of the flexible belt body.

(A20) A method for lockout/tagout using a smart wireless tracking belt includes determining deployment of the smart wireless tracking belt, detecting unexpected movement of the smart wireless tracking belt, and generating an alert when the unexpected movement is detected. The method determines deployment of the smart wireless tracking belt by detecting fastening of the smart wireless tracking belt and reading sensors of the smart wireless tracking belt to determine no movement is detected during a settling period, The method detects unexpected movement of the smart wireless tracking belt by reading sensor data from at least one movement sensor of the smart wireless tracking belt and processing the sensor data to detect movement of the smart wireless tracking belt.

(A21) In embodiments of (A20), generating an alert further includes sending a wireless message including a unique identifier of the smart wireless tracking belt to a server, wherein the server sends a message to a mobile gateway near the equipment.

(A22) In embodiments of either of (A20) and (A21), generating an alert further includes sending a wireless message including a unique identifier of the smart wireless tracking belt directly to a mobile gateway near the equipment.

(A23) In embodiments of either of (A20)-(A22), generating an alert includes sending a wireless message including a unique identifier of the smart wireless tracking belt directly to a wireless receiver of the equipment.

(A24) In embodiments of any of (A20)-(A23), detecting fastening of the smart wireless tracking belt includes reading sensor data from a magnetic sensor positioned in a head portion of the smart wireless tracking belt, and processing the sensor data to determine presence of a magnetic field of at least one magnet positioned in a tail portion of the smart wireless tracking belt.

(A25) Embodiments of any of (A20)-(A24), further including determining unexpected unfastening of the smart wireless tracking belt by reading sensor data from the magnetic sensor at intervals and processing the sensor data to determine when the magnetic sensor does not sense the at least one magnet.

(A26) Embodiments of any of (A20)-(A25), further including logging at least one of the detected fastening, the detected unfastening, and the detected unexpected movement, and sending the log to an external device.

(A27) Embodiments of any of (A20)-(A26), further including receiving a unique ID from an external device proximate the smart wireless tracking belt, determining that the unique ID corresponds to authorized personnel, and determining movement is expected when the unique ID corresponds to authorized personnel.

(A28) A smart wireless tracking belt includes a flexible belt body having a head portion including a wireless transducing circuit, a tail portion having a plurality of magnets spaced along its length, a first physical connector, and a second physical connector that removably couples with the first physical connector to cause the flexible belt body to form a loop. The wireless transducing circuit including a magnetic sensor, at least one processor, a wireless communication system, and memory storing machine-readable instructions that, when executed by the processor, control the wireless transducing circuit to: detect an unfastening event when the magnetic sensor does not sense the at least one of the magnets as the tail portion is unfastened from the head portion, and transmit a wireless message indicative of the unfastening event to a remote server.

(A29) In embodiments of (A28), the memory further including machine-readable instruction that, when executed by the at least one processor, control the wireless transducing circuit to detect a fastening event when the magnetic sensor senses at least one of the magnets as the tail portion is fastened to the head portion, and transmit a wireless message indicative of the fastening event to the remote server.

(A30) In embodiments of either (A28) or (A29), the memory further including machine-readable instruction that, when executed by the at least one processor, control the wireless transducing circuit to read sensor data from the movement sensor at intervals, process the sensor data to detect movement of the smart wireless tracking belt, and transmit a wireless message indicative of the detected movement to the remote server.

(A31) In embodiments of any of (A28)-(A30), further including a warning display warning unauthorized users not to remove the smart wireless tracking belt.

(A32) In embodiments of any of (A28)-(A31), the warning display including a message and/or graphics printed on the flexible belt body.

(A33) In embodiments of any of (A28)-(A32), the warning display including a message and/or graphics printed on a tag that is attached to the flexible belt body.

(A34) In embodiments of any of (A28)-(A33), the smart wireless tracking belt being operable for warning of lockout/tagout violations.

What is claimed is:

1. A method comprising:
   determining deployment of a smart wireless tracking belt by:
      detecting fastening of the smart wireless tracking belt; and
      reading sensors of the smart wireless tracking belt to determine no movement is detected during a settling period;
   detecting unexpected movement of the smart wireless tracking belt by:
      reading sensor data from at least one movement sensor of the smart wireless tracking belt; and
      processing the sensor data to detect movement of the smart wireless tracking belt; and
      generating an alert when the unexpected movement is detected.

2. The method of claim 1, wherein generating an alert comprises sending a wireless message including a unique identifier of the smart wireless tracking belt to a server, wherein the server sends a message to a mobile gateway located near the smart wireless tracking belt.

3. The method of claim 1, wherein generating an alert comprises sending a wireless message including a unique identifier of the smart wireless tracking belt directly to a mobile gateway near the smart wireless tracking belt.

4. The method of claim 1, the step of generating an alert comprising sending a wireless message including a unique identifier of the smart wireless tracking belt directly to a wireless receiver of an equipment associated with the smart wireless tracking belt.

5. The method of claim 1, the step of detecting fastening of the smart wireless tracking belt comprising:
   reading sensor data from a magnetic sensor positioned in a head portion of the smart wireless tracking belt; and
   processing the sensor data to determine presence of a magnetic field of at least one magnet positioned in a tail portion of the smart wireless tracking belt.

6. The method of claim 5, further comprising determining unexpected unfastening of the smart wireless tracking belt by:
   reading sensor data from the magnetic sensor at intervals; and
   processing the sensor data to determine when the magnetic sensor does not sense the at least one magnet.

7. The method of claim 6, further comprising logging at least one of the detected fastening, the detected unfastening, and the detected unexpected movement, and sending the log to an external device.

8. The method of claim 1, further comprising:
   receiving a unique ID from an external device proximate the smart wireless tracking belt;
   determining that the unique ID corresponds to authorized personnel; and
   determining movement is expected when the unique ID corresponds to authorized personnel.

9. A method comprising:
   determining deployment of a wireless tracking device by:
      detecting a fastening of a portion of the wireless tracking device; and
      reading sensors of the wireless tracking device to determine no movement is detected during a settling period;
   detecting unexpected movement of the wireless tracking by:
      reading sensor data from at least one movement sensor of the wireless tracking device; and
      processing the sensor data to detect movement of the wireless tracking device; and
      generating an alert when the unexpected movement is detected.

10. The method of claim 9, further comprising:
    determining that an equipment associated with the wireless tracking device is currently subject to a lockout/tagout procedure;
    determining that the lockout/tagout procedure has been violated based the unexpected movement.

11. The method of claim 10, further comprising responsive to determining that the lockout/tagout procedure has been violated, controlling a display of the wireless tracking device to display an indication that the lockout-tagout procedure has been violated.

12. The method of claim 11, wherein the display comprises one or more light-emitting diodes (LEDs), and the indication comprises emitting light from the one or more LEDs.

13. The method of claim 9, wherein the wireless tracking device comprises a display to indicate a status of the wireless tracking device.

14. The method of claim 10, wherein the determining that the equipment associated is currently subject to the lockout/tagout procedure comprises receiving a wireless communication comprising an association between the wireless tracking device and the equipment.

15. The method of claim 10, wherein the determining that the equipment associated is currently subject to the lockout/tagout procedure comprises receiving a wireless communication comprising an association between the wireless tracking device and a physical lockout control.

16. The method of claim 9, wherein the wireless tracking device comprises a smart wireless tracking belt.

17. The method of claim 9, further comprising:
transmitting the alert to an equipment, wherein the equipment initiates one or more shutdown actions in response to receiving the alert.

18. The method of claim 9, further comprising transmitting the alert to an authorized personnel.

19. The method of claim 9, further comprising:
detecting that the unexpected movement is authorized movement; and
sending a message to a server associated with the wireless tracking device.

20. The method of claim 19, further comprising extinguishing a status display of the wireless tracking device.

* * * * *